(12) United States Patent  (10) Patent No.: US 9,013,488 B2
Ording et al.  (45) Date of Patent: Apr. 21, 2015

(54) GROUPING ITEMS IN A FOLDER

(75) Inventors: Bas Ording, San Francisco, CA (US); David Hart, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 891 days.

(21) Appl. No.: 12/907,898

(22) Filed: Oct. 19, 2010

(65) Prior Publication Data

US 2012/0092346 A1  Apr. 19, 2012

(51) Int. Cl.
*G06T 13/00* (2011.01)
*G06F 3/0481* (2013.01)

(52) U.S. Cl.
CPC .............. *G06T 13/00* (2013.01); *G06F 3/0481* (2013.01)

(58) Field of Classification Search
USPC .......... 345/419, 473, 474, 475; 715/769, 835; 719/328
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,318,196 B2 * | 1/2008 | Crow et al. ................... | 715/716 |
| 7,650,575 B2 * | 1/2010 | Cummins et al. ............. | 715/769 |
| 7,663,607 B2 | 2/2010 | Hotelling et al. | |
| 7,843,454 B1 * | 11/2010 | Biswas ......................... | 345/473 |
| 8,166,415 B2 * | 4/2012 | Cisler et al. ................... | 715/778 |
| 8,201,073 B2 * | 6/2012 | Canora et al. ................. | 715/201 |
| 8,479,122 B2 | 7/2013 | Hotelling et al. | |
| 2006/0129586 A1 | 6/2006 | Arrouye et al. | |
| 2006/0197753 A1 | 9/2006 | Hotelling | |

(Continued)

FOREIGN PATENT DOCUMENTS

| | | |
|---|---|---|
| JP | 2000-163031 A | 6/2000 |
| JP | 2002-342033 A | 11/2002 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Kimbinh T Nguyen
(74) *Attorney, Agent, or Firm* — Morrison & Foerster LLP

(57) ABSTRACT

User interface changes and file system operations related to grouping items in a destination folder are disclosed. A user can group multiple items displayed on a user interface into a destination folder using an input command. An animation can be presented in the user interface illustrating the creation of the destination folder and the movement of each selected item into the newly created folder. The movement of each selected item can be along a respective path starting from an initial location on the user interface and terminating at the destination folder, and initiation of the movement of each selected item can be asynchronous with respect to the other selected items. Implementations showing the animations in various types of user interfaces are also disclosed.

24 Claims, 47 Drawing Sheets

(56) References Cited

U.S. PATENT DOCUMENTS

| | | |
|---|---|---|
| 2007/0192749 A1* | 8/2007 | Baudisch .................. 715/863 |
| 2008/0148182 A1 | 6/2008 | Chiang et al. |
| 2008/0184112 A1 | 7/2008 | Chiang et al. |
| 2009/0119578 A1* | 5/2009 | Relyea et al. ............. 715/234 |
| 2010/0166392 A1 | 7/2010 | Ishii |
| 2012/0084689 A1* | 4/2012 | Ledet et al. ............... 715/769 |

FOREIGN PATENT DOCUMENTS

| | | |
|---|---|---|
| JP | 2007-334397 | 12/2007 |
| KR | 10-2007-0069561 | 7/2007 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

| Filename | Date Modified | Type | Size |
|---|---|---|---|
| A.doc | 9/14/2010 5:19pm | DOC | 1k |
| C.doc | 9/14/2010 5:19pm | DOC | 1k |
| E.doc | 9/14/2010 5:19pm | DOC | 1k |
| Test | 9/15/2010 10:55am | Folder | |
| X.doc | 9/14/2010 5:19pm | DOC | 1k |
| Y | 9/14/2010 5:20pm | Folder | |

Origin — Fri 10:55 AM

FIG. 3F

| Filename | Date Modified | Type | Size |
|---|---|---|---|
| A.doc | 9/14/2010 5:19pm | DOC | 1k |
| C.doc | 9/14/2010 5:19pm | DOC | 1k |
| E.doc | 9/14/2010 5:19pm | DOC | 1k |
| Untitled | 9/14/2010 10:55am | Folder | |
| X.doc | 9/14/2010 5:19pm | DOC | 1k |
| Y | 9/14/2010 5:20pm | Folder | |

Origin — Fri 10:55 AM

FIG. 3J

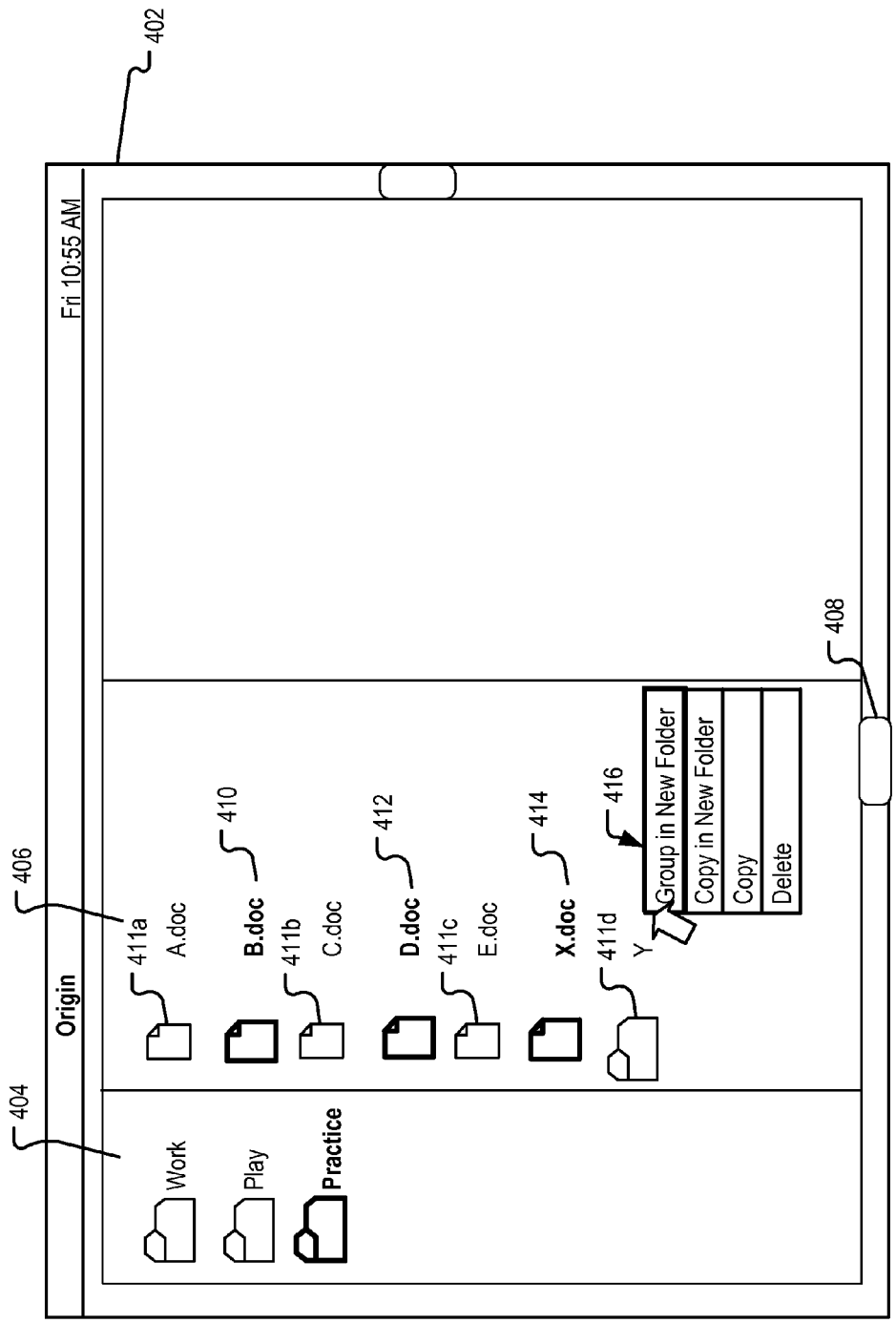

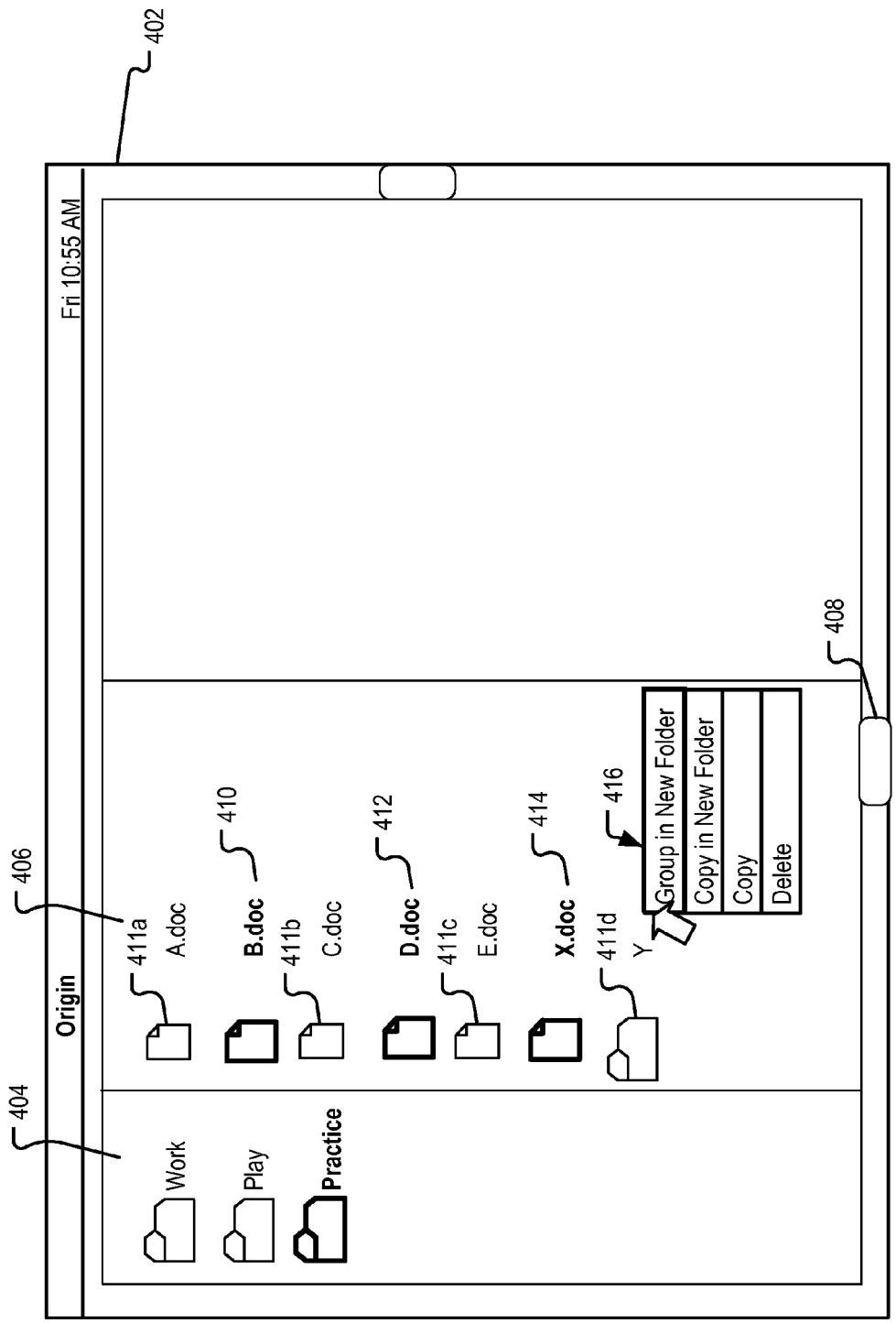

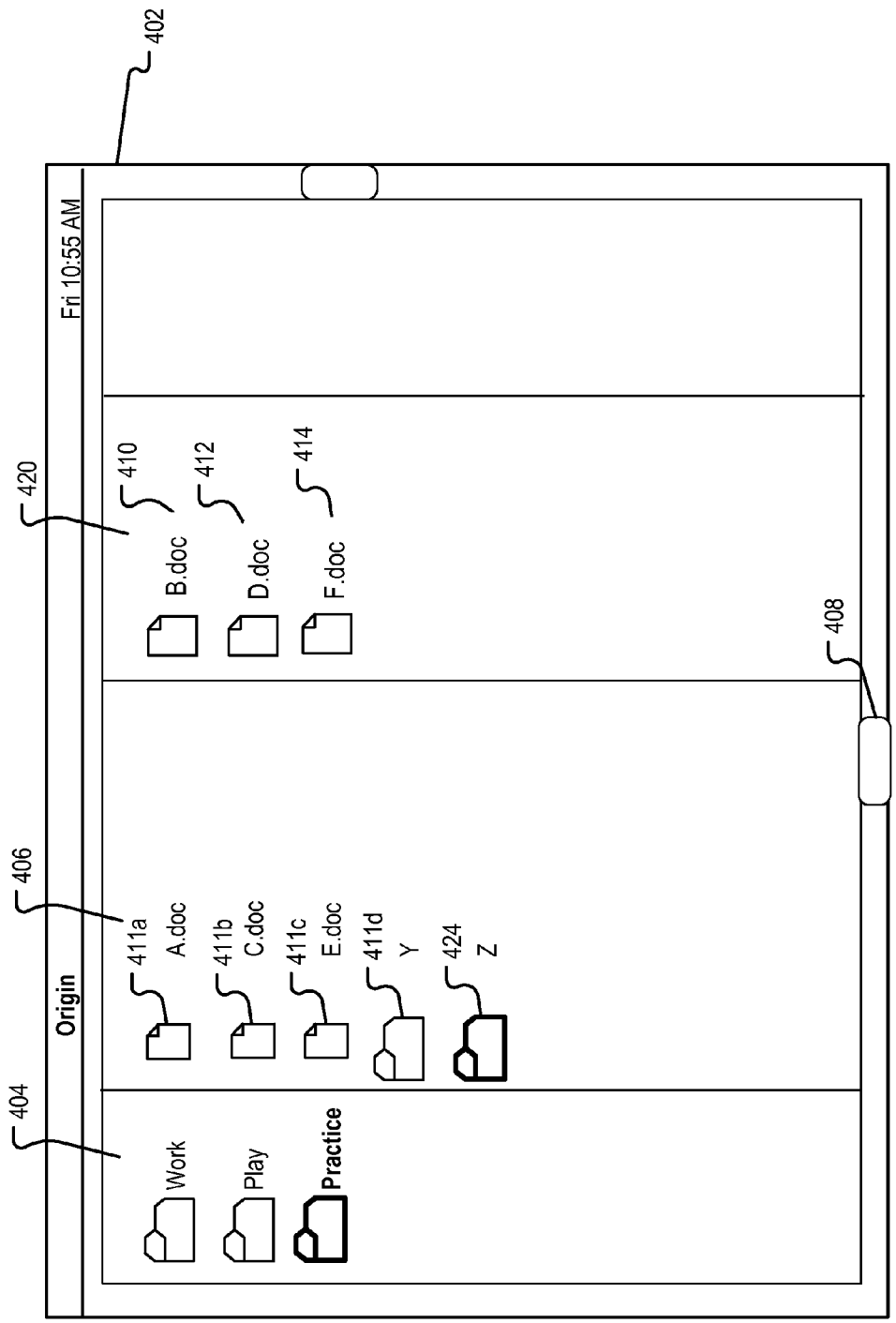

GROUPING ITEMS IN A FOLDER

TECHNICAL FIELD

This disclosure relates generally to user interfaces for managing information items on a computing device.

BACKGROUND

Modern computing devices often include a file system that stores information items in various directories or subdirectories (e.g., folders) in a file system hierarchy. Each information item (e.g., a file or a folder) can be given a respective filename. An information item's filename and its file path in the file system hierarchy can be used to uniquely identify the item in the file system.

Each folder can include multiple files and subfolders. A user can delete existing items (e.g., files and folders) from an existing folder, and can add new items (e.g., files and folders) to the existing folder. A user can also move items from one existing folder to another existing folder. Many operating systems also allow a user to create an empty new folder at a desired location in the file system hierarchy, and then move items from various locations in the file system hierarchy to the newly created empty folder. Modern computing devices also provide graphical user interfaces (GUIs) to help the user navigate and manipulate the file system hierarchy and the items stored therein.

A user can group one or more existing items into a new folder through the GUIs of a computing device. The grouping action can be accomplished in several steps. First, the user can create the new folder on the GUI (e.g., the desktop). If the one or more existing items appear on the same GUI as the new folder, the user can select the items and drag them as a group over to the new folder. When the group of items enters the drop zone of the new folder, the user can release the group of items, and the released group of items would become items of the new folder. Alternatively, the user can move the existing items to the new folder from their original locations using one or more "cut and paste" operations in the GUI. For example, after the new folder has been created, the user can select an existing item in the GUI, "cut" the item from its original location, and then "paste" the item into the new folder in the GUI. The "pasted" item now belongs to the new folder.

SUMMARY

A user can group multiple items into a destination folder (e.g., a new folder) using an input command (e.g., a single input command) in a graphical user interface. An animation can be presented in the user interface illustrating the creation of the destination folder and the movement of each selected item into the destination folder. The movement of each selected item can be along a respective path that starts at an initial location on the user interface and terminates at the destination folder, and the movement of each selected item can be initiated asynchronously with respect to the other selected items. Implementations showing the animations in various types of user interfaces, such as in a free-arranged desktop, a keep-arranged desktop, a list view interface of a folder, a column view interface of a folder, and a search result window, are also disclosed.

In addition, the file system operations for grouping the items into a folder can be completed asynchronously with the presentation of the animation showing the grouping of the items into the folder. In some implementations, the animation can be presented when it has been determined that the file system operations for creating the folder and moving the selected items to the folder have been completed within a defined time window. System events that affect the user interface can be queued during the defined time window or until the animation is completed. The user interface can be kept stable during the file system operations, and operable to receive and respond to additional inputs that do not conflict with the file system operations.

The details of one or more implementations of the item grouping action and related user interface changes are set forth in the accompanying drawings and the description below. Other features, aspects, and advantages will become apparent from the description, the drawings, and the claims.

BRIEF DESCRIPTION OF THE DRAWINGS

FIGS. 3A-3F illustrate exemplary user interface changes demonstrating the grouping of multiple items from an existing folder into a destination folder in a list view interface of the existing folder.

FIGS. 3G-3L illustrate another set of exemplary user interface changes demonstrating the grouping of multiple items from an existing folder into a destination folder in a list view interface of the existing folder.

FIGS. 4A-4E illustrate exemplary user interface changes demonstrating the grouping of multiple items from an existing folder into a destination folder in a column view interface of the existing folder.

FIGS. 4F-4J illustrate another set of exemplary user interface changes demonstrating the grouping of multiple items from an existing folder into a destination folder in a list view interface of the existing folder.

Like reference symbols in the various drawings indicate like elements.

DETAILED DESCRIPTION

Exemplary User Interfaces for Grouping Items in a Folder

In conventional graphical user interfaces (GUIs), when a user wishes to group one or more items into a new folder, the user typically has to first create the new folder at a desired location in the user interface. After the graphical representation (e.g., a folder icon) of the new folder is presented in the user interface, the user can select, from the user interface, respective representations (e.g., file icons) of the items that he or she wishes to group, and drag the representations of the items together or one by one into the new folder presented on the user interface. The movement of the items as a whole can be illustrated in the user interface as an image containing the selected items being dragged along by a pointer (e.g., a mouse pointer) to the graphical representation of the new folder. When the items are released after the image enters the drop zone of the new folder (e.g., as indicated by a change in appearance of the new folder), the image disappears into the new folder indicating the completion of the move.

As disclosed herein, the grouping of multiple items or the transfer of a single item into a new folder can be invoked via a single input command after the selection of the item(s). The user no longer has to create the new folder in a separate step prior to selecting and moving the item(s) into the new folder. In response to the single input command, a new folder can be created at a default location in the file system (e.g., in the desktop folder), and the selected items can then be moved to the new folder from their original locations in the file system hierarchy into the new folder. In some implementations, the user can also specify an existing folder as the destination folder for the group of selected items.

Upon successful completion of the file system operations (e.g., the creation of a new folder and the movement of the items in the file system to the new folder), an animation showing a new folder appearing at a selected folder location on the user interface, and movements of the individual items from their original locations on the user interface to the new folder at the selected folder location can be presented. A suitable folder location can be determined automatically by the operating system based on one or more defined rules. The movements of the individual items do not have to follow the movement of a pointer and do not have to be synchronized or fixed in spatial relationship to one another.

In some implementations, the user can also specify an existing folder as the destination folder, and an animation showing the selected items moving from their respective original locations to the destination folder along the items' respective paths can be presented.

FIGS. 1A-1D illustrate exemplary user interface changes caused by the grouping of multiple items on a free-arranged user interface into a folder on the free-arranged user interface.

Figure 1A:
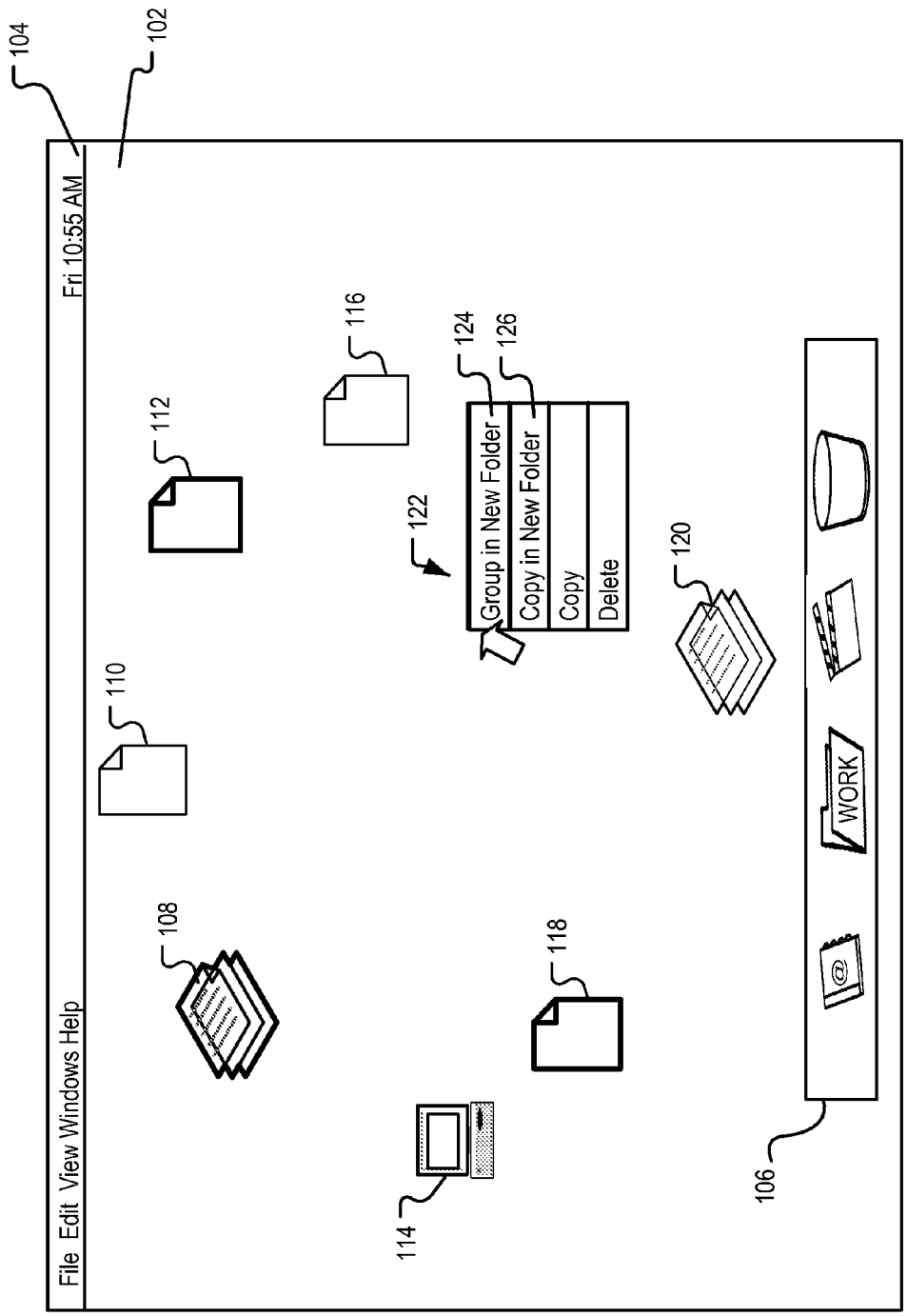
FIGS. 1A-1D illustrate exemplary user interface changes caused by the grouping of multiple items on a free-arranged desktop into a destination folder on the free-arranged desktop.

In FIG. 1A, a free-arranged user interface is presented. The free-arranged user interface can be a free-arranged desktop 102, or other user interfaces (e.g., free-arranged search result windows or folder windows) that do not adhere to defined rules or criteria for the layout of items contained therein. As shown in the free-arranged desktop 102, graphical representations of items (e.g., icons for files, folders, hardware devices) can be located at any coordinate locations within the area of the desktop 102 that are not are already designated for and occupied by user interface elements (e.g., the desktop menu bar 104 or the dock 106). A user can move the items' graphical representations freely within the desktop 102 and the layout of the items in the desktop can be freely arranged by the user.

As shown in FIG. 1A, a number of items (e.g., files and/or folders) are presented on the free-arranged desktop 102, represented by icons 108, 110, 112, 114, 116, 118, and 120 respectively. The user has selected items represented by the icons 108, 112, and 118 (as indicated by the bolded outlines on the item's icons). While the items are selected in the desktop 102, the user can cause a menu 122 to be presented in the desktop 102 (e.g., by using a defined input). The menu 122 can present an option 124 that, when selected, can cause the grouping of the selected items into a new folder. In some implementations, the menu 122 can also present an option 126 that, when selected, can cause copies of the selected items to be created and the copies to be grouped into the new folder.

Figure 2A:
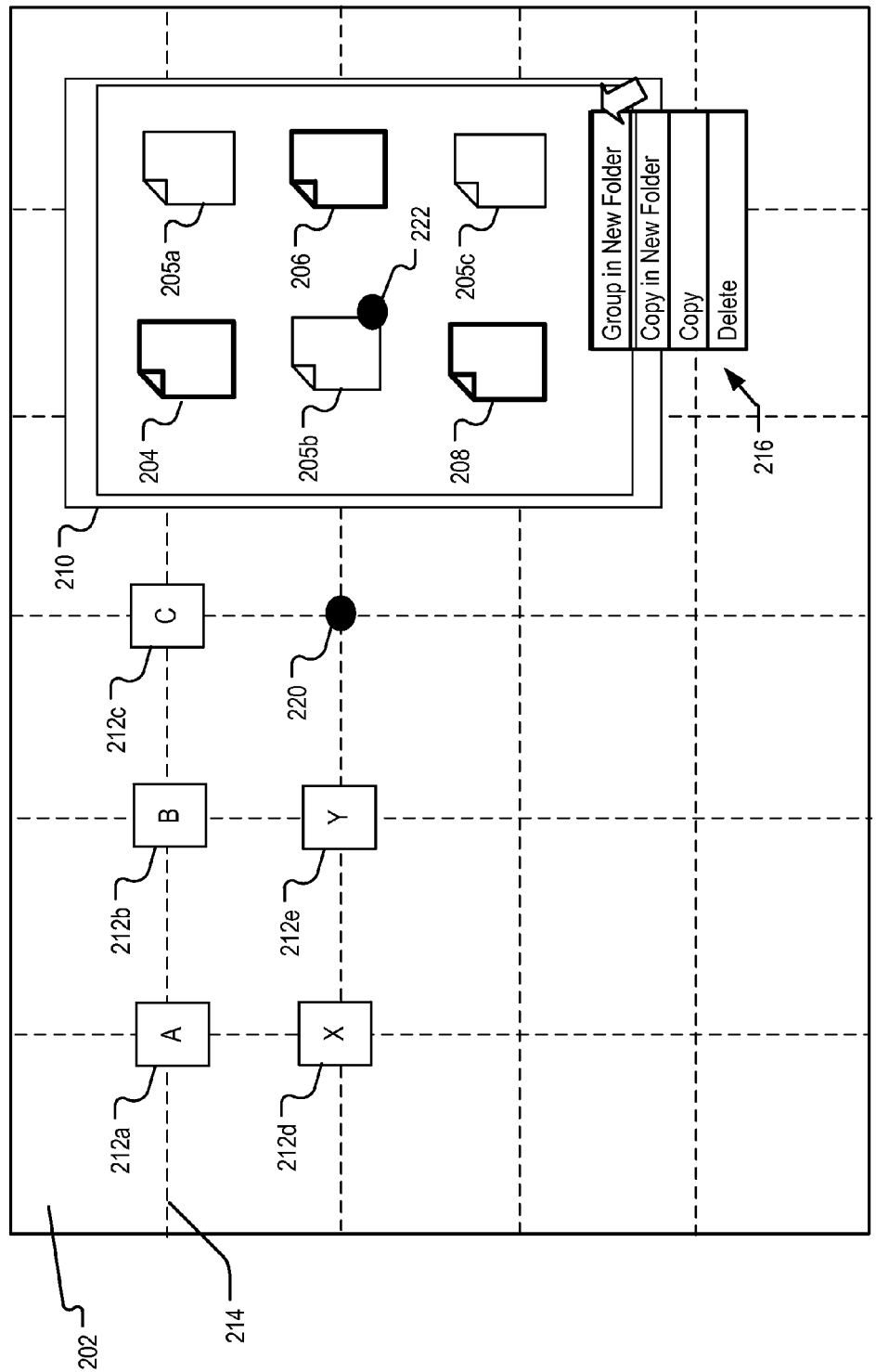
FIGS. 2A-2G illustrate exemplary user interface changes demonstrating the grouping of multiple items within a window representing an arbitrary folder into a destination folder on a keep-arranged desktop.

FIG. 2A illustrates the changes that can occur in the free-arranged desktop 102 after the user has selected the option 124 to group the selected items into a new folder. After the user has entered the single input command that causes the selected items to be grouped into a new folder, a graphical representation 128 of the new folder can be presented on the free-arranged desktop 102. The new folder 128 can be shown to have a default filename, such as "untitled" or "new folder." The default filename can be shown in a text label 130 attached to the graphical representation 128.

In some implementations, a suitable location for the new folder 128 on the free-arranged desktop 102 can be determined based on various defined rules. For example, the suitable location for the new folder 128 can be determined based on the locations of the selected items 108, 112, and 118 on the free-arranged desktop. The coordinates of the selected items on the free-arranged desktop 102 can be used to compute a weighted average of the items' locations, and the weighted average can be used as the suitable folder location for the new folder. In some implementations, if the computed weighted average is already occupied by another item in the item or user interface element in the free-arranged desktop 102, another unoccupied location that is closest to the weighted average can be used as the suitable location for the new folder 128 on the free-arranged desktop 102. Exemplary user interface changes illustrating the selection of the unoccupied location are shown in FIGS. 1E-1G.

In some implementations, the representation of the new folder 128 can be animated into the suitable folder location. For example, the representation 128 can originate from the suitable folder location as a small point and gradually grow into its final size. Visual effects imitating the rising of the new folder 128 from the suitable folder location can be displayed. Other ways of introducing the new folder 108 into the free-arranged desktop 102 are also possible.

In some implementations, as the representation of the new folder 128 is popping up or immediately after the new folder 128 has settled into position at the suitable folder location, the representations of the selected items (e.g., the items 108, 112, and 118) can be animated to move toward the representation of the new folder 128 from their respective original locations.

In some implementations, each of the selected items can follow a respective path or trajectory starting from the item's original location in the free-arranged desktop 102 and terminating at the location of the new folder 128. The item's movement can be animated to simulate the item being tossed up from the surface of the desktop plane toward the user, and then falling back toward the folder along the trajectory. Other kinds of paths are also possible, and each item's path can be different.

Figure 1B:
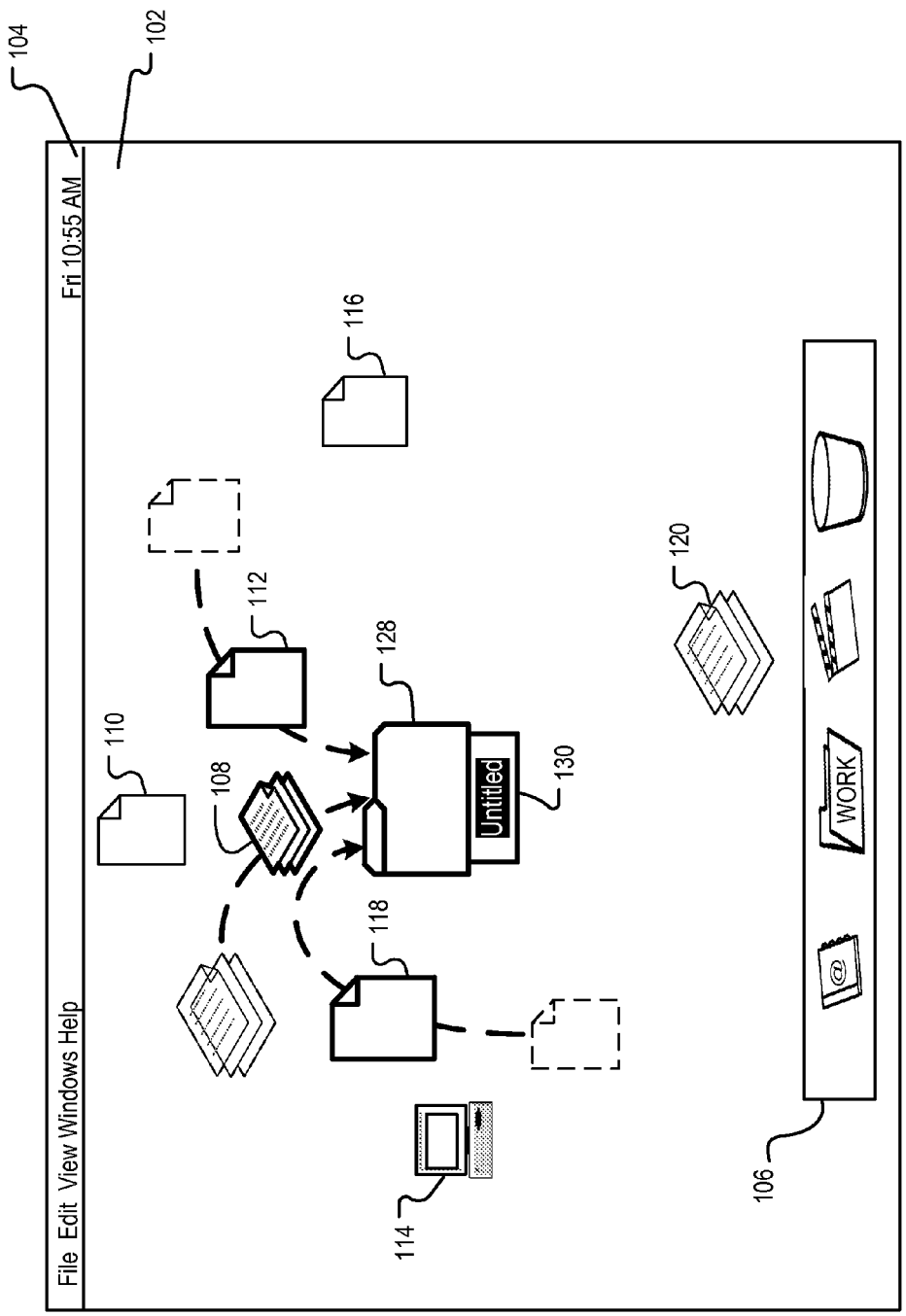

Exemplary paths of the three selected items are shown in FIG. 1B by the dashed curves leading from the selected items 108, 112, and 118 to the new folder 128. Although shown in FIG. 1B for illustrative purposes, the dashed lines need not actually appear on the user interface during the movement of the items to the new folder 128.

In some implementations, the selected items can be shown to take off from their respective original locations on the user interface at slightly different times. For example, an item located closest to the new folder 128 can be shown to depart from its original location slightly earlier than an item that is located farther away from the new folder 128. By implementing the different delays in take-off times for different selected items, the user interface changes can appear more natural, and also can avoid clashing of the items when the items arrive at the new folder 128.

As illustrated in FIG. 1B, the item 108 is located closest to the new folder 108, as compared to items 110 and 118. The item 108 is shown to have departed from its original location and be farther along its path toward the new folder 128 than the items 110 and 118.

In some implementations, the respective take-off times and accelerations of the items along their respective paths can also take into account the size of the graphical representations for the items. For example, a larger icon can be shown to move slower and start slightly later than a smaller icon.

Figure 1C:
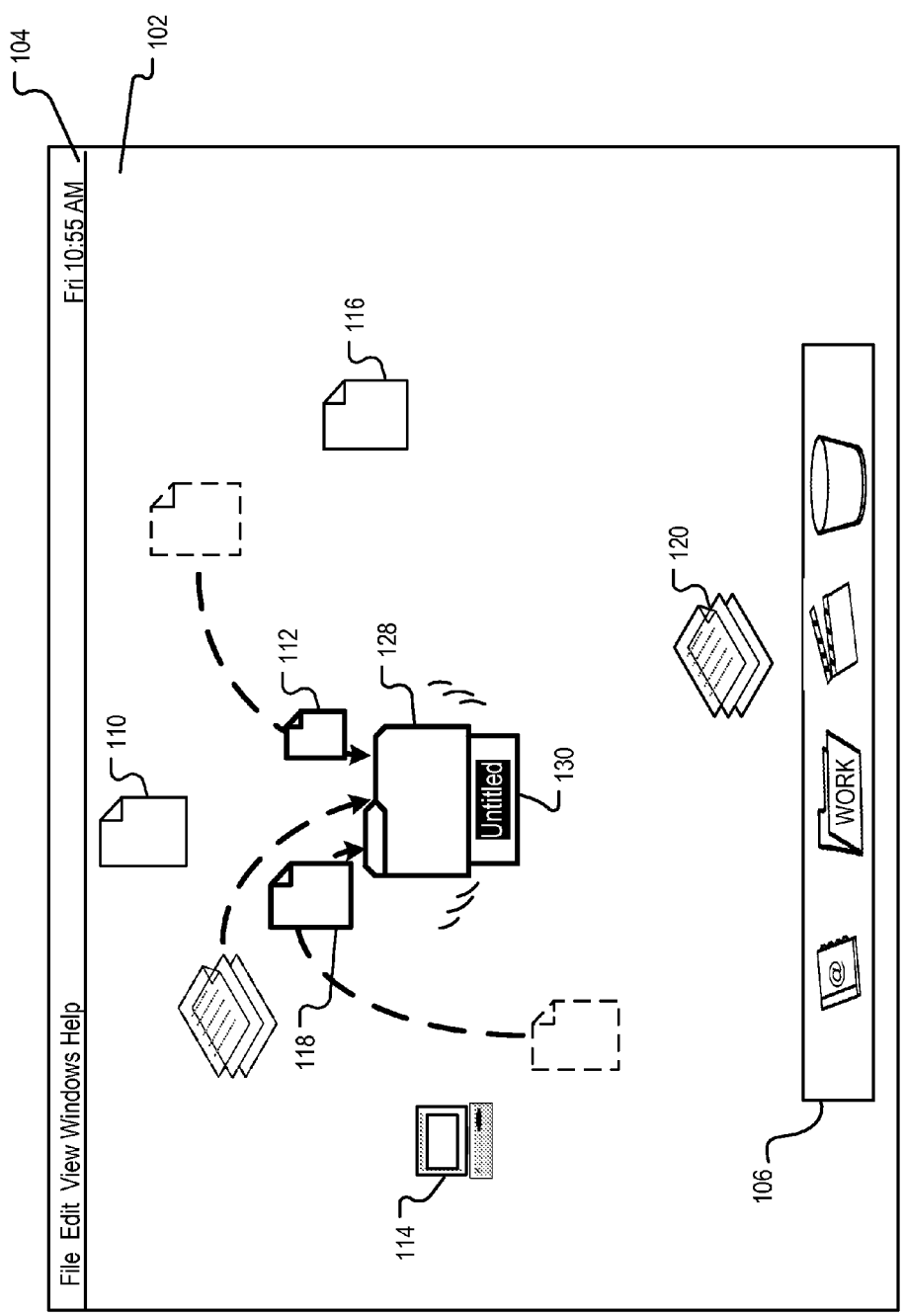

In some implementations, when the graphical representations of the selected items are in the process of moving along their respective paths toward the new folder 128, the appearances (e.g., sizes and shapes) of the representations can change to reflect the changes in the items' physical locations and the viewer's viewing perspectives. For example, as illustrated in FIG. 1B and FIG. 1C, an item (e.g., item 118) reaching the peak of the trajectory can appear to be enlarged as compare to when the item was at the beginning or the end of the trajectory. FIG. 1C also illustrates the landing of the item 108 in the new folder 128, which can also be animated to appear to shake when the item 108 is received. Immediately following the item 108, the items 112 and 118 are shown as just about to enter the new folder 128.

Figure 1D:
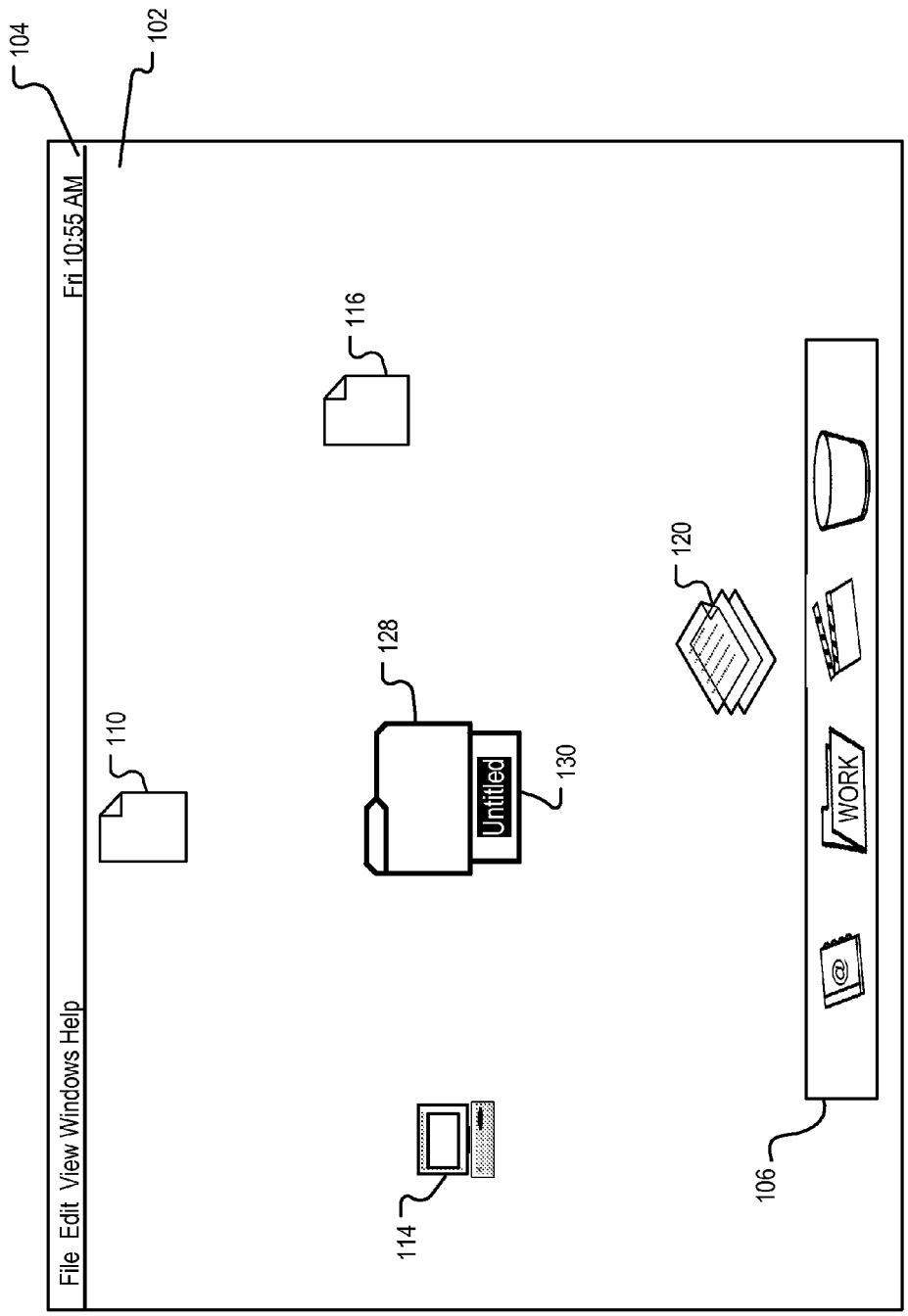
Figure 1E:
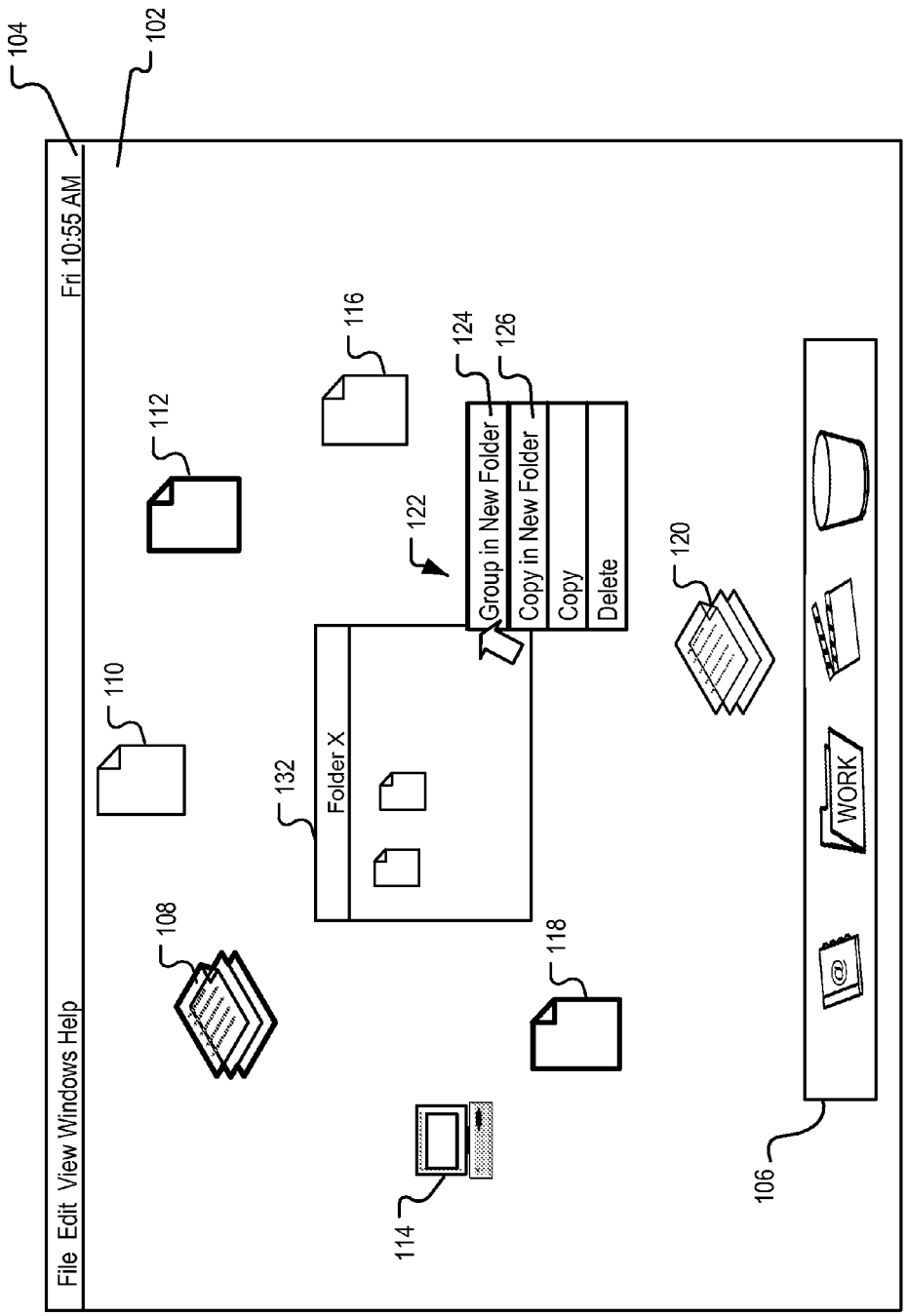
FIGS. 1E-1G illustrate another set of exemplary user interface changes caused by the grouping of multiple items on a free-arranged desktop into a destination folder on the free-arranged desktop.
Figure 1F:
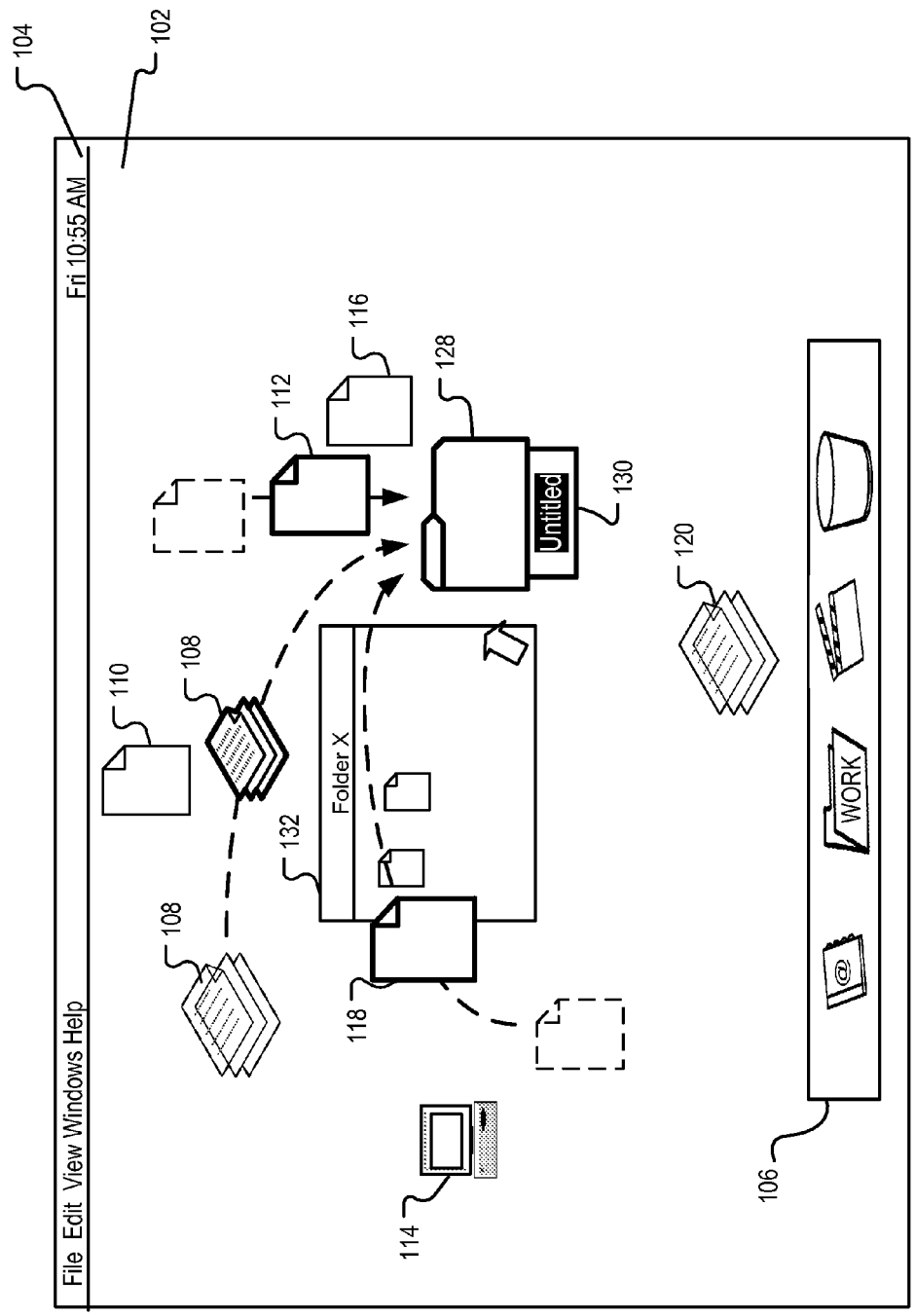
Figure 1G:
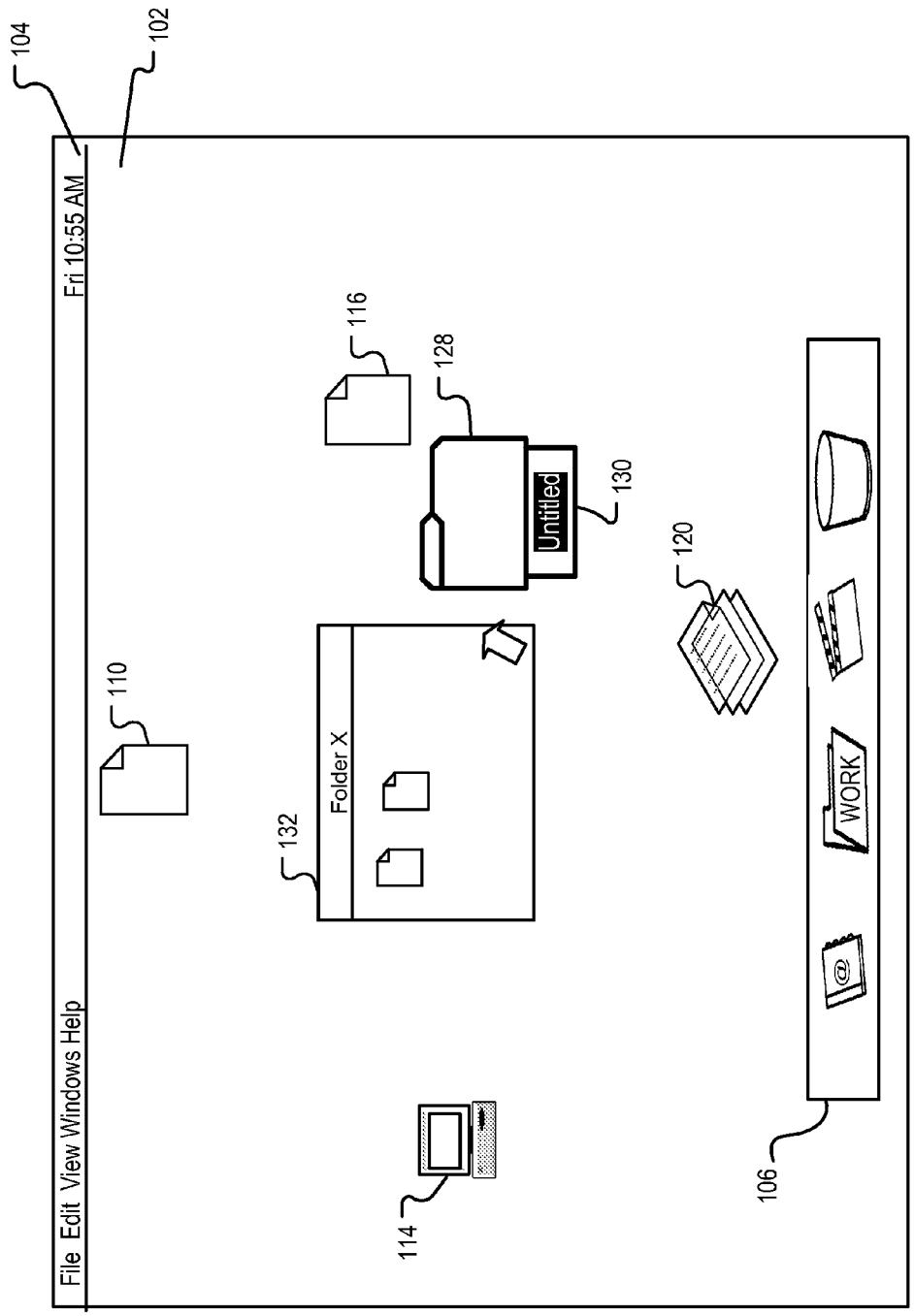

FIG. 1D illustrates the free-arranged desktop 102 after the selected items 108, 112, and 118 have all landed in the new folder 128, and the desktop 102 has stabilized. The user seeing the conclusion of the animation showing the creation of the new folder 128 and the movements of the selected items 110, 112, and 118 into the new folder 128, now has visual confirmation that the file system operations for grouping the selected items into the new folder has been successfully completed. The user can now move the new folder 128 freely on the desktop 102, commit the default name of the new folder, rename the new folder, and/or manipulate the new folder in various manners permitted by the operating system.

In some implementations, as will be described in more details later in the specification, the animation described above can be presented upon a determination that the necessary file system operations for creating the new folder and moving the selected items have been successfully completed with a defined time window. If the file system operations have not been successfully completed within the defined time window, the animation showing the creation of the new folder and the movements of the selected items can be omitted. The user interface can be updated in a usual manner as the file system operations are finally completed or when an error message is generated due to a failed file system operation.

In some implementations, the user can specify an existing folder as the destination folder for the selected items. The existing folder can be located at a default location in the file system. When the user enters a command to send the selected items to the destination folder, the animation showing the selected items flying into a representation of the destination folder along the items' respective paths on the user interface can be presented. In some implementations, the new folder can be created at a default location (e.g., in the next unoccupied grid location on the desktop, in a default folder window, etc.) on the user interface, where the default location is determined independently of the current locations of the selected items.

In some implementations, the destination folder can be already presented in the same user interface (e.g., the desktop) as the selected items and the destination folder does not need to be animated into a folder location on the user interface. In some implementations, the destination folder is not already on the same user interface as the selected items, a representation of the destination folder can be animated into a suitable folder location on the user interface, and after the selected items are shown to enter the destination folder, the destination folder can be shown to animate out of the interface again (e.g., presumably returned to the destination's original location in the file system hierarchy).

In some implementations, when the destination folder is an existing folder in the file system, the only file system operation that needs to be carried out to group the items into the destination folder is a move of the selected items to the destination folder in the file system hierarchy. Even though an animation showing the appearance of the destination folder in the same user interface as the selected items can be displayed, the destination folder needs not be actually moved to a different location (e.g., the desktop folder), and then returned to its original location in the file system hierarchy after the items are moved into the destination folder.

Although FIGS. 1A-1D illustrate a scenario where both the selected items and the destination folder are on a free-arranged desktop, the items can be selected from other user interfaces in the free-arranged layout. For example, the items can be selected from a folder window in the free-arranged layout.

In some implementations, when selecting a suitable folder location for the destination folder, if an initially identified folder location based on a default method (e.g., using the weighted average of the locations of the selected items) is already occupied or obscured by another item or user interface element, the operating system can try to find another unoccupied location that is nearest to the initially identified location and is not obscured by other items or user interface elements.

FIGS. 1E-1G illustrate the user interface changes caused by the grouping of multiple items on a free-arranged user interface into a destination folder on the free-arranged desktop.

In FIG. 1E, a free-arranged user interface (e.g., the free-arranged desktop 102) is presented. For illustrative purposes, the same items are present on the free-arranged desktop 102 as shown in FIG. 1A. However, in FIG. 1E, a folder window 132 is shown to occupy the location at which the destination folder 128 would have been displayed if the folder window 132 did not exist on the desktop 102.

Also shown in FIG. 1E, the user has selected a number of items (e.g., items 108, 112, and 118), and invoked the option to group the selected items into a destination folder via the pop-up menu 122.

As shown in FIG. 1F, a new folder 128 is presented at a location next to the folder window 132. The location can be selected by the operating system which has identified an initial location based on the weighted average of the respective locations of the selected items (e.g., items 108, 112, and 118). The operating system then discovers that the initially identified location has been occupied or obscured by the folder window 132. Therefore, an alternative location that is nearest to the initially identified location and is not currently occupied or obscured by another item or user interface element can be determined. Once the alternative location has been determined, the destination folder 128 can be animated into the alternative location (as shown in FIG. 1F). As shown in FIG. 1F, as the destination folder 128 is animated into the alternative location near the folder window, representations of the selected items (e.g., the items 108, 112, and 118) can be animated along their respective paths into the destination folder 128.

FIG. 1G illustrates that the selected items have all entered the destination folder 128, and the destination folder 128 is shown to settle in at the alternative location near the folder window 132. The user can now move the new folder 128 freely on the desktop 102, commit the default name of the new folder, rename the new folder, and/or manipulate the new folder in various manners permitted by the operating system.

FIGS. 2A-2G illustrate exemplary user interface changes demonstrating the grouping of multiple items within a window representing an arbitrary folder into a destination folder (e.g., a new folder) in a keep-arranged user interface.

A keep-arranged user interface arranges representations of items (e.g., icons of files and/or folders) on an evenly spaced grid. The items can be sorted along grid locations in rows and/or columns according to one or more keep-arranged criterion. For example, the items can be arranged by filename, modification time, file type, file size, and so on. When the user interface is in a keep-arranged state, if new items are introduced into the user interface, or if the attributes associated with a keep-arranged criterion (e.g., a sorting criterion) are changed for one or more items in the user interface, the user interface will be updated to re-organize the items on the user interface according to the one or more keep-arranged criterion and the new values of the attributes.

FIG. 2A shows an exemplary keep-arranged user interface (e.g., an exemplary keep-arranged desktop 202). The items on the exemplary keep-arranged desktop 202 can be arranged according to filename. Other keep-arranged user interfaces are possible, such as a folder window with its content arranged and sorted by increasing file size, or a search result window sorted by file type, and so on.

In the example shown in FIG. 2A, the user has selected items 204, 206, and 208 from a folder window 210. One or more unselected items (e.g., items 205a-c) can also exist in the folder window 210. The folder window 210 is located on the keep-arranged desktop 202. The folder window 210 can be in a free-arranged state or a keep-arranged state. Other items (e.g., items 212a-e) can be located on the keep-arranged desktop 202. The items on the keep-arranged desktop 202 can be laid out along the grid locations of the desktop grid (as indicated by the dashed grid 214) in an order according to their respective filenames, for example.

As shown in FIG. 2A, the user has selected the items 204, 206, and 208, and invoked the option to group the selected items into a new folder through a pop-up menu 216. After the user has made the selection of the grouping option in the menu 216, an animation illustrating the creation of the new folder and the movement of the selected items into the new folder can be presented in the user interface (e.g., the keep-arranged desktop 202).

Figure 2B:
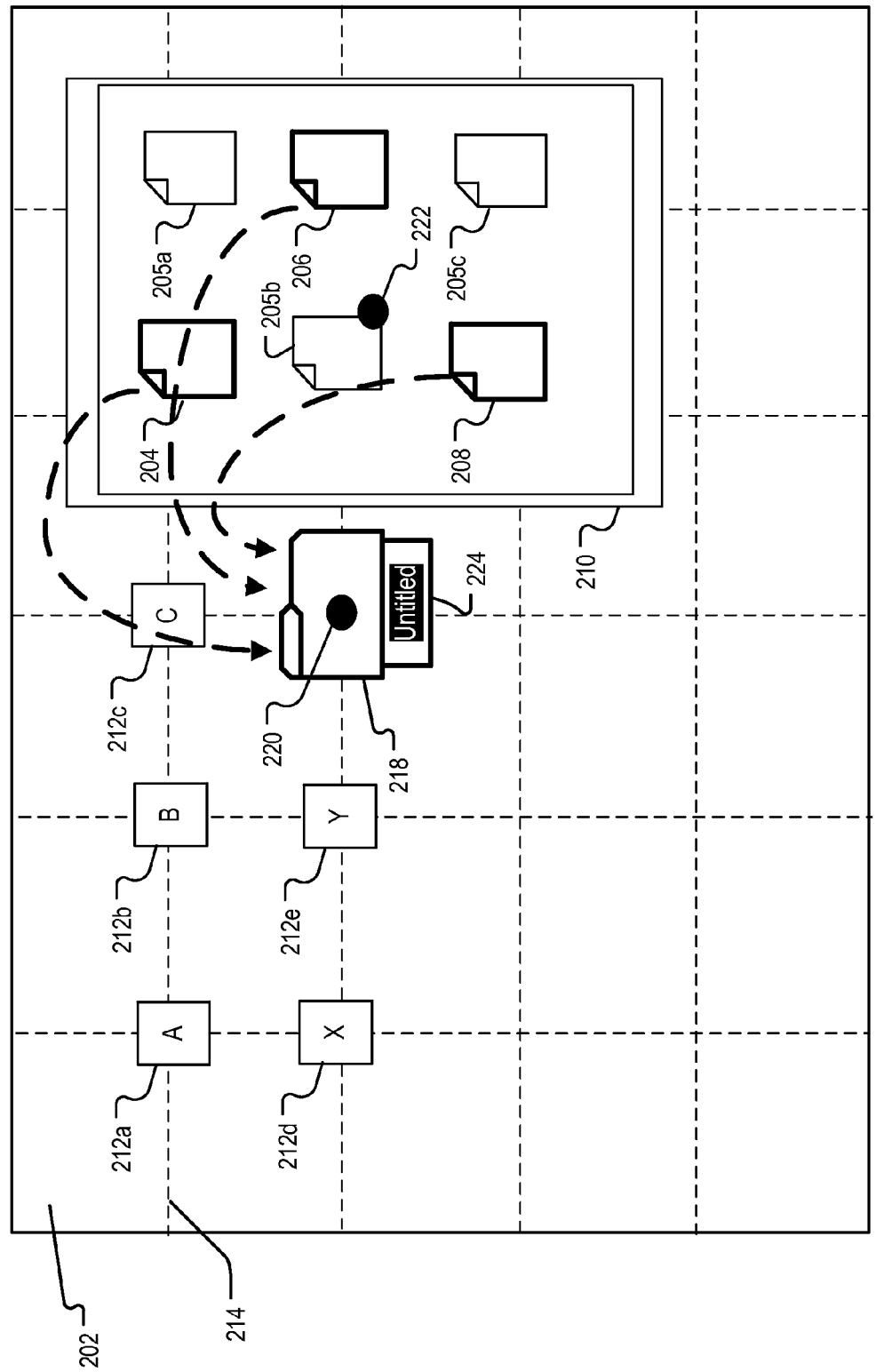

As shown in FIG. 2B, a graphical representation 218 of the new folder has been presented at an initial folder location 220 in the keep-arranged desktop 202. The initial folder location 220 can be at a grid location in the desktop grid 214. In some implementations, the coordinate locations of the selected items can be used to calculate a weighted average location 222 for the selected items, and the grid location that is nearest the weighted average location 222 can be chosen as the initial folder location 220 for the new folder. In some implementations, if the grid location that is nearest the weighted average location 222 is already occupied or obscured by another item or user interface element on the keep-arrange desktop 202, an unoccupied grid point that is nearest the weighted average location and is not obscured by any item or user interface element can be chosen as the initial folder location for the new folder. In some implementations, the representation of the new folder 218 can be shown to pop up from the initial folder location 220 and gradually grow into its final size.

In some implementations, the new folder 218 can be shown with a text label 224 indicating a temporary or default filename, such as "new folder" or "untitled." The user can modify the name of the folder after the animation showing the movement of the selected items into the new folder has been completed.

In some implementations, as shown in FIG. 2B, as the new folder 218 is being animated into the initial folder location 220 in keep-arranged desktop 202 or immediately after the new folder 218 has settled into the initial folder location 220, the representations of the selected items 204, 206, and 208 can be shown to start their take-offs from their respective original locations in the folder window 210. The take-off timings of the items can be slightly different to one another, and the respective paths taken by the items can be different as well.

For example, each of the selected items 204, 206, and 208 can follow a respective path (e.g., a curved path) shown in dashed lines from the items original locations to the initial folder location 220 of the new folder 218. As the representations of the selected items move along their respective paths toward the new folder 218, the appearance of the items (e.g., the size of the items) can change as if the items have been tossed up and away from the desktop plane and then fallen back toward the new folder.

Figure 2C:
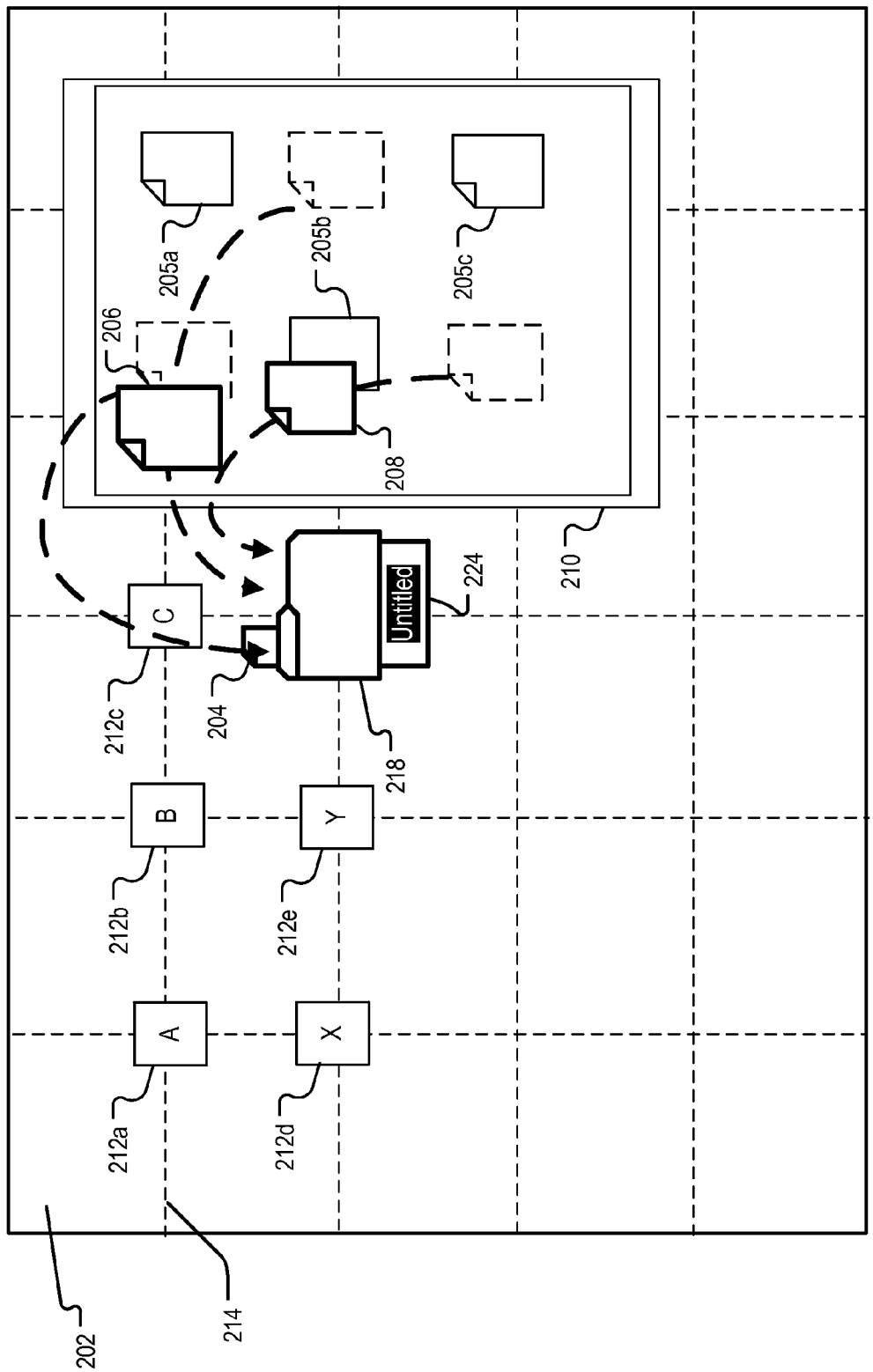

As shown in FIG. 2C, the selected items are moving into new folder 218 along their respective paths. In some implementations, when an item lands into the folder, visual effects, such as a shake or a bounce of the new folder 218, can be shown to indicate the landing or receipt of the item in the new folder 218. Also as shown in FIG. 2C, the items can arrive at the new folder at different times. The movements of the individual items do not have to be synchronized in take-off time, or have the same acceleration, speed, or path shape or length.

Figure 2D:
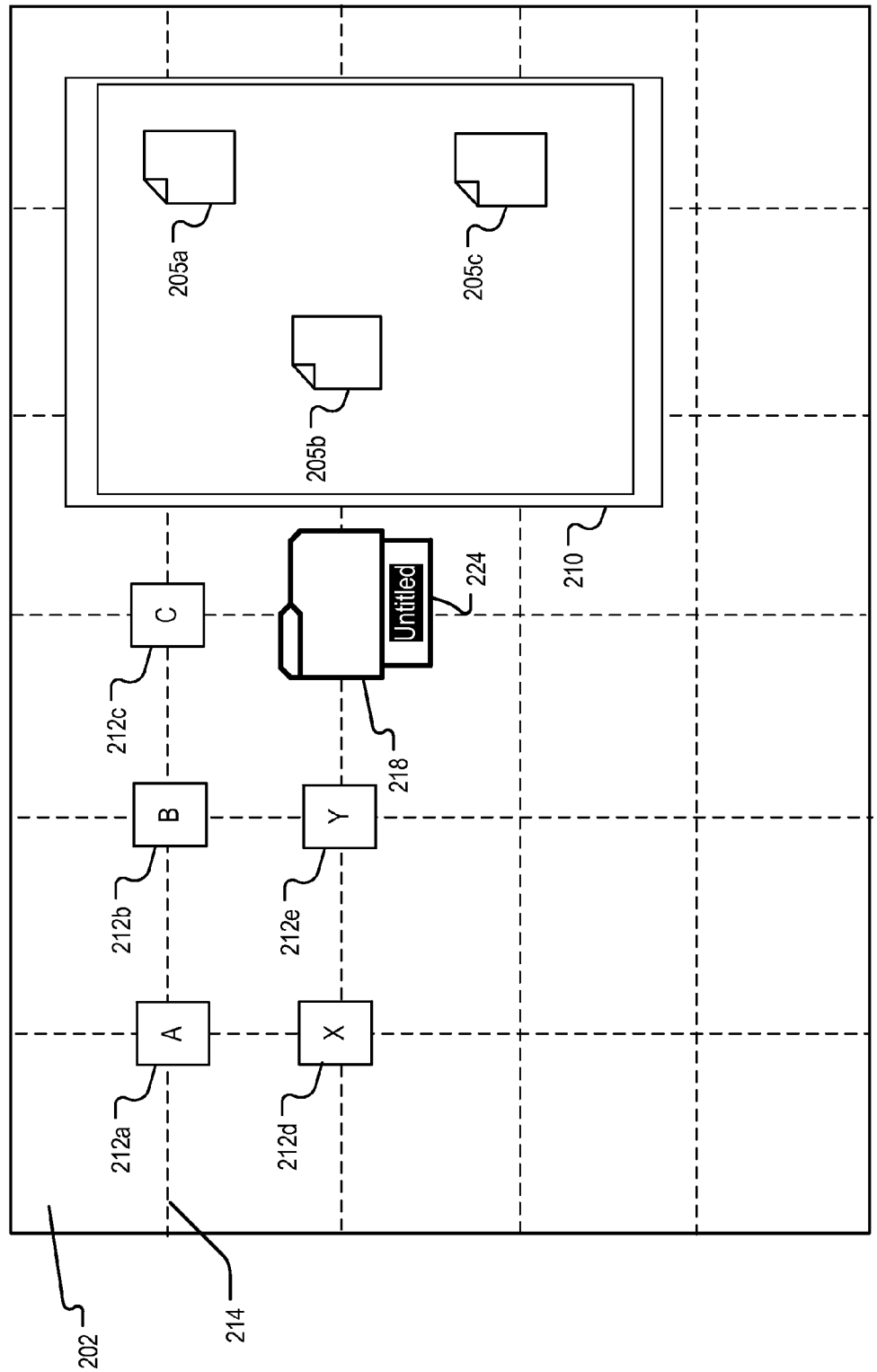

FIG. 2D shows the keep-arranged desktop 202 immediately after all of the selected items have entered the new folder 218, and the user interface has stabilized. As shown in FIG. 2D, if the user has chosen to move the selected items, the selected items are no longer shown in their original locations in the folder window 210. If the user had chosen to copy the items and group the copies of the items into the new folder, the original selected items can be left at their original locations in the folder window 210, and the animation would show the movements of the copies to the new folder 218.

In some implementations, the user can edit or accept the filename of the new folder 218 that is initially shown in the text label 224. Once the user has committed the filename of the new folder 218, the final folder location of the new folder 218 can be determined based on the keep-arranged criteria of the keep-arrange desktop 202. For example, if the items on the keep-arrange desktop 202 are laid out according to their filenames, the items (e.g., the items 212a-e) on the desktop 202 and the new folder 218 can be laid out at consecutive grid locations on the desktop 202 in an order according to the new folder's filename and the respective names of the other items on the desktop 202.

Figure 2E:
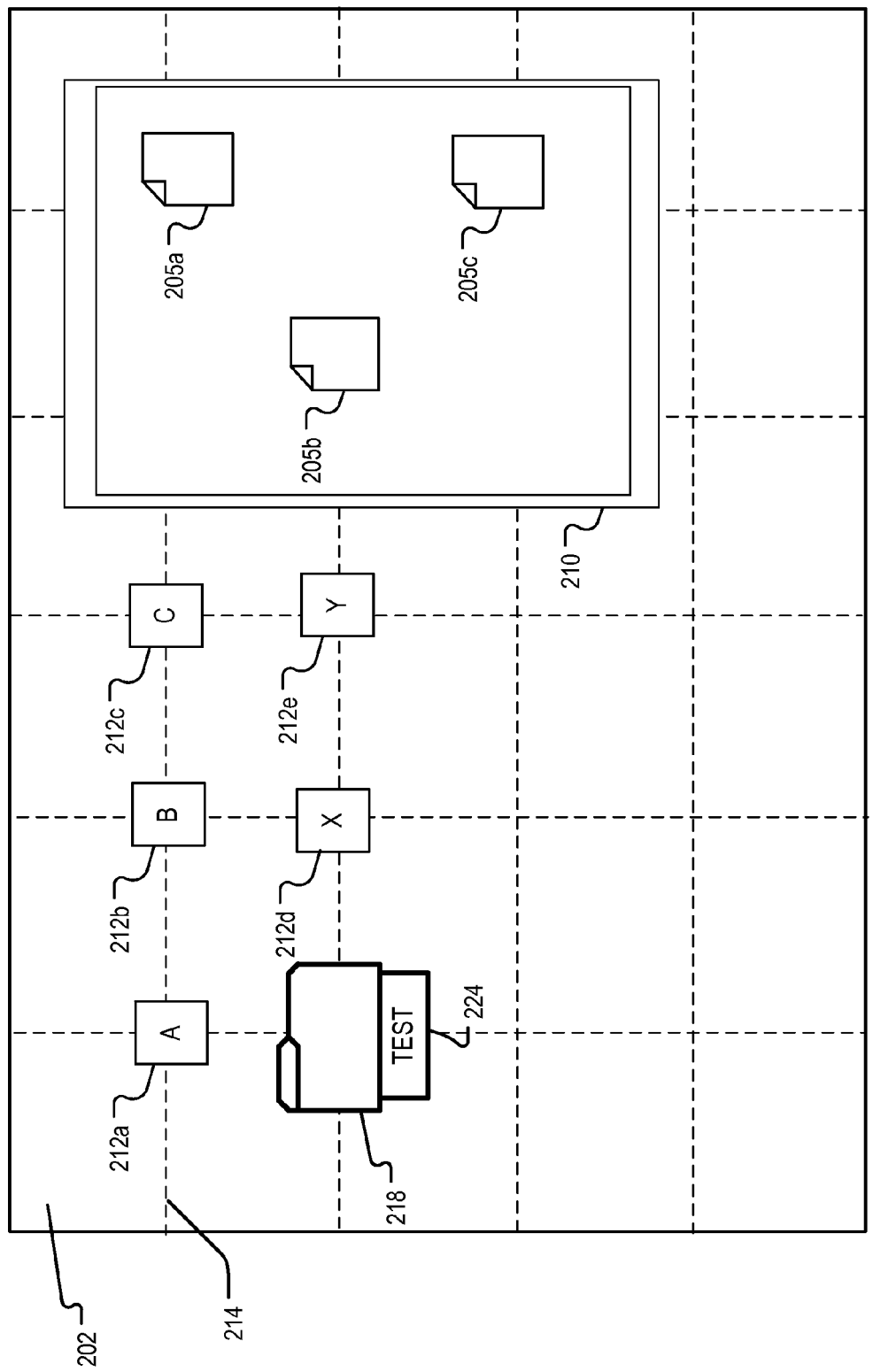

In some implementations, once the final location of the new folder 218 and the new locations of the other items on the keep-arranged desktop 202 are determined according to the keep-arranged criteria of the keep-arrange desktop 202, an animation can be presented showing the other items and the new folder 218 moving to their respective final locations on the desktop 202 from their current locations. The keep-arranged desktop 202 showing items and the new folder 218 arranged at their respective final locations according to the keep-arranged criteria of the keep-arrange desktop are shown in FIG. 2E.

In some implementations, if the folder window from which the items are selected (e.g., the folder window 210) is in a keep-arranged layout, after the selected items are moved out of the folder window into the destination window 218, the remaining items in the folder window can be animated into their final locations based on the keep-arranged criteria of the folder window.

Figure 2F:
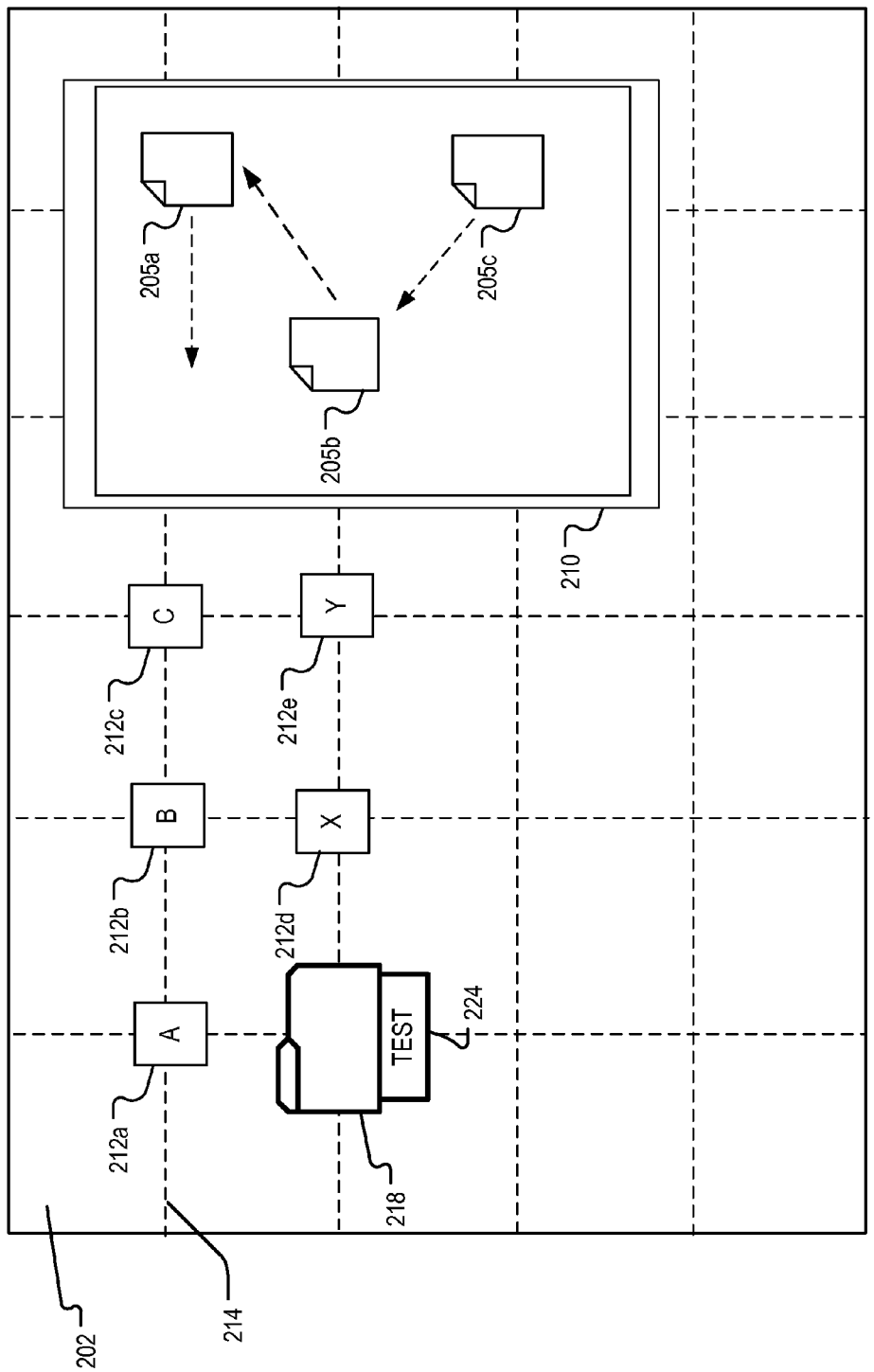
Figure 2G:
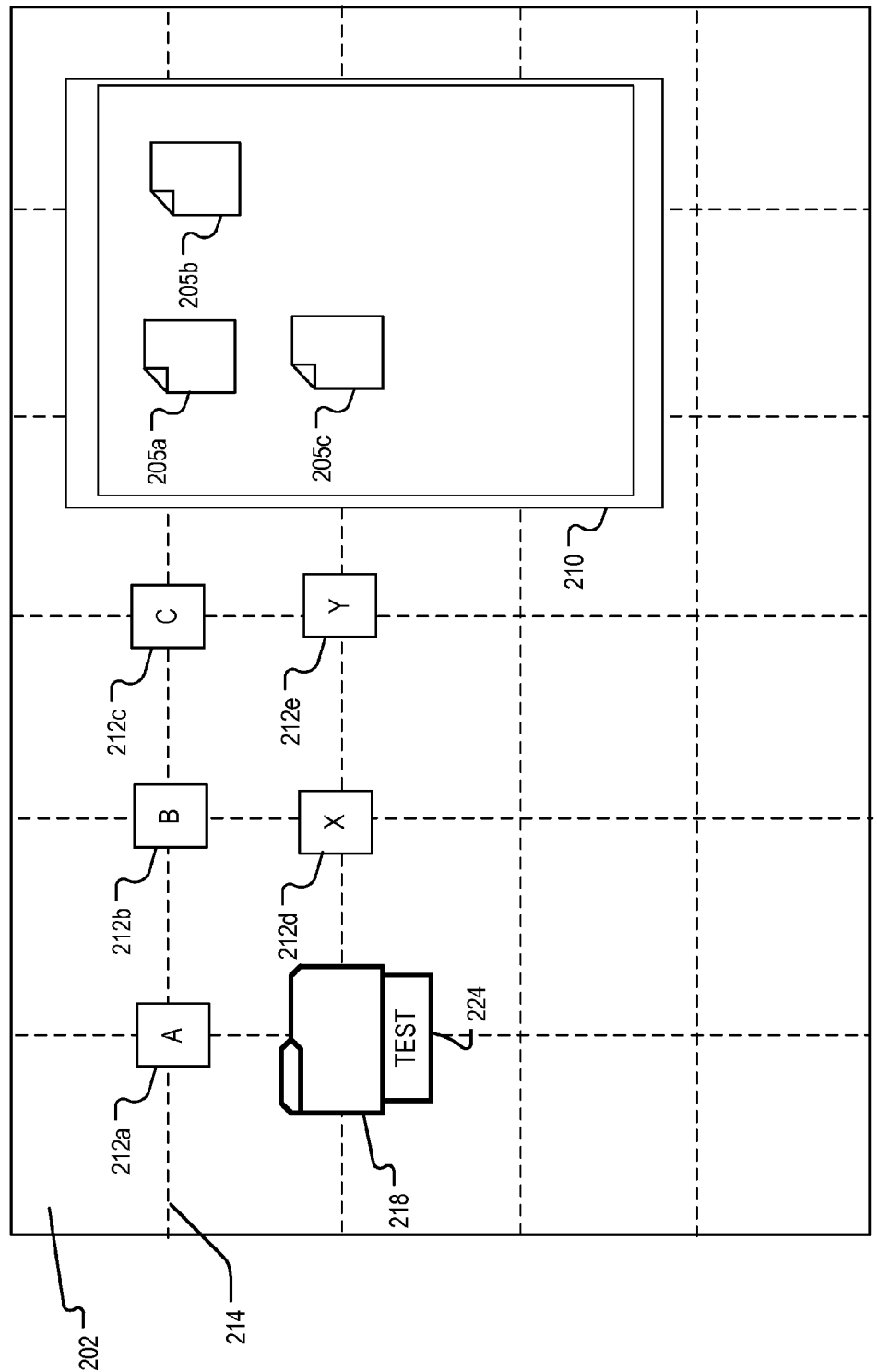

For example, as shown in FIG. 2F, suppose the folder window 210 is in a keep-arranged layout, the remaining items (e.g., the unselected items 205a-c) in the folder window 210 can be shown to move from their respective original locations to their respective final locations along their respective paths (e.g., shown by the dashed lines). FIG. 2G illustrates that the unselected items (e.g., the items 205a-c) have arrived at and settled into their respective final locations in the folder window 210. The respective final locations of the unselected items can be determined based on the keep-arranged criteria associated with the folder window 210.

Although FIGS. 2F and 2G show that the unselected items are animated into their respective final locations after the destination folder 218 have settled into its final location on the desktop 202, the animation showing the movement of the unselected items to their respective final locations can be presented at any time while the animation showing the movement of the selected items are being presented, or after the selected items have settled into the destination folder at the destination folder's initial folder location.

Although FIGS. 2A-2G shows the destination folder being created on the desktop, in some implementations, the destination folder can be created in another type of user interface kept in the keep-arranged state. For example, the destination folder can be created in another folder window (e.g., a default folder window) that is present on the desktop, and the initial folder location of the destination folder can be selected such that the initial folder location is at an unoccupied grid location in the default folder window and is not currently obscured by any other items or user interface elements. After the selected items have entered the destination folder and the user has committed the name of the destination folder, the destination folder and other items in the default folder window can be animated into their respective final locations in the default folder window according to the keep-arranged criteria associated with the default folder window.

In some implementations, the animation showing the creating of the new folder 218 and the movements of the selected items 204, 206, and 208 can be presented only upon determination that the file system operations for creating the new folder in the desktop folder (or another default location in the file system hierarchy) and moving the selected items from their original locations in the file system hierarchy to the new folder are completed successfully within a defined time window. The length of the defined time window can be chosen such that the animation can appear without substantial delay after the user has entered the input to group the selected items. The length of the defined time window are also chosen to be long enough such that most typical file system operations for grouping items can be completed within the defined time window.

In some implementations, the operating system can queue up system events that will cause changes to the user interface (e.g., the desktop) while the operating system waits for a notification indicating the successful completion of the file system operations for creating the new folder and moving the selected items into the new folder or the expiration of the defined time window. If the file system operations are completed within the defined time window, the animation illustrating the creation of the new folder and the movements of the selected items into the new folder in the user interface can be presented, and the system events that will cause changes to the user interface can continue to be queued until the completion of the animation.

After the completion of the animation, the queued system events can be carried out, and the user interface changes caused by the queued system events can be manifested one by one. If the file system operations were not completed during the defined time period, the animation are not presented. The queued system events can be carried out after the defined time window expires and the user interface changes caused by the queued system events can be manifested.

In some implementations, during the wait for the completion of the file system operations and the presentation of the animation, the user interface can be kept responsive to user inputs that do not conflict with the file system operations. For example, during the wait time within the defined time window and during the presentation of the animation, the user can enter inputs to manipulate (e.g., open or delete) other items on the user interface that are not affected by the grouping action, and the user interface would be able to respond to the user inputs.

In some implementations, if the file system operations for creating the new folder and moving the items to the new folder are not completed within the defined time window, the animation illustrating the creation of the new folder and the movements of the selected items to the new folder is not presented in the user interface. The file system operations can take longer than usual and go beyond the defined time window when, for example, items from multiple disk volumes are being accessed, network resources are accessed, a large number of items are being moved, and so on.

When the file system operations continue in the background, the user interface can be kept responsive to user inputs that do not conflict with the on-going file system operations. For example, the user can open a document that is not affected by the grouping action, and work within the document, while the file system operations for grouping the selected items are under way. When the file system operations are completed, the representation of the new folder containing the selected items can be presented at a suitable folder location of the user interface without an animation.

By keeping the file system operations and the user interface changes separate or asynchronous, the user does not have to wait for the file system operations to complete before moving onto other actions in the user interface. In addition, by waiting a defined time window of a suitable duration, the animation can timely illustrate the completion of the file system operations to the user without holding up the user interface when the file system operations take a longer time than usual.

In addition to the icon view of items in a free-arrange user interface and a keep-arrange interface as described above with respect to FIGS. 1A-2G, animations showing the grouping of items into a destination folder can also be presented in a list view interface or a column view interface.

For example, FIGS. 3A-3F illustrate exemplary user interface changes demonstrating the grouping of multiple items from an existing folder into a destination folder (e.g., a new folder) in a list view interface of the existing folder.

Figure 3A:
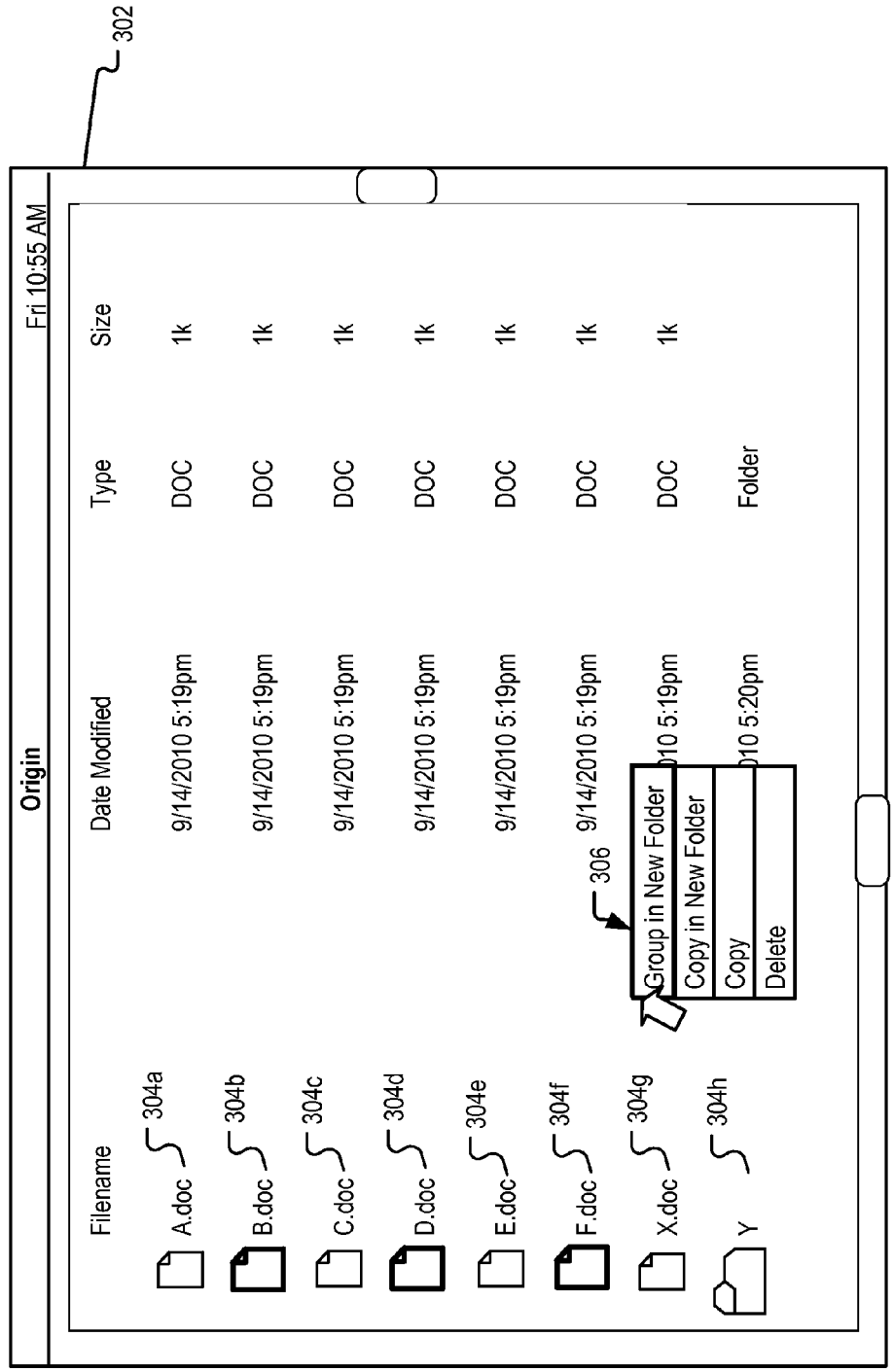

As shown in FIG. 3A, a folder is shown in a list view interface (e.g., in a list view folder window 302 on a desktop). The items shown in the list view interface are items within a folder represented by the folder window 302 (e.g., a folder "Origin"). The items (e.g., items 304a-h) shown in the list view folder window 302 can be files and/or folders. A graphical representation of an item in the list view folder window 302 can include a small icon representing the item and a text label showing the filename of the item. In addition, the items within a list view folder window 302 typically are sorted according to a keep-arranged criterion, such as by filename, by size, by modification time, by item type, and so on.

In the example folder window 302, items 304a-h are arranged by filename. Also as shown in FIG. 3A, the user has selected a few items (e.g., items 304b, 304d, and 304f) from the folder window 302, and chosen the option to group the selected items in a new folder through the pop-up menu 306. In some implementations, the default location of the new folder in the file system hierarchy can be in the original folder from which the items to be grouped were selected.

Figure 3B:
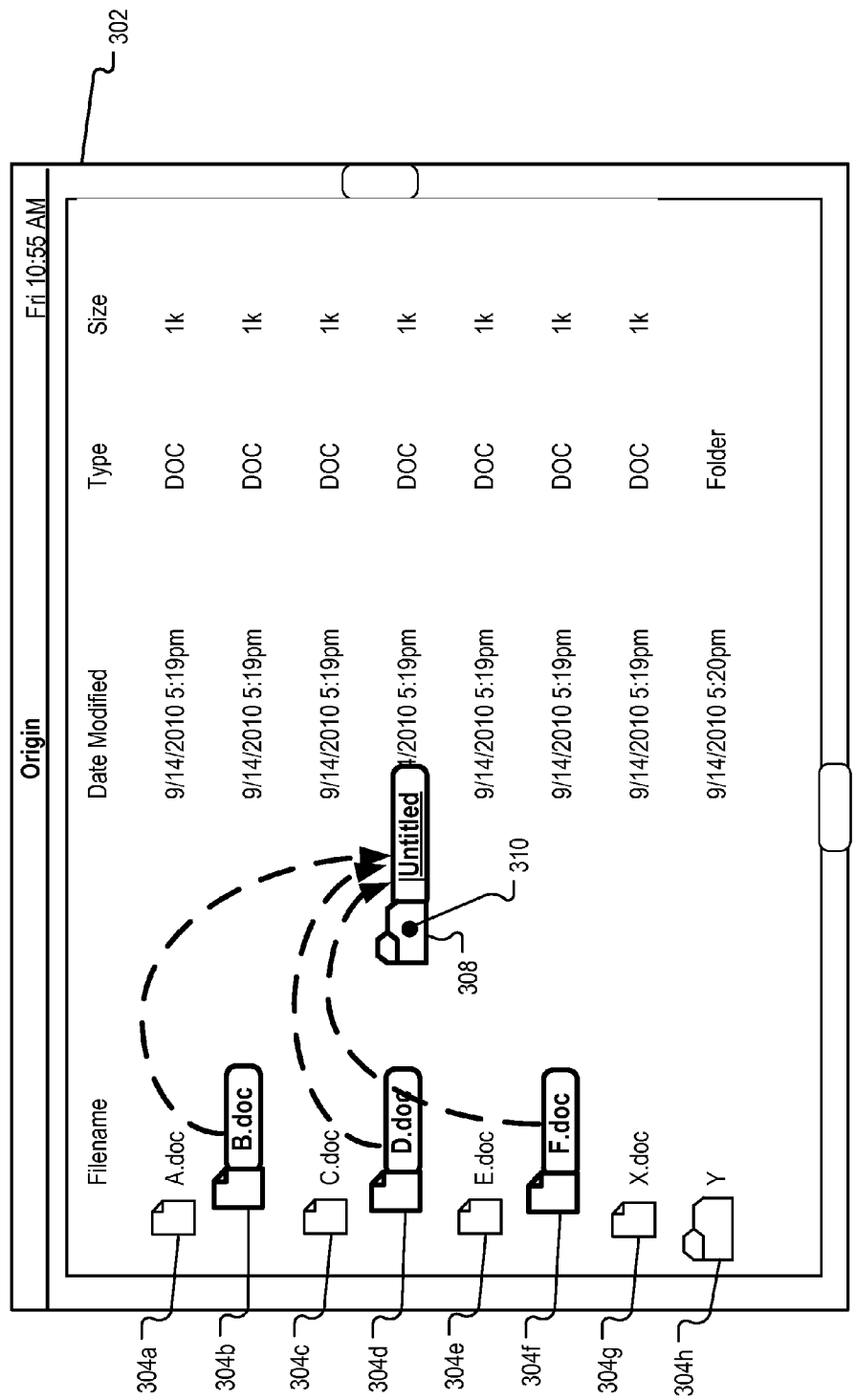

In some implementations, when the user has selected the option to group the selected items in a new folder (e.g., through the pop-up menu 306), an animation showing the creation of the new folder and the movements of the selected items into the new folder can be presented in the user interface. In some implementations, as shown in FIG. 3B, a graphical representation 308 of the new folder can be presented at an initial folder location 310. The initial folder location 310 can be a weighted average of the respective locations of the selected items (items 304b, 304d, and 304f) along the vertical direction. The initial folder location can be chosen to be close to the selected items in the horizontal direction.

In some implementations, the representation 308 of the new folder can be presented at the initial folder location 310 through an animation. The new folder 308 can be shown to pop-up from the initial folder location 310, and grow into its final size gradually. In some implementations, the new folder 308 can also slide into the user interface to the initial folder location 310 along a respective path on the user interface.

In some implementations, the appearance of the new folder 308 can be slightly different from a folder item in the list view interface. For example, the new folder 308 can appear to float above the list view folder window 302 and/or be highlighted. The new folder 308 can include a text label showing a default filename, such as "untitled" or "new folder." In some implementations, the text label can have rounded corners to distinguish from the text labels of items in the list view interface. The differing appearance of the new folder 308 can indicate that the new folder is still in a transitory state and has not been finalized in terms of content, appearance, and/or location.

In some implementations, as the representation of the new folder 308 is settling into the initial folder location 310 near the selected items or immediately after the representations 308 has stabilized at the initial folder location 310 (e.g., as shown in FIG. 3B), the selected items (e.g., items 304b, 304d, and 304o can change their appearances as if they are lifted off of the plane of the list view folder window 302. For example, the selected items can be highlighted and shifted slightly away from their original locations. The text labels of the selected items can also change appearance when the selected items are lifted up. For example, as shown in FIG. 3B, the text labels of the selected items 304b, 304d, and 304f have changed from their original appearances and the corners of the text labels have become rounded.

In some implementations, immediately after the selected items 304b, 304d, and 304f are lifted off of the list view folder window 302, the selected items can move toward the new folder 308 along their respective paths (e.g., as indicated by the dashed curves in FIG. 3B). In some implementations, the motion of the selected items 304b, 304d, and 304f are not synchronized, and the take-off times, speeds, accelerations, and/or path shapes of the selected items can be different from one another.

Figure 3C:
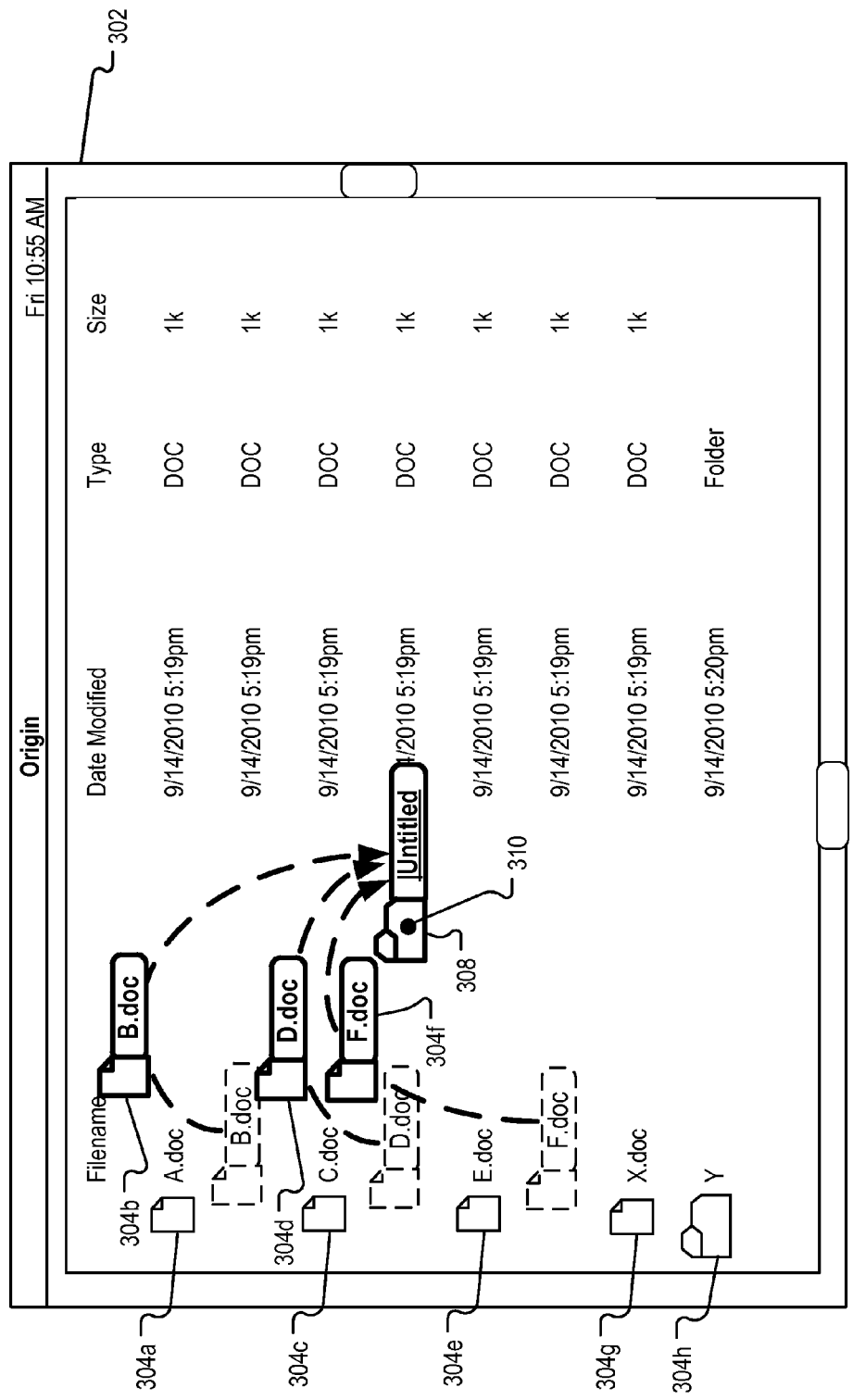

FIG. 3C shows the user interface while the selected items are moving toward the new folder 308 along their respective paths. In some implementations, the path for each selected item can be a curve path starting from the initial location (the location before or after the lift-off) of the selected item and terminating at the new folder 308. In some implementations, the selected items 304b, 304d, and 304f can appear larger at the bends of the curved path than at the initial and end location of the path, imitating the appearance of the item having been tossed up and away from the plane of the list view folder window 302 and then falling back down toward the new folder 308. In some implementations, other types of paths can be implemented, such as a straight path, a zigzagged path, or a floating path leading from the item's initial location to the new folder 308.

Figure 3D:
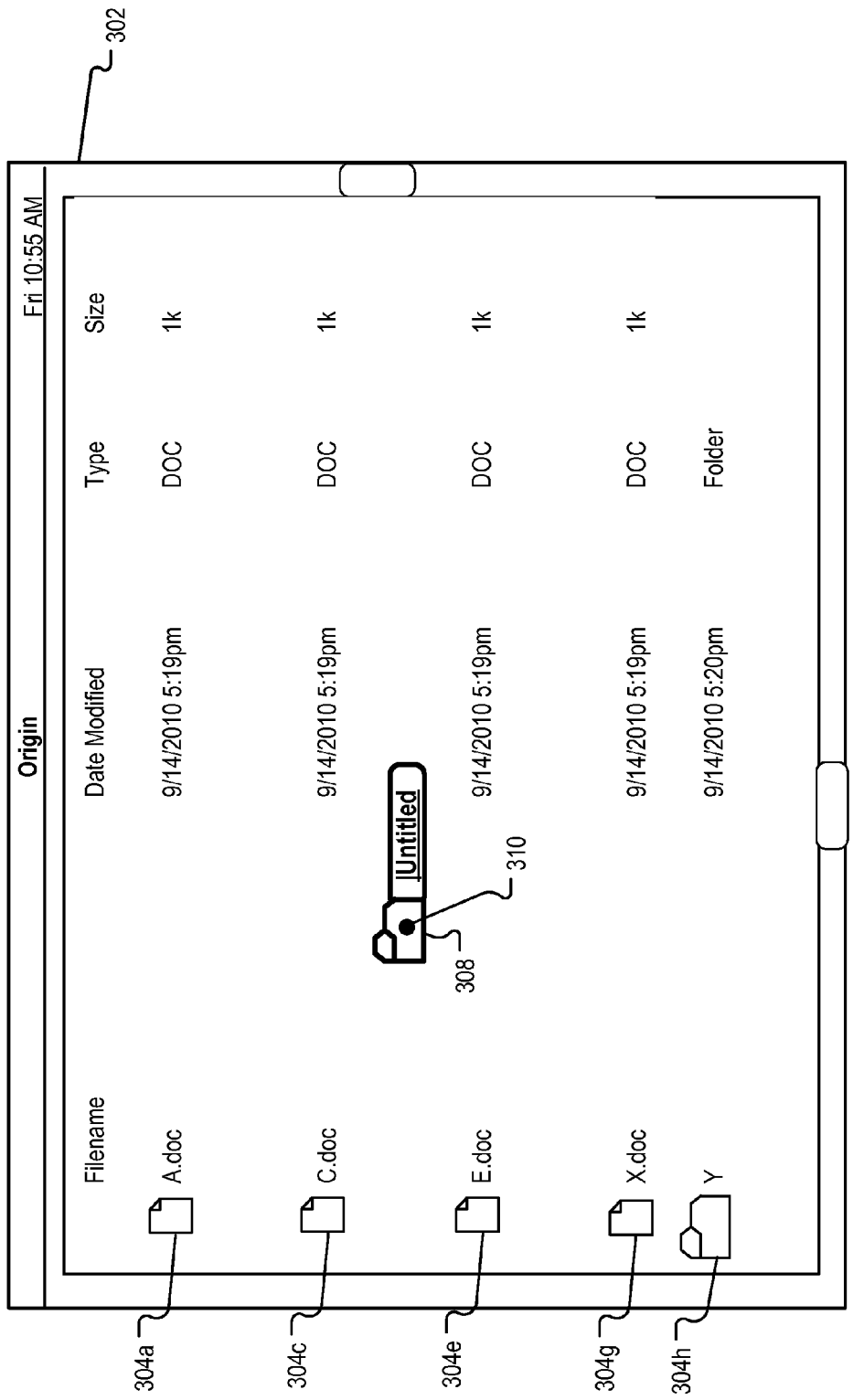

In some implementations, when the items enter the new folder 308, either together or one by one, the new folder 308 can be animated to bounce slightly or shake to visually indicate the receipt of the selected items in the new folder 308. In some implementations, when all the items have entered the new folder 308 at the initial folder location 310 (as shown in FIG. 3D), the user can modify and/or commit the filename of the new folder 308 in the text label of the new folder 308.

Figure 3E:
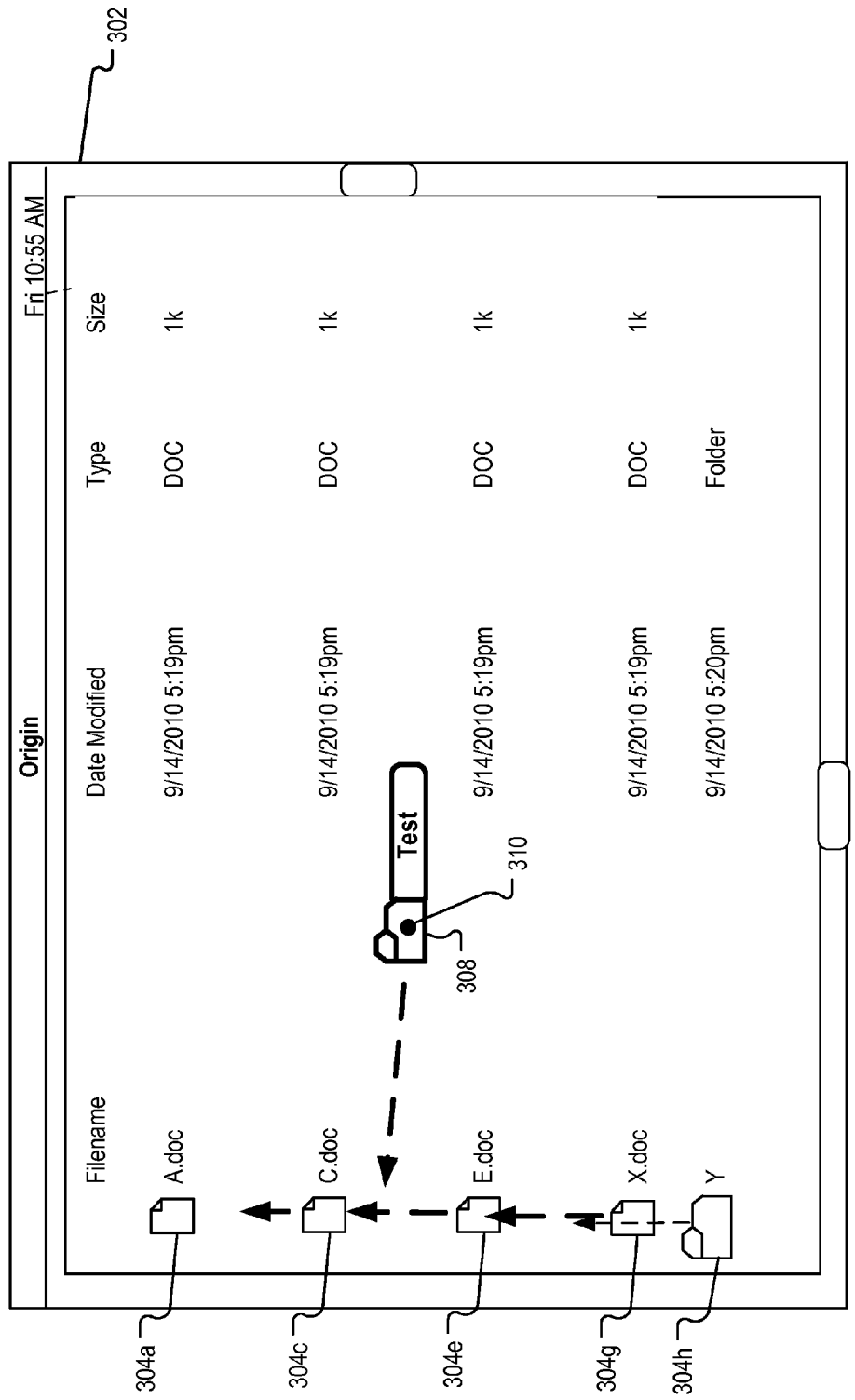

Once the user has committed the filename (e.g., "Test") of the new folder 308 (e.g., as shown in FIG. 3E), the operating system can determine a final location for each remaining item (e.g., items 304a, 304c, 304e, 304g, and 304h) and the new folder 308 in the list view folder window 302 according to the keep-arranged criterion of the list view folder window 302. For example, if the keep-arranged criterion of the list view folder window 302 is sorting by filename, the order by which the remaining items 304a, 304c, 304g, and 304h and the new folder 308 are: item 304a, item 304c, new folder 308, item 304g, and item 304h.

In some implementations, once the operating system has determined the final locations for the remaining items 304a 304c, 304g, and 304h and the new folder 308 in the list view folder window 302, an animation can be presented to show the movement of the remaining items and the new folder 308 from their current locations to their respective final locations. The paths taken by the items and the new folder 308 are indicated by the dashed lines shown in FIG. 3E. Although straight paths are shown in FIG. 3E, other paths shapes are also possible.

As shown in FIG. 3F, after the remaining items and the new folder are moved to their respective final locations, the list view window shows the remaining items and the new folder in an order sorted according to the keep-arranged criterion of the list view folder window 302. The user can open the new folder 308 to see the selected items in the new folder 308.

In this example, the user had selected to move the selected items to the new folder 308, therefore, the selected items no longer appear the in the list view folder window 302 of the "Origin" folder. If the user had selected the option to make copies of the selected window and group the copies into the new folder. The selected items can remain in the list view folder window 302, and the copies are moved along their respective paths to the new folder 302. In addition, when the user has committed the filename for the new folder 308, the new folder can be inserted into its final location among the remaining items in the list view window 308 according to the keep-arranged criterion of the list view folder window 302.

FIGS. 3A-3F illustrate merely one set of exemplary user interface changes that can be implemented to show the grouping of multiple selected items into a destination folder in a list view interface. FIGS. 3G-3L illustrate another set of exemplary user interface changes that can be implemented to show the grouping of multiple selected items into a destination folder in a list view interface.

Figure 3G:
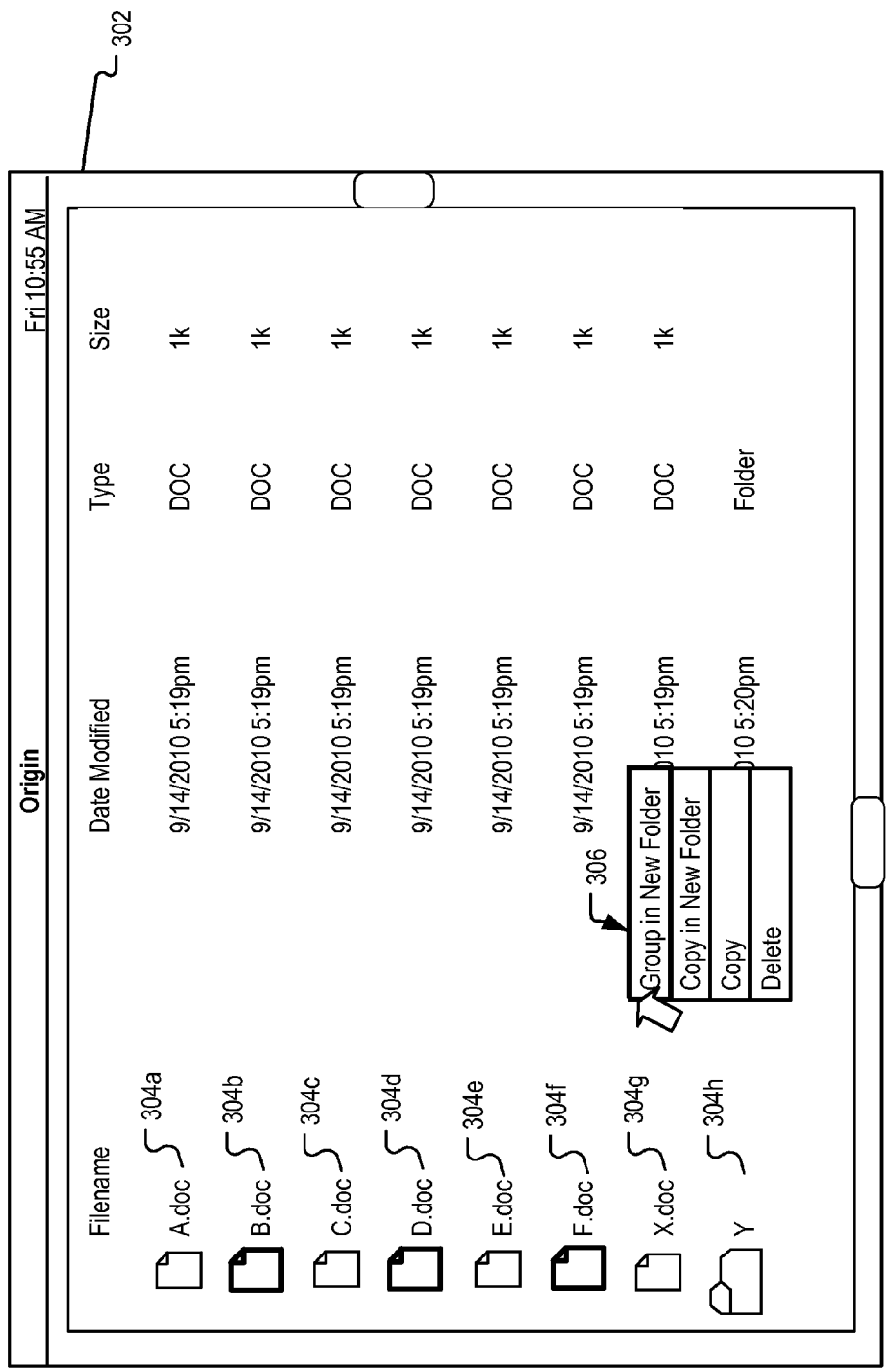

For illustrative purposes, FIG. 3G shows the same list view interface (e.g., the list view folder window 302) as FIG. 3A. As shown in FIG. 3G, the user has selected a number of items (e.g., the items 304b, 304d, and 304f) from the folder window 302. The user has also invoked the option to group the selected items in a new folder through the pop-up menu 306.

Figure 3H:
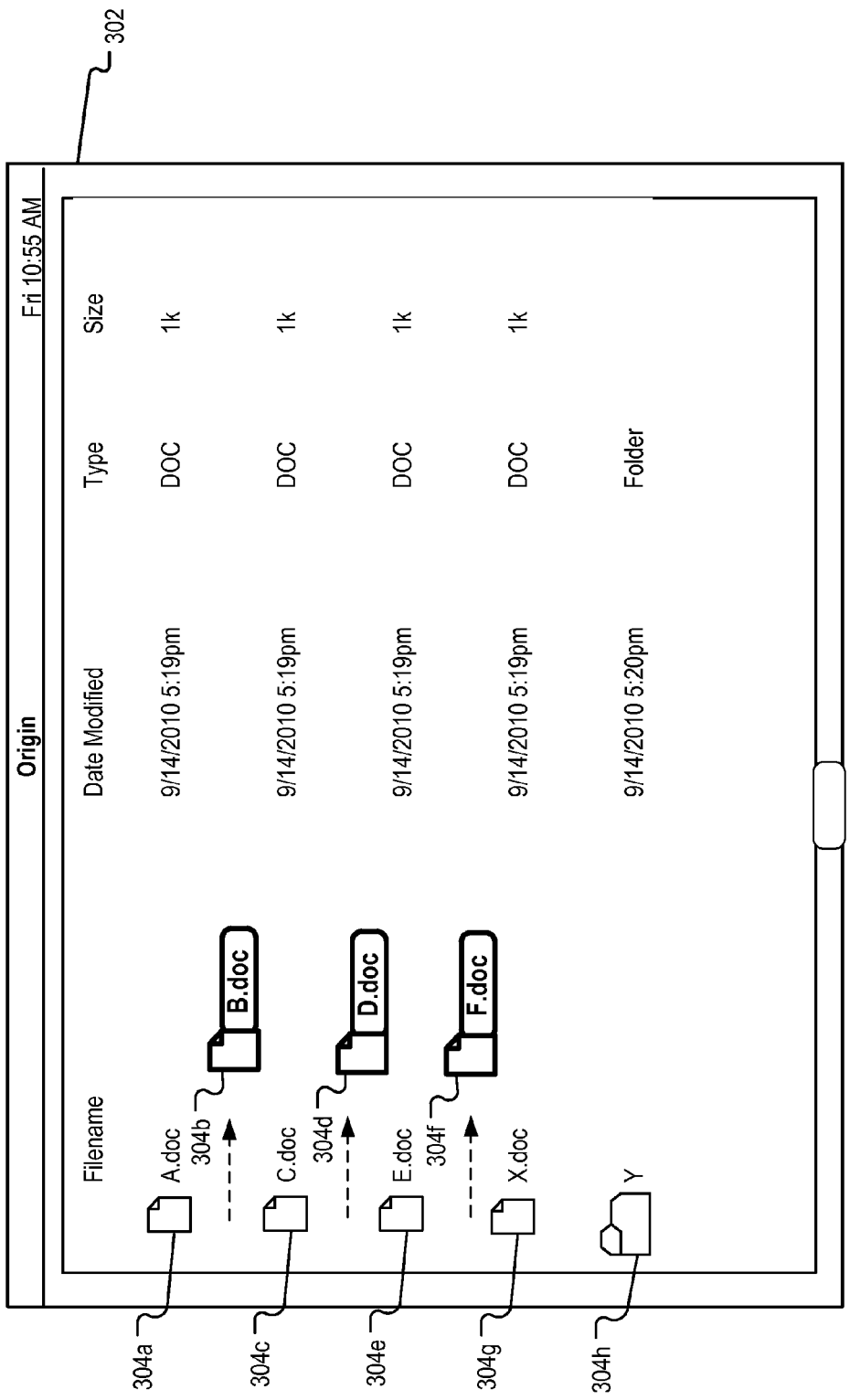

In response to the user's command to group the selected items, the representations of the selected items (e.g., the items 304b, 304d, and 3040 can be shown to be lifted off from the folder window 302, and moved to another location (e.g., to the right of their original locations as indicated by the dashed lines), as shown in FIG. 3H. In some implementations, the appearances of the items' representations can change as well. For example, the icons and the text labels of the selected items can be highlighted or shown with rounded corners. The change in appearance in the selected items can be used to indicate the transitory state that the selected items are currently under. In some implementations, the textual information that are commonly displayed for the selected items (e.g., the items 304b, 304d, and 3040 can be removed from the user interface (e.g., the folder window 302) as well.

Figure 3I:
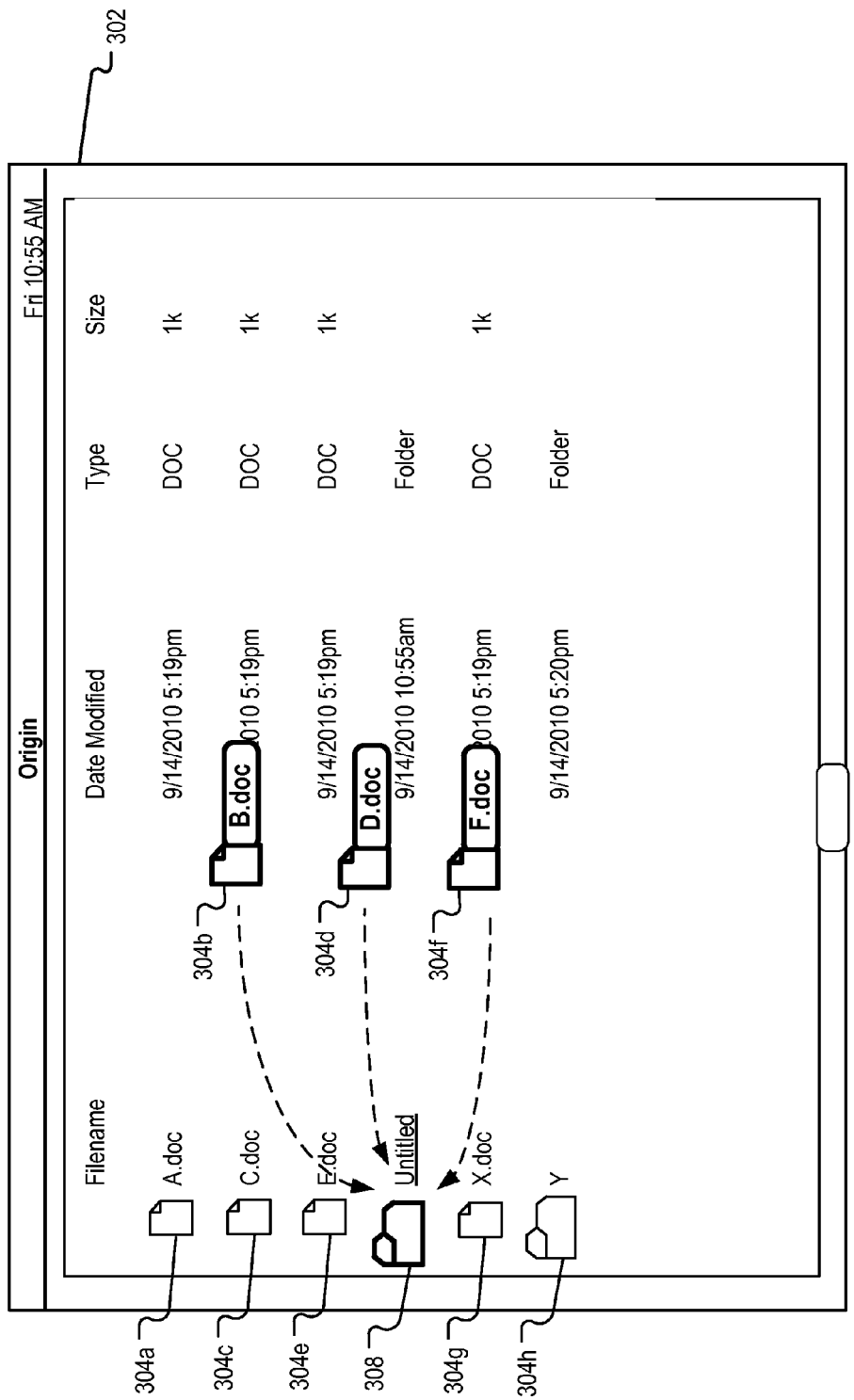

As shown in FIG. 3I, as the representations of the selected items are animated toward the right side of the folder window 302, a destination folder 308 can be shown to animate into an initial folder location of the destination folder 308. In some implementations, the destination folder 308 can be given a default name (e.g., "untitled"). If the folder window 302 is associated with a keep-arranged criterion based on filename, the initial folder location can be determined based on the default name of the destination folder and the remaining items (e.g., the unselected items 304a, 304c, 304e, 304g, and 304h) in the folder window 302. In this example, the initial folder location of the destination folder 308 is between the item 304e (e.g., a document named "E") and the item 304g (e.g., a document named "X").

In some implementations, other keep-arranged criterion associated with the folder window 302 can be used, such as by file type, modified time, etc. In some implementations, other textual information (e.g., filename, modification time, file type, size, etc.) related to the destination folder that is commonly displayed in the list view folder window 302 can be displayed as well, as shown in FIG. 3I.

Also shown in FIG. 3I, once the destination folder 308 has appeared at its initial folder location in a stable form (e.g., when the destination folder 308 has grown to its final size), the representations of the selected items (e.g., the items 304b, 304d, and 3040 can be shown to move toward the destination folder 308 along their respective paths (e.g., as indicated by the dashed lines).

In some implementations, the respective speeds and accelerations of the representations of the selected items (e.g., the items 304b, 304d, and 3040 can be different from one another. For example, the representation of a selected item that is closer to the destination folder 308 can be shown to take off earlier and move faster than the representation of another selected item that is farther away from the destination folder 308.

FIG. 3J shows that the representations of the selected items have entered the destination folder 308 at the initial folder location. In some implementations, the user is given an opportunity to commit the name of the destination folder 308. For example, the default folder name that has appeared next to the destination folder 308 can be highlighted or underlined to indicate that it can be modified or accepted. The user can accept the default name given to the destination folder 308. If the user accepts the default name given to the destination folder 308, the destination folder 308 can remain in its current location, and the initial folder location of the destination folder 308 can become the final folder location of the destination folder 308.

Figure 3K:
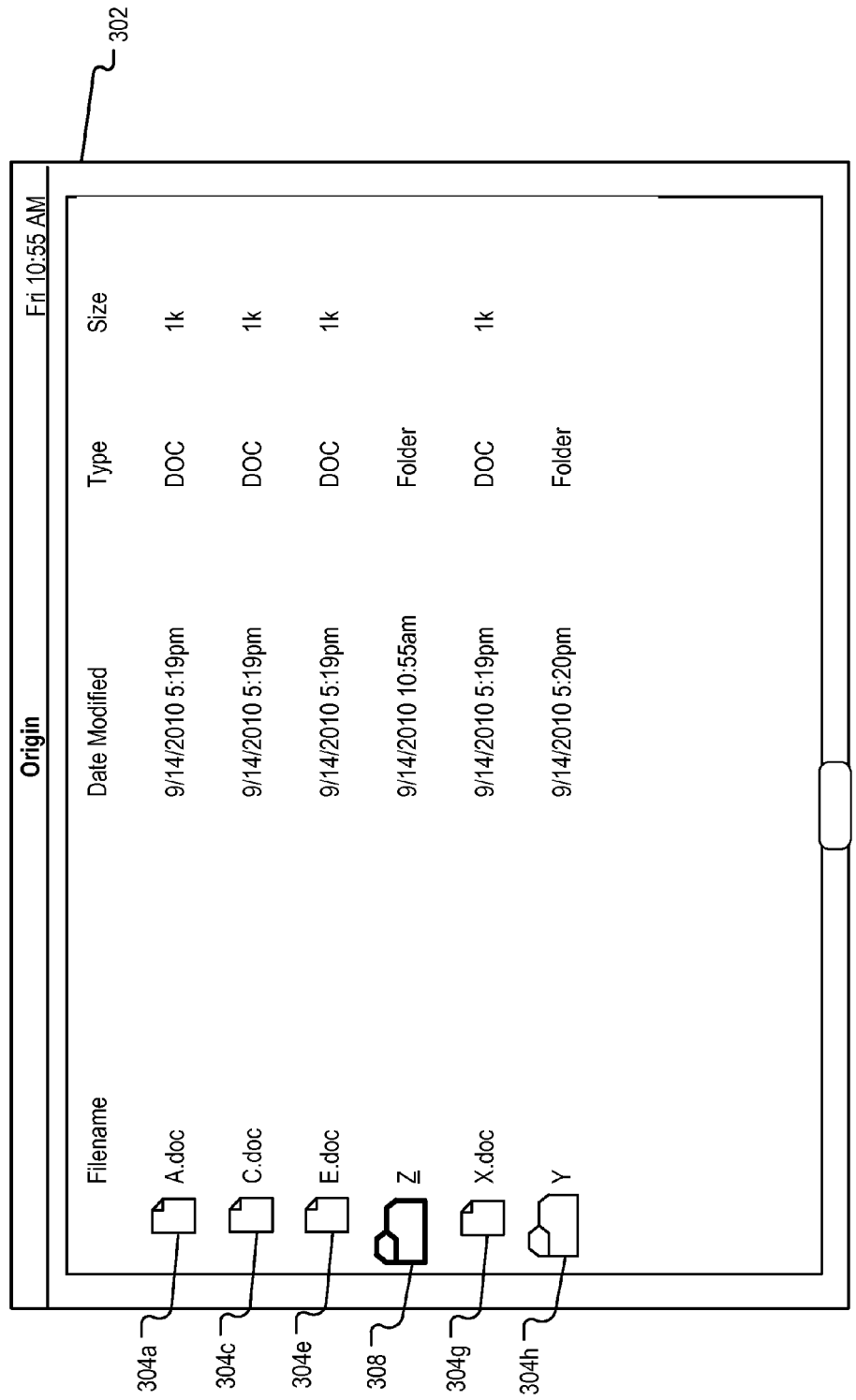
Figure 3L:
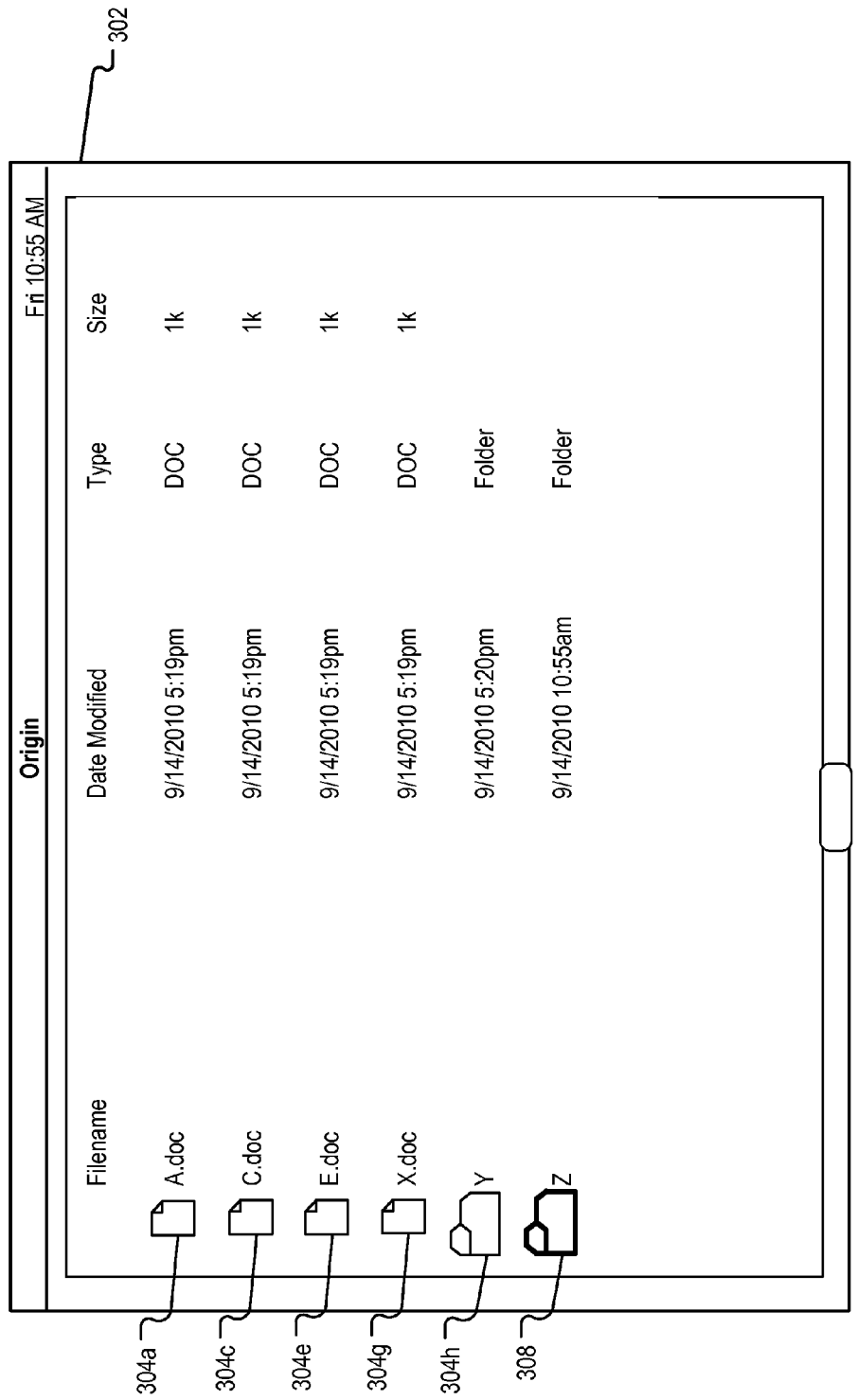

If the user does not accept the default name for the destination folder, the user can enter a new folder name for the destination folder, for example, by typing the new folder name into the space currently displaying the default folder name. As shown in FIG. 3K, the user has entered a different folder name (e.g., "Z") for the destination folder 308. Once the user commits the new folder name (e.g., by entering a pre-defined command such as "Enter"), the destination folder 308 and the other items currently displayed in the folder window 302 can be rearranged according to the keep-arrange criteria associated with the folder window and the new folder name that the user has entered. For example, as shown in FIG.

3L, the destination folder 308 and the remaining items (e.g., the unselected items 304*a*, 304*c*, 304*e*, 304*g*, and 304*h*) have been rearranged according to their filenames. An animation can be presented to show the destination folder 308 and the remaining items (e.g., the unselected items 304*a*, 304*c*, 304*e*, 304*g*, and 304*h*) in the folder window moving from their current locations to their final locations determined based on the keep-arranged criteria associated with the folder window 302.

In some implementations, as described with respect to the icon view of the user interfaces shown in FIGS. 1A-2E, the animation can be presented in the list view interfaces when it is determined that the file system operations can be completed within a defined time window. In some implementations, the user interface can be kept responsive to user inputs that do not interfere with the file system operations, while the file system operations are underway.

In some implementations, as described above with respect to the free-arranged and the keep-arranged user interfaces in the icon view, operating system events that would affect the user interfaces can be queued during the defined time window and/or while the animation is being presented in the user interfaces. After the expiration of the defined time window or the completion of the animation, the queued system events can be carried out and the user interface changes caused by the queued system events can be manifested.

FIGS. 4A-4E illustrate exemplary user interface changes demonstrating the grouping of multiple items from an existing folder into a destination (e.g., a new folder) in a column view interface.

FIG. 4A shows an exemplary folder in a column view interface. A column view folder window 402 for an existing folder (e.g., folder "Practice") can be shown on a desktop when a user opens the existing folder and chooses to view the content of the existing folder in a column view. The column view folder window 402 can include one or more columns (e.g., columns 404 and 406). Each column can correspond to a respective level in the file system hierarchy and be associated with a respective parent item from a parent level of the respective level in the file system hierarchy. Consecutive columns in the column view folder window correspond to consecutive levels of the file system hierarchy.

For example, in the column view folder window 402, column 404 can be associated with the parent item of a currently selected folder "Practice" and present all child items of the parent item (e.g., folders "Work," "Play," and "Practice"). Column 404 can correspond to a first level of the file system hierarchy, while column 406 adjacent to the column 404 to the right can correspond to a second level of the file system hierarchy that is one level below the level that corresponds to the column 404. The user can select an item from the column 406 to cause child items of the selected item to be presented in a new column added to the right of the column 406. The user can continue to select another item from the new column to explore further down the file system hierarchy. At any given time, the rightmost column shown in the column view folder window 402 can display child items of a currently selected item from the column adjacent to the rightmost column to the left. In FIG. 1A, no item is currently selected from the column 406 for further expansion, and the column 406 exists as the rightmost column in the column view folder window 402.

In some implementations, as the user explores down the file system hierarchy level by level from an initially selected item shown in a leftmost column (e.g., the column 404) of the column view folder window 402, multiple additional columns can be added to the column view folder window 402 one by one to the right side of the column view folder window 402. If the viewable area of the column view folder window 402 does not have enough space to show all columns that are currently open, the columns associated with the higher levels of the file system hierarchy can be moved out of view to the left to make room for the newly added columns. A horizontal scroll bar 408 can be presented that allows the user to being the columns that are moved out of the viewable area of the column view folder window back into the viewable area of the column view folder window 402.

In some implementations, the grouping of multiple selected items described with respect to the icon view and the list view user interfaces can be accomplished in the column view interface as well. As shown in FIG. 4A, the user has selected multiple items (e.g., items 410, 412, and 414) from a column (e.g., column 406) in the column view folder window 402. The column (e.g., the column 406) may also present one or more unselected items (e.g., items 411*a-d*). While the items (e.g., the items 410, 412, and 414) remain selected, the user can invoke the input command for grouping the items in a new folder, for example, through a menu option in a pop-up menu 416.

After the user has entered the input command to group the selected items in a column, an animation illustrating the creation of the new folder and the movement of the selected items into the new folder can be presented. In some implementations, the items shown in each column of the column view interface can be sorted according to one or more keep-arranged criteria (e.g., filename, type, etc.). In some implementations, the new folder can be given a default or temporary filename. After the user has entered and committed the filename for the new folder, another animation can be presented to illustrate the movements of the new folder and the remaining items in the column to their respective final locations that have been determined based on the one or more keep-arranged criteria of the column view folder window 402. In some implementations, the keep-arranged criteria can be column specific for each column in the column view folder window.

Figure 4B:
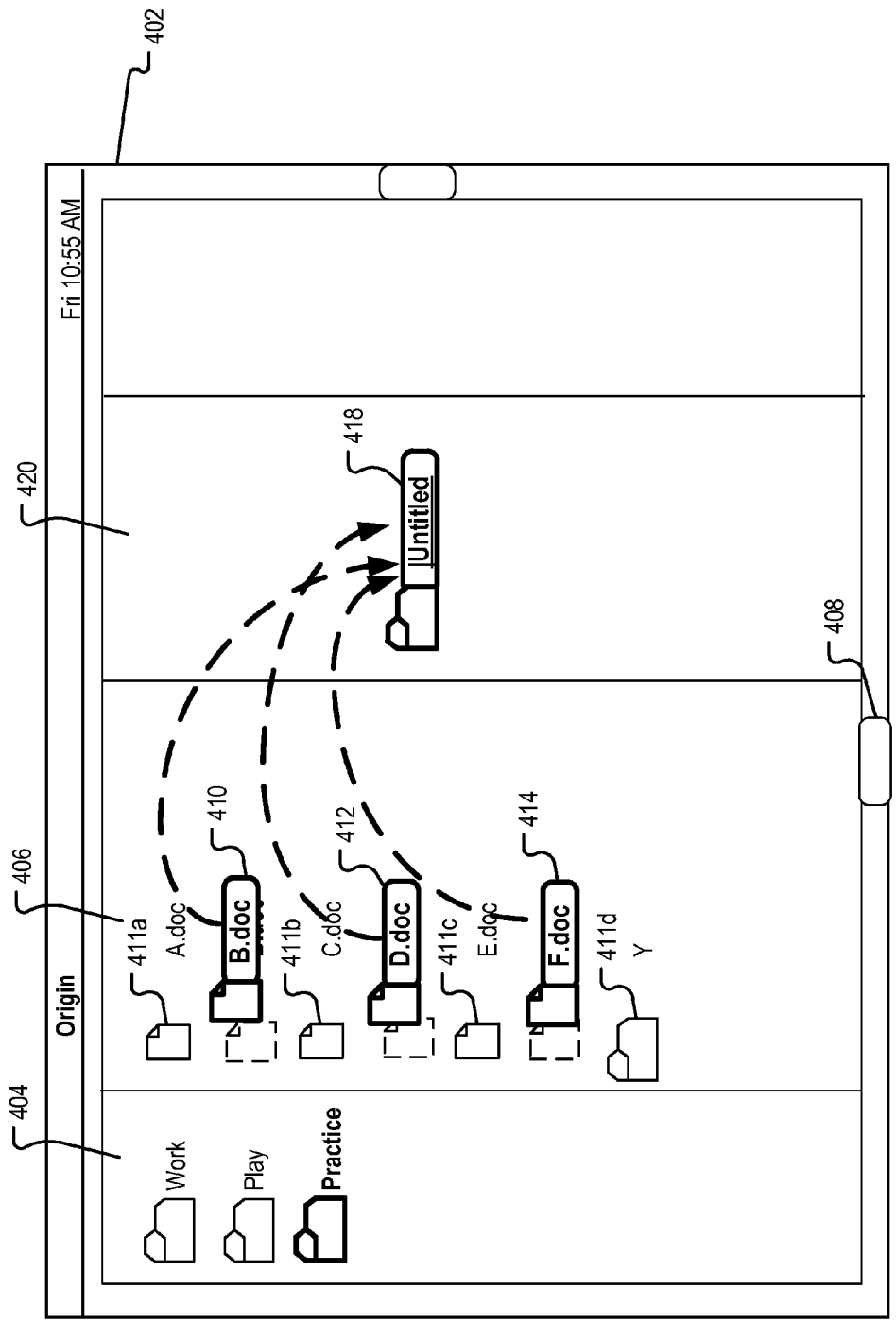

FIG. 4B illustrates that, after the user has entered the input command to group the selected items in a new folder, a representation 418 of the new folder can be presented in the column view folder window 402. In some implementations, a new column 420 can be added to the right of the previous rightmost column (e.g., the column 406) of the column view folder window 402, and the representation of the new folder can be shown within the new column 420. In some implementations, if there isn't enough space in the viewable area of the column view folder window 402, the leftmost columns can be shifted left and out of the viewable area of the column view folder window 402 to make room for the new column 420.

In some implementations, the representation of the new folder 418 can be animated into an initial folder location in the new column 420. For example, the representation of the new folder 418 can pop-up from the suitable folder location like a mushroom, and grows into its final size. The appearance of the representation 418 for the new folder can be slightly different from that of other folders in the column view folder window 402. For example, the representation 418 of the new folder can appear to be highlighted or raised up from the plane of the column view folder window 402. The text label of the new folder can appear with rounded corners. The different appearance of the new folder can indicate that the new folder is in a transitory state.

In some implementations, the initial folder location of the new folder in the new column 420 can be determined based on the locations of the selected items in the adjacent column to the left. For example, the vertical position of the new folder 418 in the new column 420 can be a weighted average of the vertical positions of the selected items in the adjacent column (e.g., column 406) to the left of the new column 420. Other methods of determining the location of the new folder in the new column are possible. For example, the new folder can be shown in the top area, middle area, or the bottom area of the new column 420 in various implementations.

In some implementations, as shown in FIG. 4B, as the representation of the new folder 418 is being animated into the column view folder window 402 or immediately after the representation 418 settles into the initial folder location, the selected items in the column 406 can appear to be lifted off from their original locations and raised above the plane of the column view folder window 402. The raised items are ready to take-off and move toward the representation of the new folder 418 along their respective paths.

In some implementations, the respective paths by which the selected items reach the new folder 418 can be curved paths originating from the respective initial locations of the selected items and terminating inside the new folder 418. Exemplary paths for the selected items are indicated in FIG. 4B in dashed lines. The respective initial locations of the selected items can be the items' respective locations either before or after the initial lift-off. In some implementations, paths of other shapes are possible. For example, the selected items can travel in a straight line, a wavy line from their initial locations to the new folder as well.

In some implementations, the take-off time of each selected item can be slightly different from the take-off times of other selected items. In some implementations, the item that is located closest to the new folder 418 can take-off first, followed by items that are located at increasing distances from the new folder 418. In some implementations, the speeds, accelerations, and path shapes of the different selected items can be different as well.

By allowing variations to the take-off times, speeds, accelerations, and path shapes of the different selected items, the movements of the different items can appear more natural, and the order by which the items enter the new folder can be controlled. In addition, clashing of the items at the entrance of the new folder can be avoided. In some implementations, visual effects showing items braking near the entrance of the new folder to give way to another item can be implemented.

Figure 4C:
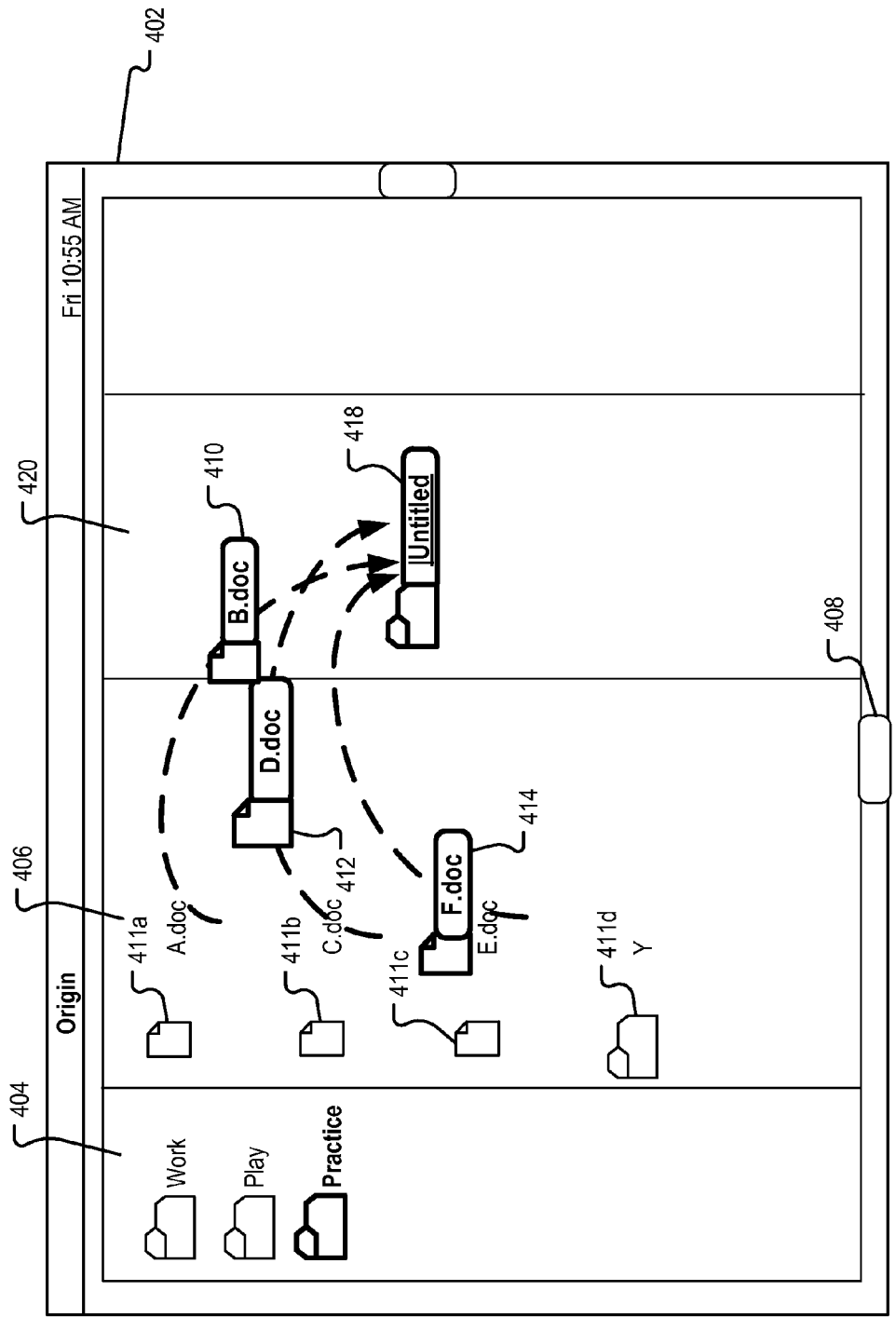

FIG. 4C illustrates the selected items moving along their respective paths toward the new folder 418. In some implementations, the selected items are animated to appear as if they were tossed from their initial locations up and away from the plane of the column view folder window 402 and then fall back toward the new folder 418. As the representations of the selected items move toward the peaks of their respective trajectories, the size of the representations can be made larger. And, as the representations of the selected items approach the end of their respective trajectories, the size of the representations can be made smaller. This animation creates the illusion that the items are being tossed above the user interface and then falling back toward the destination folder under the force of gravity. As the selected items enter the new folder one by one, the landing of the selected items can cause the new folder to be animated to bounce or shake.

Figure 4D:
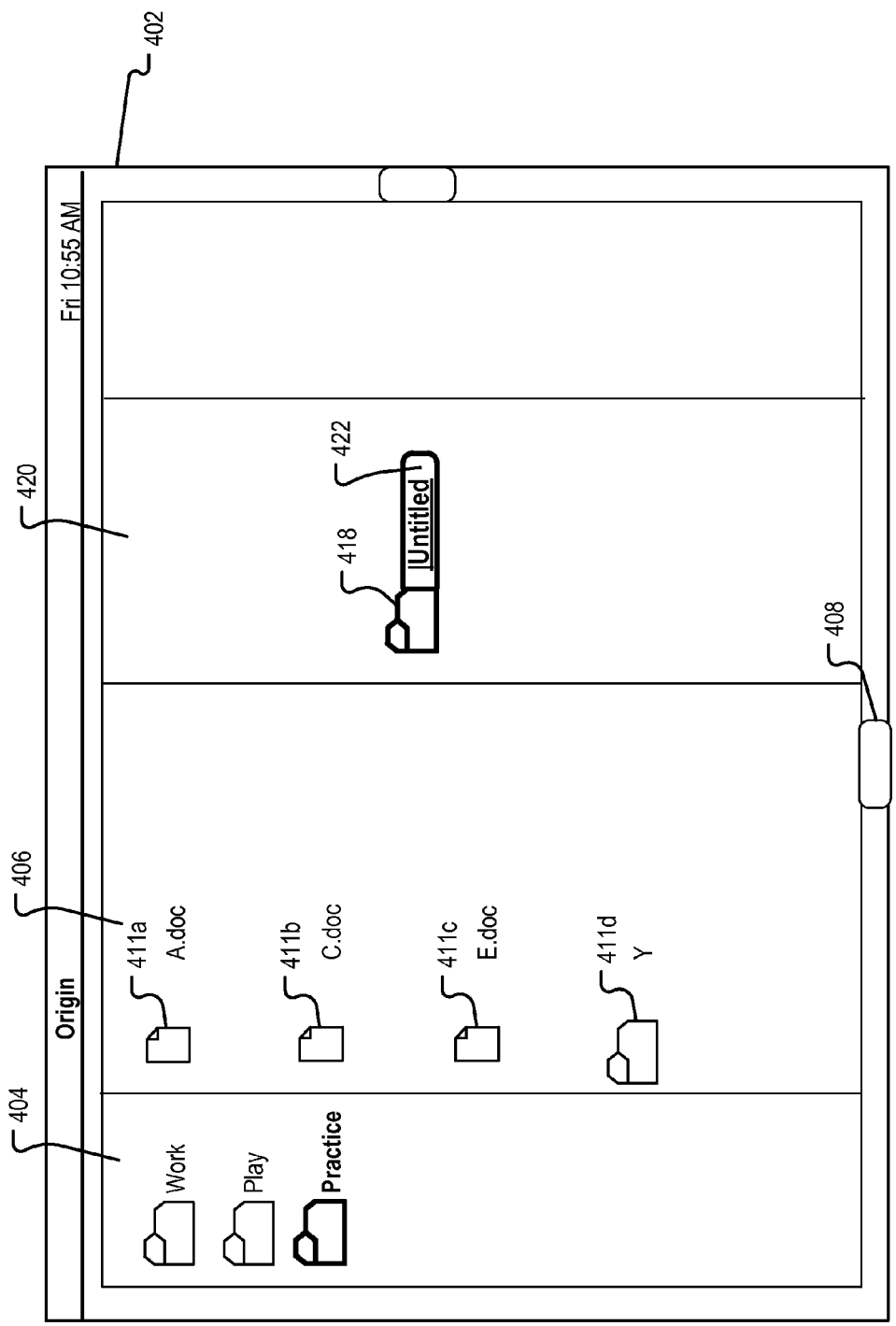

FIG. 4D illustrates the column view folder window 402 after all of the selected items have entered the new folder 418. As shown in FIG. 4D, the selected items are no longer shown in the column view folder window 402. The new folder 418 now contains the selected items. On the file system level, a new folder has been created in the folder "Practice," and the selected items from the folder "Practice" have been moved to the new folder. The new folder now has a default temporary name, such as "untitled" or "new folder." In some implementations, the new folder can be created at some other default location or temporary location in the file system hierarchy, such as the desktop folder or a temporary folder. When the user eventually specifies the filename of the new folder, the new folder can be moved to the folder "Practice."

In some implementations, if the user had selected the option to copy the selected items and group the copies into the new folder, the selected items would still appear in their original locations in the column 406, and the representations of the copies would be moved to the new folder 418. On the file system level, a new folder would be created at a default location in the filed system hierarchy (e.g., in the "Practice" folder), copies of the selected items can be made and the copies can be moved to the new folder.

Figure 4E:
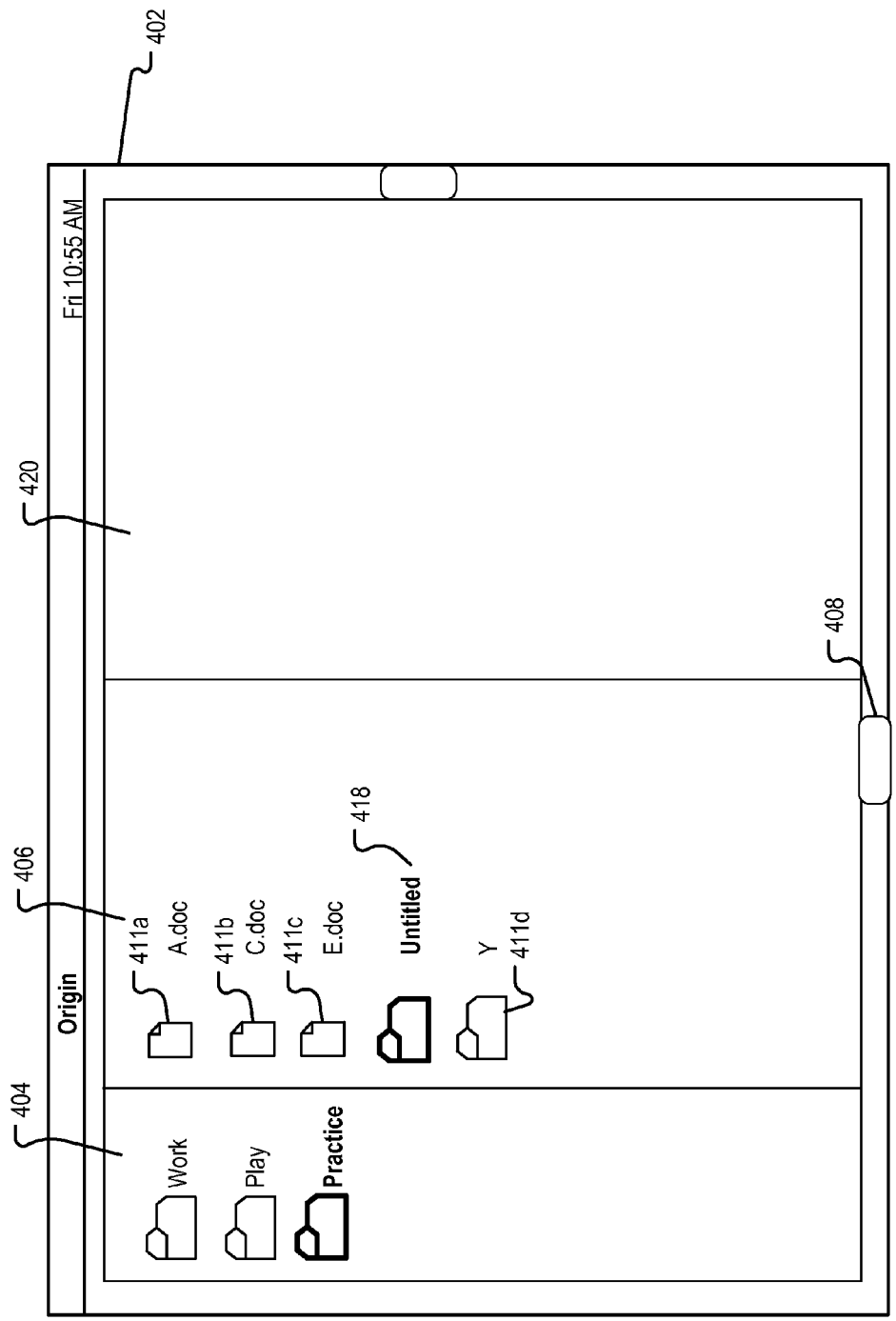

In some implementations, the new folder 418 is presented with a default or temporary filename initially. When the user can keep the default name or modifies the default or temporary name in the text label 422. Once the user commits the filename in the text label 422, final locations of the new folder and the remaining items in the column 406 can be determined based on the one or more keep-arranged criteria associated with the column 406. Once the final locations of the new folder 418 and the remaining items in the column 406 have been determined, the new folder 418 and the remaining items can be animated from their current locations to their respective final locations. As shown in FIG. 4E, suppose the items in the column 406 are arranged by filename, the new folder 418 and the remaining items are sorted according to their filenames in the column 406.

FIGS. 4A-4E illustrate merely one set of exemplary user interface changes that can be implemented to demonstrate the grouping of multiple items from an existing folder into a destination folder in a column view interface of the existing folder. FIGS. 4F-4J illustrate another set of exemplary user interface changes that can be implemented to demonstrate the grouping of multiple items from an existing folder into a destination folder in a column view of the existing folder.

FIG. 4F shows an example list view folder window 402. For illustrative purposes, the column view folder window 402 shown in FIG. 4F is the same as the column view folder window 402 shown in FIG. 4A. As shown in FIG. 4F, the user has selected a number of items (e.g., the items 410, 412, and 414) from a column 406 displaying all the items in a selected folder (e.g., folder "Practice"). The column 406 also include a number of unselected items (e.g., the items 411*a-d*). The selected folder (e.g., folder "Practice") can be shown in another column 404 to the left of the column 406. After selecting the items 410, 412, and 414 from the column 406, the user has also invoked the option to group the selected items into a destination folder (e.g., a new folder) via a pop-up menu 416.

Figure 4G:
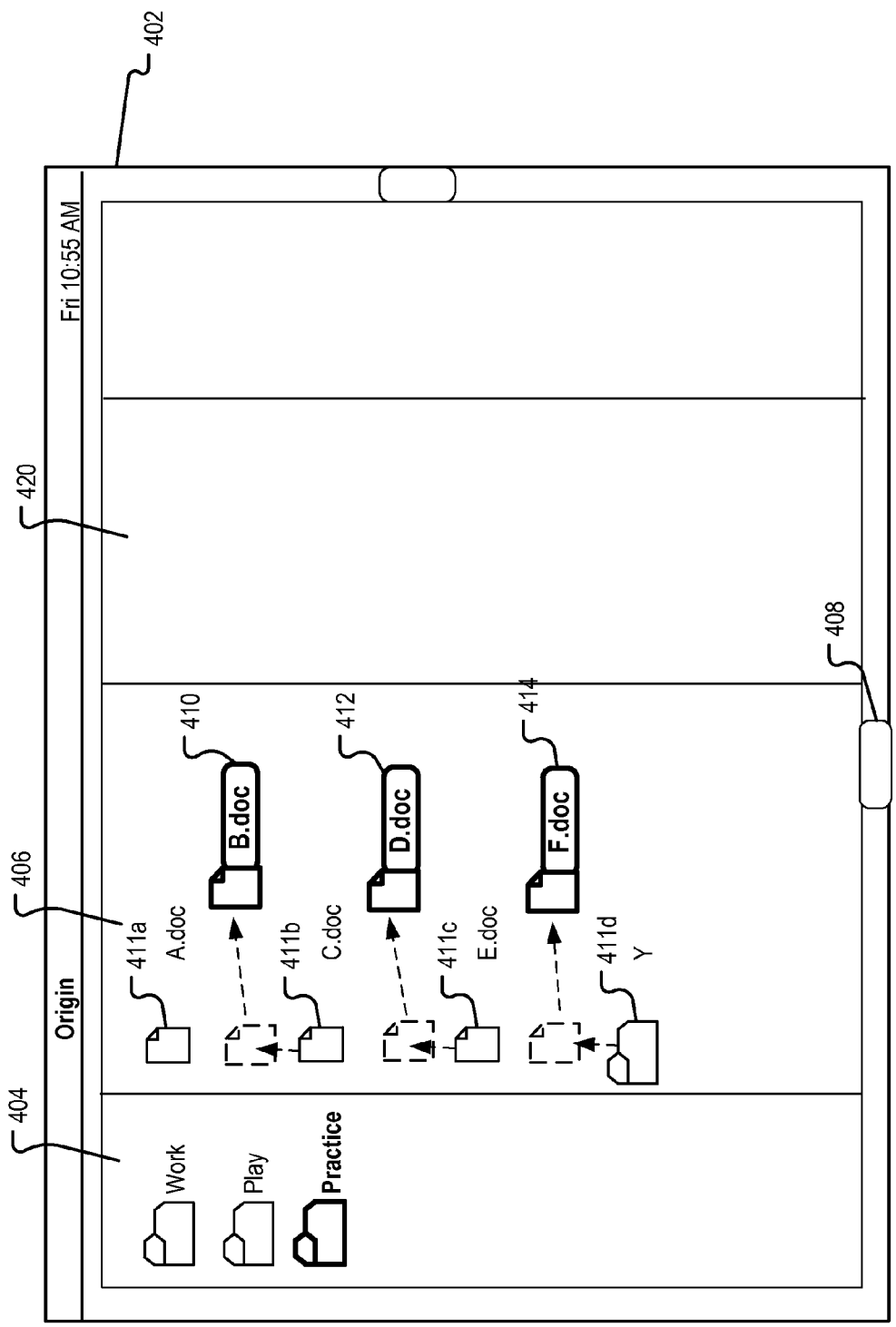

In response to the user's command to group the selected items, representations of the selected items can be shown to move from their original locations toward the right side of the column view folder window 402. As shown in FIG. 4G, the representations of the selected items (e.g., the items 410, 412, and 414) are animated toward the right side of the column view folder window 402. A new column 420 can be shown to appear in the column view folder window 402 to the right side of the column 406. The new column 420 now becomes the rightmost column in the folder window 402.

In some implementations, the representations of the selected items (e.g., the items 410, 412, and 414) can change appearance as they are moving from their original locations in the column 406 toward their final locations in the new column 420. For example, an animation can be presented to show that the selected items are first lifted off of the plane of the folder window 402, and then moved toward their final locations in the new column 420 along their respective paths (e.g., as indicated by the dashed lines in FIG. 4G). In some implementations, the icons and text labels of the selected items can be highlighted or the corners of the text labels can be rounded. The changed appearance of the selected items can be used to indicate that the selected items are currently in a transitory state.

In some implementations, as shown in FIG. 4G, the unselected items (the items 411a-d) can be shown to move from their respective original locations in the column 406 toward their respective new locations in the column 406 after the selected items have moved out of their original locations in the column 406 and left open some item slots in the column 406. The new locations of the unselected items (e.g., the items 411a-d) can be determined based on the keep-arranged criteria (e.g., by filename, type, etc.) associated with the folder window 402. The new locations of the unselected items are also influenced by the initial folder location of the destination folder for the selected items in the column 406.

Figure 4H:
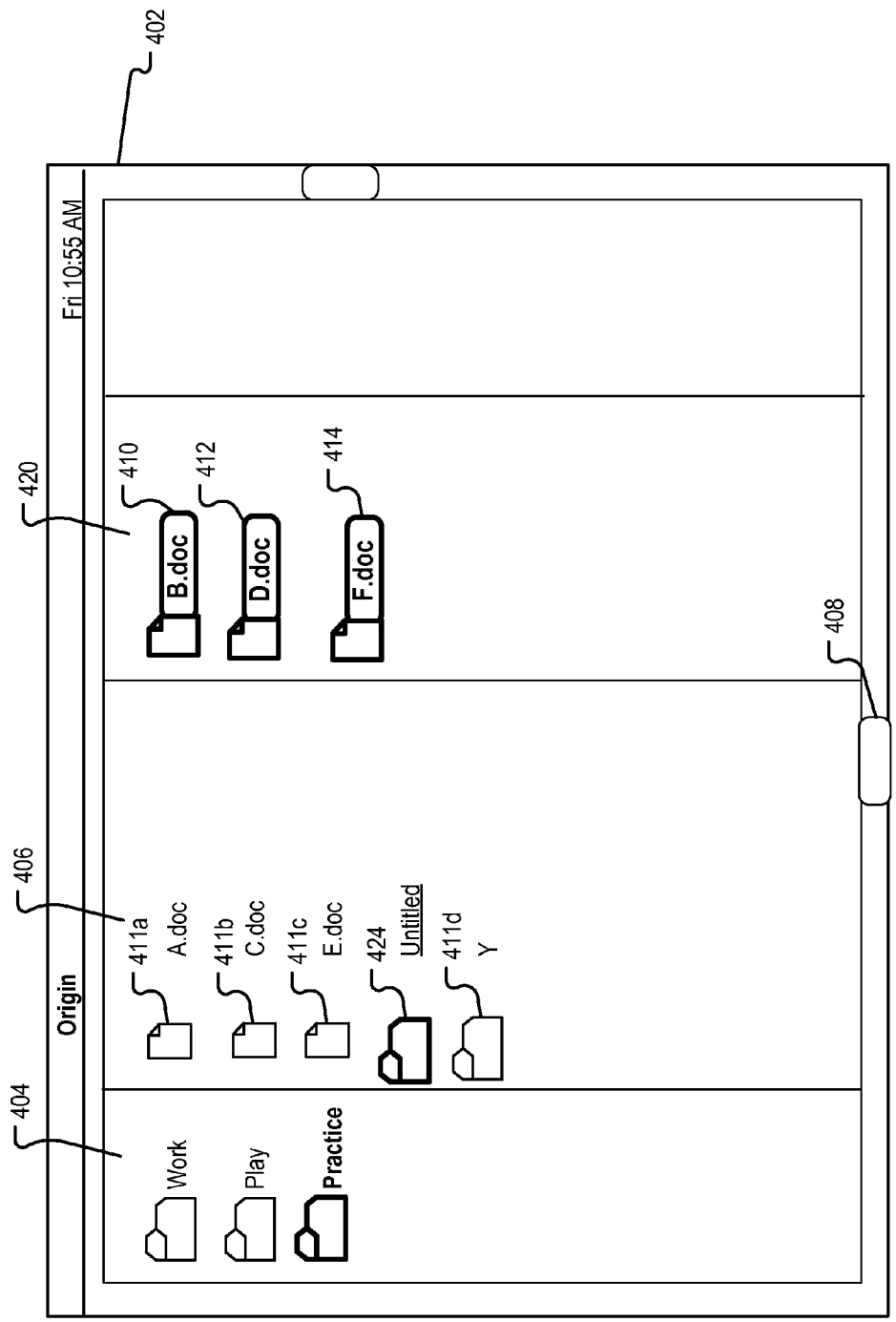

As shown in FIG. 4H, in some implementations, a destination folder 424 can be animated into the column 406 as the selected items are moving out of the column 406. For example, the destination folder 424 can be shown to grow from the initial folder location in the column 424 gradually into its final size. Alternatively, the destination folder 424 can be shown to slide in from outside of the user interface into the initial folder location in the column 406. In some implementations, other ways of introducing the destination folder 424 into the initial folder location in the column 406 are possible.

In some implementations, the destination folder 424 can be given a default name (e.g., "Untitled"), and the initial folder location of the destination folder can be determined based on the default name and the names of other unselected items in the column 406, given that the column view folder window 402 is arranged according to filename. As shown in FIG. 4H, the initial folder location of the destination folder 424 (e.g., initialed named "Untitled") is between the new locations of the item 411c (e.g., the document named "E") and the item 411d (e.g., the folder named "Y"). As the unselected items 411a-d are moving toward their respective new locations and the destination folder 424 is animated into its initial folder location in the column 406, the selected items (e.g., the items 410, 412, and 414) are being animated toward their respective final locations in the new column 420 as well. The respective final locations of the selected items (e.g., the items 410, 412, and 414) can be determined based on the keep-arranged criteria associated with the folder window 402 as well. For example, as shown in FIG. 4H, the order by which the selected items will appear in the new column 420 is according to the names of the selected items.

Figure 4I:
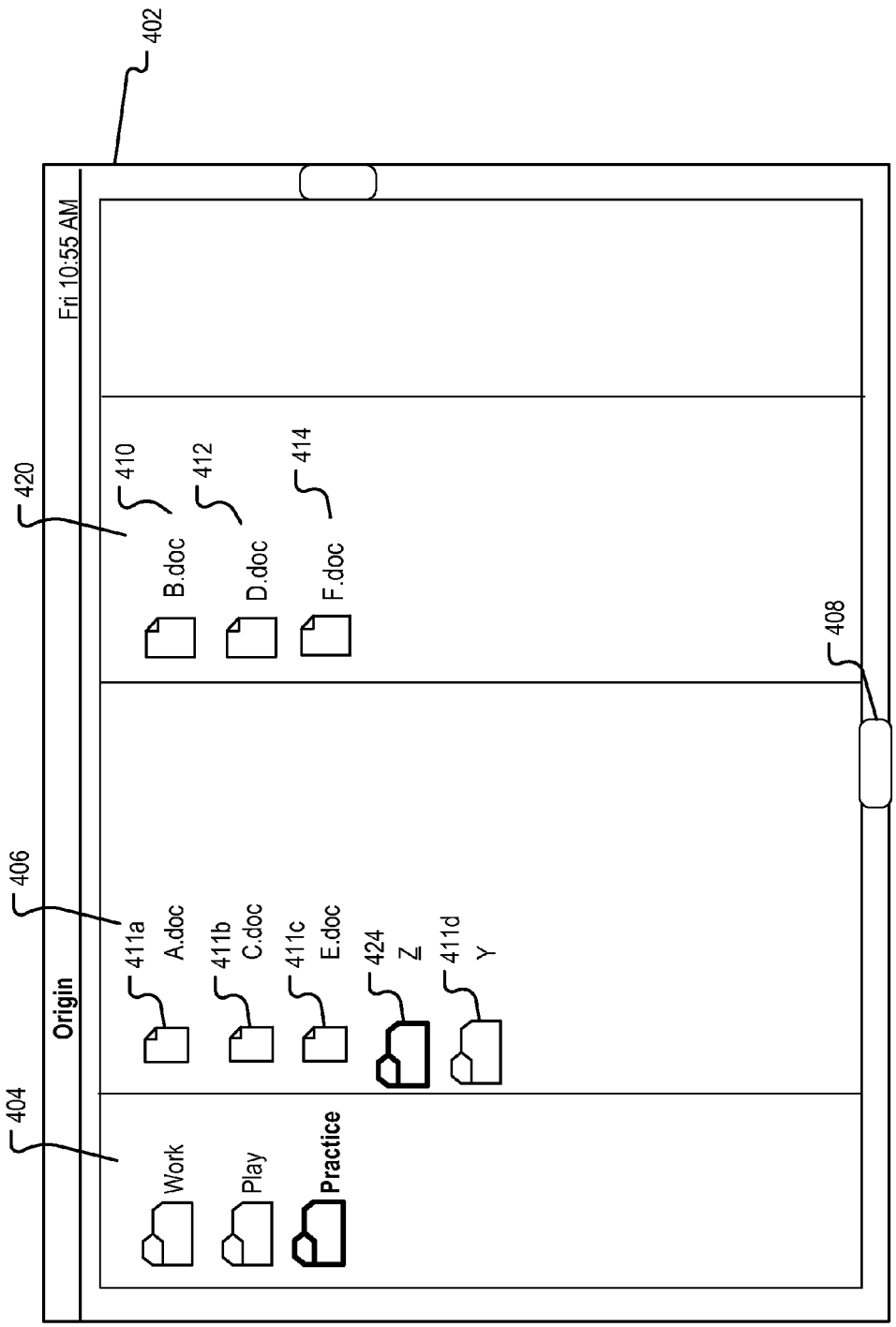

FIG. 4I illustrate that the selected items (e.g., the items 410, 412, and 414) have arrived at their final locations in the new column 420. In some implementations, the representations of the selected items (e.g., the items 410, 412, and 414) can revert back to their original appearances (e.g., shown as a small icon with a text label). Also as shown in FIG. 4I, the destination folder 424 has also settled into its initial folder location in the column 406, and is the currently selected item in the column 406. In some implementations, the destination folder 424 can be highlighted to indicate its currently selected status.

In some implementations, the user can be given an opportunity to commit the default name given to the destination folder 424 or to enter a new name for the destination folder 424. For example, the text label of the destination folder can be highlighted and becomes editable, and the user can enter the new folder name by typing into the text label field. Alternatively, the user can accept the default name currently displayed in the text label by entering a pre-defined command. If the user decides to accept the default name given to the destination folder 406, the destination folder will remain at the initial folder location, and the initial folder location will become the final folder location for the destination folder 424.

If the user chooses to enter a new name for the destination folder, the final locations of the destination folder 424 and the other unselected items in the column 406 can be determined based on the new name of the destination folder and the keep-arranged criteria associated with the folder window 402.

As shown in FIG. 4I, the user has entered a new name (e.g., "Z") for the destination window 424. Once the user commits the new name, the operating system can determine the final locations of the destination folder 424 and the other items in the column 406, for example, according to the names of the destination folder 424 and the names of the unselected items in the column 406. Once the final locations of the destination folder 424 and the unselected items (e.g., the items 411a-d) in the column 424 have been determined, the destination folder 424 and the unselected items (e.g., the items 411a-d) can be animated from their current locations in the column 406 to their respective final locations in the column 406. For example, FIG. 4J illustrate that the destination folder 424 and the unselected items (e.g., the items 411a-d) have been moved to their respective final locations in the column 406 determined based on their names.

In some implementations, the animation illustrating the creation of the new folder and the movements of the selected items into the new folder can be displayed asynchronously relatively to the file system operations for creating the new folder and moving the selected items to the new folder in the file system hierarchy. In some implementations, the animation can be presented only if it has been determined that the file system operations can complete within a defined time window. In some implementations, the operating system can hold the animation until the operating system has received a notification indicating the successful completion of the file system operations before the expiration of the defined time window. If the defined time window expires before the file system operations for creating the new folder and moving the selected items into the new folder are completed, the operating system can omit the animation.

In some implementations, the operating system can queue up operating system events that can cause changes to the user interface (e.g., the list view folder window or the column view folder window) until the expiration of the defined time window and/or the completion of the animation. When the defined time window has expired or when the animation has been completed, the queued system events can be carried out and the user interface changes caused by the queued system events can be manifested in the user interface.

In some implementations, if the file system operations are not completed within the defined time window, the animation showing the creation of the new folder and the movement of the selected items into the new folder can be omitted. The uncompleted file system operations can be allowed to continue in the background. In some implementations, the user interface can be kept responsive to user inputs that do not conflict with the file system operations. For example, the user can open a document that is not affected by the file system operations in a corresponding application and work on the document while the file system operations continue in the background.

In some implementations, the items that are grouped into a new folder need not be items from a common parent folder. For example, the user can search and locate items that satisfy particular search criteria, and the search results can appear together in a user interface, such as a search result window. In various implementations, the search result window can be in a free-arranged icon view, a keep-arranged icon view, a list view, or a column view. The user can select one or more items from the search result window and group the selected items in a new folder.

In some implementations, one or more items in the search result window can be the ancestor items of one or more other items in the search result window. When the user happens to select items that have ancestor-descendent relationship to each other (e.g., when both a folder and a subfolder of the folder are selected, or when both a folder and an item in the folder or in a subfolder of the folder are selected), the representations of the selected items can be shown to move toward the new folder in the same manner as described above with respect to FIGS. 1A-4E.

In some implementations, although the representations of the selected items are moved to the new folder as individual items along their respective paths in the animation, in the file system, any existing ancestor-descendent relationship between the selected items can be preserved in the new folder when the selected items are moved to the new folder in the file system hierarchy. For example, if the search results include a folder "parent" and an item "child" that belongs to the folder "parent," when the animation is presented, the folder "parent" and the item "child" moves toward the new folder as separate items along their respective paths in the animation. However, in the file system hierarchy, only the folder "parent" is moved to the new folder, and the item "child" is moved as part of the content of the folder "parent." A copy of the item child needs not be moved to the new folder separately from the folder "parent."

In some implementations, the animation can be presented when the file system operations involved in grouping the selected search results can be completed in a defined time window. In some implementations, the user interface can be kept responsive to inputs that do not conflict with the file system operations while the file system operations are underway in the background. In some implementations, operating system events that would affect the user interface can be queued and dealt with after the completion of the animation, if the animation is presented in the user interface.

In some implementations, the user can restore the items in the new folder to their original locations. For example, the user can enter a defined input for restoring items in the new folder to their original locations in the file system hierarchy. On the user interface, in response to the restore command, the reverse animation can be presented showing the items flying out of the new folder back to the original folder from which the items were selected, and the new folder is removed from the user interface. In some implementations, respective destination locations of the selected items and other items in the user interface presenting the original folder can be determined, for example, based on the keep-arranged criteria associated with the user interface. In some implementations, if intervening operations have caused changes to the original folder, and the restoration cannot be completed successfully in the file system hierarchy, an error message can be generated, and the animation showing the selected items flying from the new folder back to the original folder will not be presented.

Exemplary Processes for Grouping Items in a Folder

Figure 5:
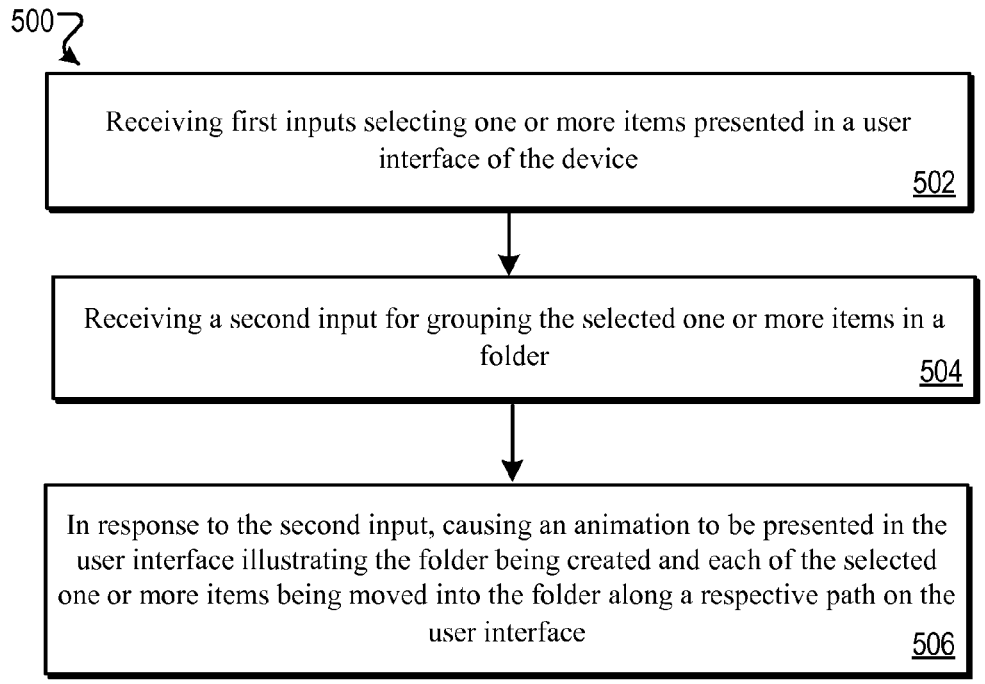
FIG. 5 is a flow diagram of an exemplary process for showing an animation illustrating the grouping of items in response to a grouping command.

FIG. 5 is a flow diagram of an exemplary process 500 for showing an animation illustrating the grouping of items in response to a grouping command. In the exemplary process 500, first inputs selecting one or more items presented in a user interface of the device can be received (502). Then, a second input for grouping the selected one or more items in a folder can be received (504). In response to the second input, the operating system can cause an animation to be presented in the user interface illustrating the folder being created and each of the selected one or more items being moved into the folder along a respective path on the user interface (506). More details of the presentation of the animation can be found in the description of FIGS. 1A-4E.

Figure 6:
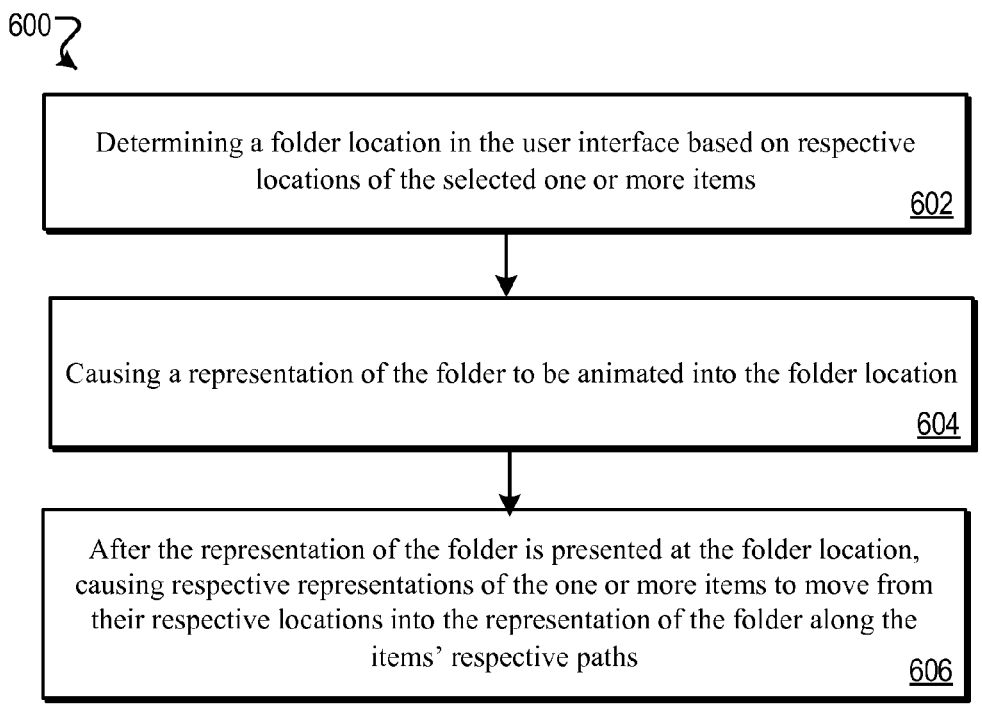
FIG. 6 is a flow diagram of an exemplary process for showing an animation illustrating the creation of a destination folder and the respective movements of selected items into the destination folder.

FIG. 6 is a flow diagram of an exemplary process 600 for showing an animation illustrating the creation of a folder and the respective movements of selected items into the folder. In the exemplary process 600, a folder location can be determined in the user interface based on respective locations of the selected one or more items (602). Then, a representation of the folder can be animated into the folder location (604). After the representation of the folder is presented at the folder location, the operating system can cause respective representations of the one or more items to move from their respective locations into the representation of the folder along the items' respective paths (606).

In some implementations, each path is along a respective trajectory starting from the respective location of one of the selected items and terminates at the folder location of the folder.

In some implementations, the operating system can cause the representation of the folder to animate at the folder location visually indicate receipt of the selected items into the folder.

Figure 7A:
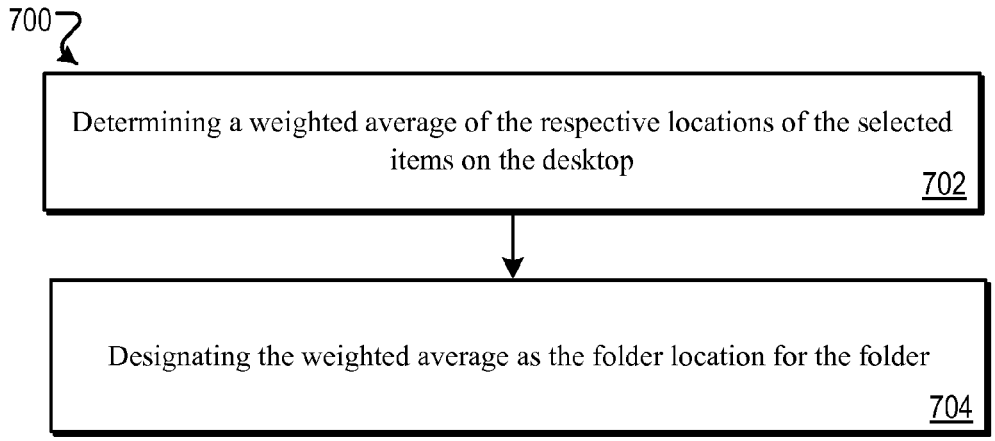
FIG. 7A is a flow diagram of an exemplary process for determining a suitable folder location for the destination on a free-arranged desktop.

FIG. 7A is a flow diagram of an exemplary process 700 for determining a suitable folder location on a free-arranged desktop. In the process 700, a weighted average of the respective locations of the selected items on the desktop can be determined (702). Then, the weighted average can be designated as the folder location for the folder (704).

Figure 7B:
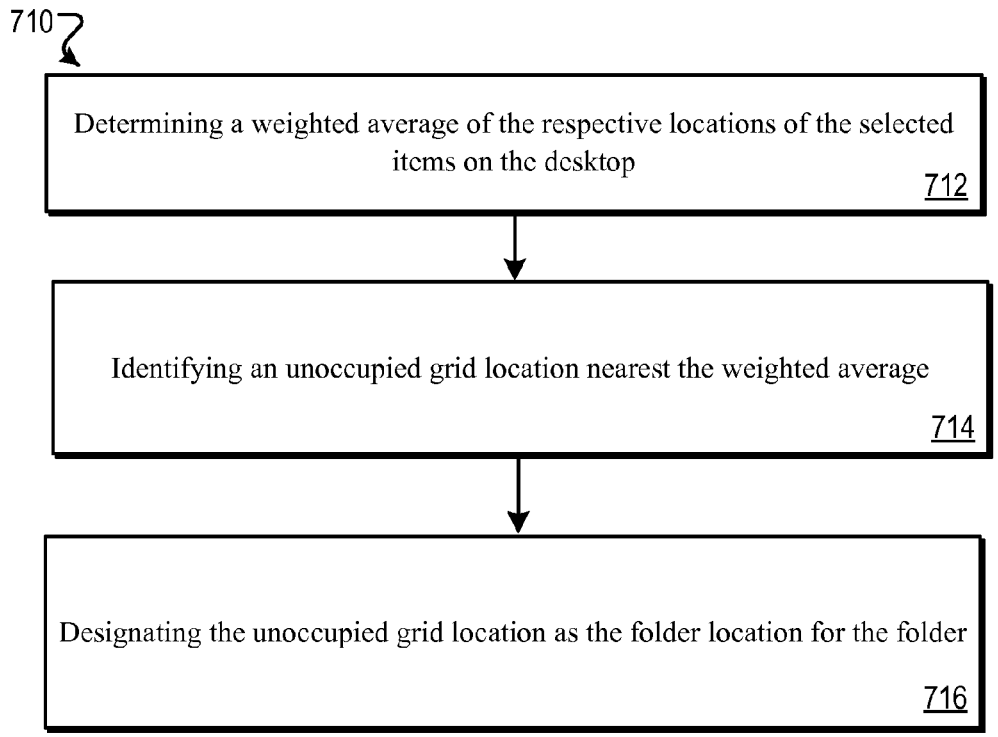
FIG. 7B is a flow diagram of another exemplary process for determining a suitable folder location for the destination folder on a keep-arranged desktop.

FIG. 7B is a flow diagram of another exemplary process 710 for determining a folder location on a keep-arranged desktop. The desktop includes an evenly spaced grid. In the process 710, a weighted average of the respective locations of the selected items on the desktop can be determined (712). An unoccupied grid location nearest the weighted average can be identified (714). Then, the identified unoccupied grid location can be designated as the folder location for the folder (716).

Figure 8A:
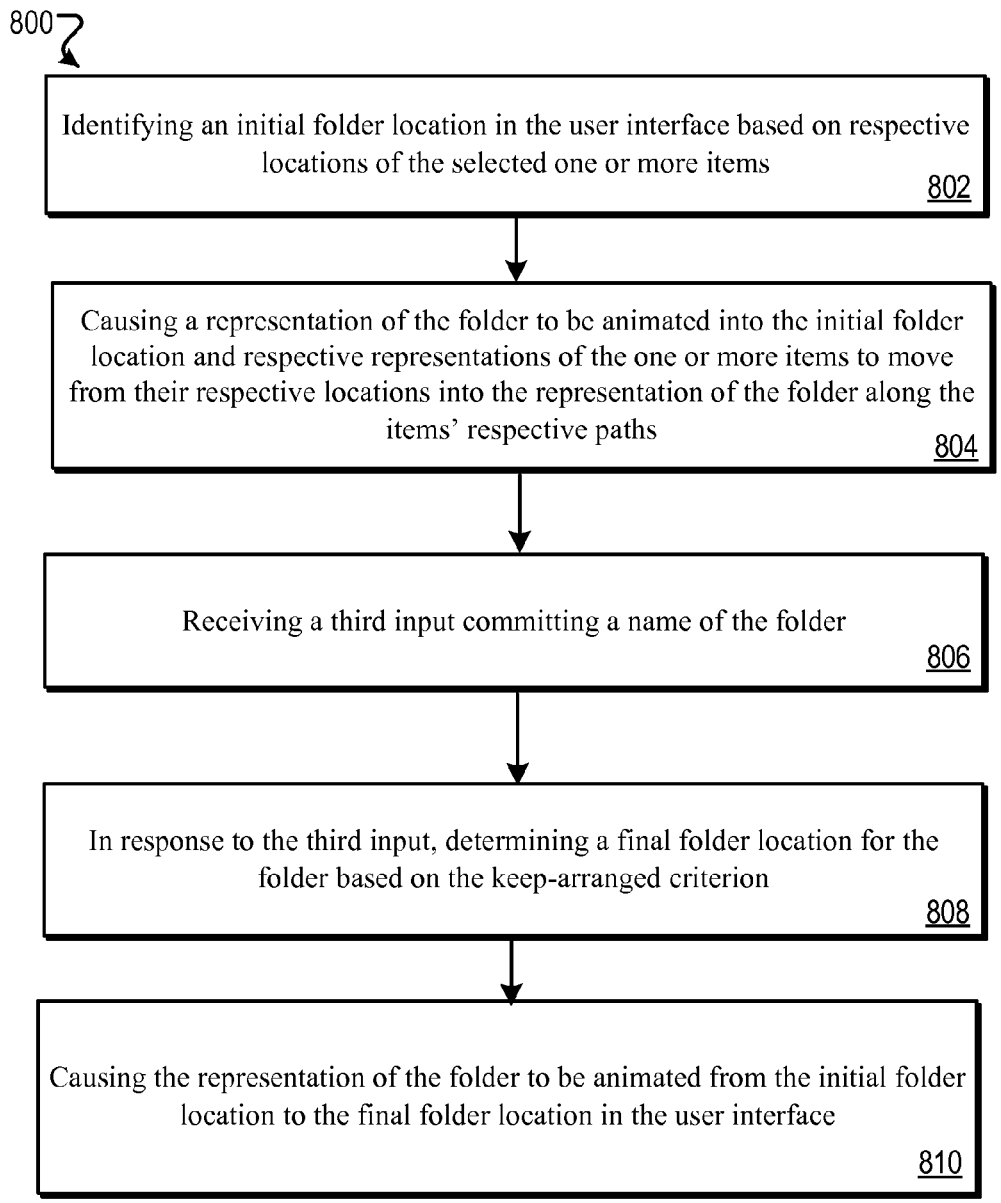
FIG. 8A is a flow diagram of an exemplary process for showing an animation illustrating the grouping of items in a keep-arranged desktop.

FIG. 8A is a flow diagram of an exemplary process 800 for showing an animation illustrating the grouping of items in a keep-arranged desktop. In the process 800, an initial folder location can identified in the user interface based on respective locations of the selected one or more items (802). Then, the operating system can cause a representation of the destination folder to be animated into the initial folder location and respective representations of the one or more items to move from their respective locations into the representation of the destination folder along the items' respective paths (804). A third input committing a name of the destination folder can be received (806). In response to the third input, a final folder location can be determined for the destination folder based on the keep-arranged criterion (808). Then, the operating system can cause the representation of the destination folder to be animated from the initial folder location to the final folder location in the user interface (810).

Figure 8B:
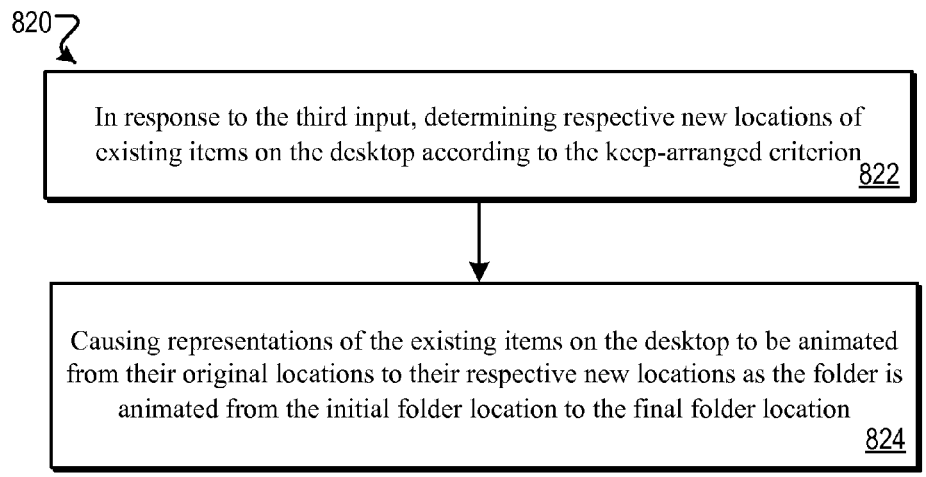
FIG. 8B is a flow diagram of an exemplary process for showing an animation illustrating the movements of the destination folder and other items on the keep-arranged desktop to their final destination locations on the keep-arranged desktop after the items are grouped into the destination folder.

FIG. 8B is a flow diagram of an exemplary process 820 for showing an animation illustrating the movements of the destination folder and other items on the keep-arranged desktop to their final destinations on the keep-arranged desktop after the items are grouped into the destination folder. In the process 820, in response to the third input, respective new locations of existing items on the desktop can be determined according to the keep-arranged criterion (822). Then, the operating system can cause representations of the existing items on the desktop to be animated from their original locations to their respective new locations as the destination folder is animated from the initial folder location to the final folder location (824).

Figure 9A:
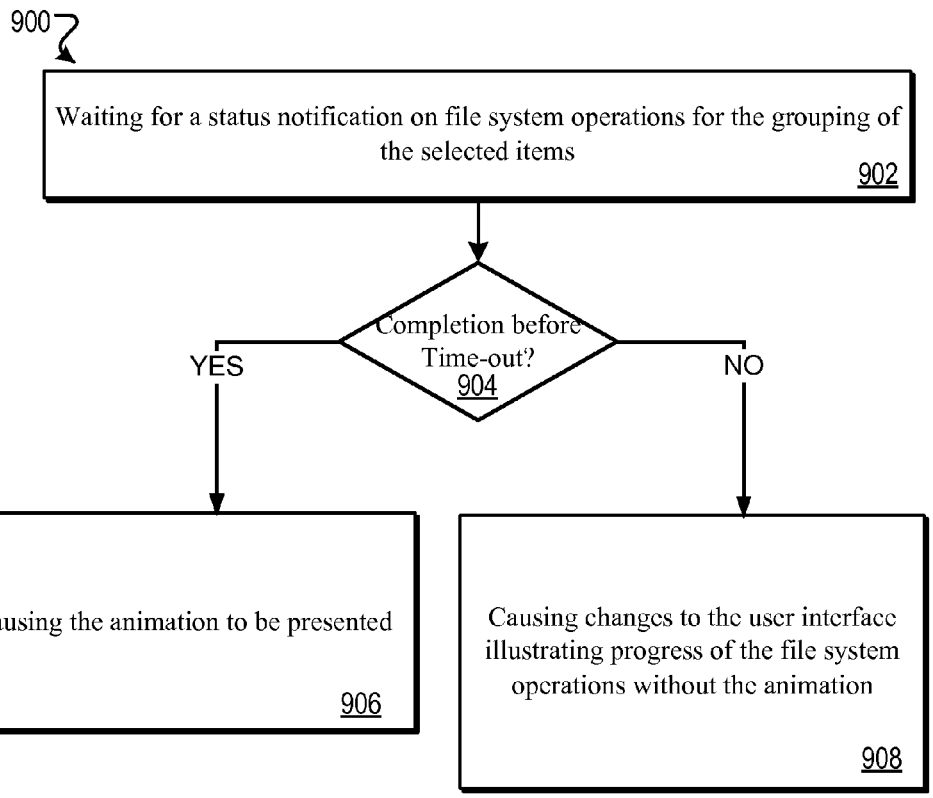
FIG. 9A is a flow diagram of an exemplary process for suspending the start of the grouping animation for a defined time window pending the completion of the file system operations for the grouping action.

FIG. 9A is a flow diagram of an exemplary process 900 for suspending the start of the grouping animation for a defined time window pending the completion of the file system operations for the grouping action. In the exemplary process 900, the operating system can wait for a status notification on file system operations for the grouping of the selected items (902). The operating system determines whether the notification indicating the successfully completion of the file system operations is received before the expiration of the defined time window (904). The operating system can cause changes to the user interface illustrating progress of the file system operations if the status notification indicates expiration of the defined period of time before the successful completion of the file system operations (906). The operating system can cause the animation to be presented if the status notification indicates successful completion of the file system operations within a defined period of time (908).

In some implementations, after the expiration of the defined period of time and before the successful completion of the file system operations for grouping the selected items into the destination folder, the user interface remains operable to respond to other operations that do not conflict with the file system operations for grouping the selected items into the destination folder.

Figure 9B:
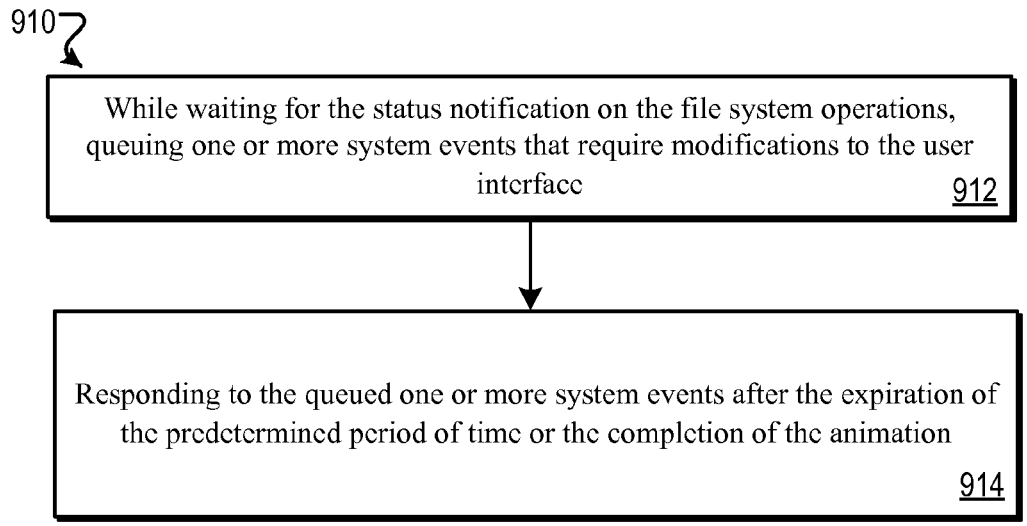
FIG. 9B is a flow diagram of an exemplary process for queuing system events until completion of the animation or the end of the defined time window.

FIG. 9B is a flow diagram of an exemplary process 910 for queuing system events until completion of the animation or the end of the defined time window. In the example process 910, while waiting for the status notification on the file system operations, the operating system can queue up one or more system events that require modifications to the user interface (912). The operating system can respond to the queued one or more system events after the expiration of the defined period of time or the completion of the animation (914).

Figure 10:
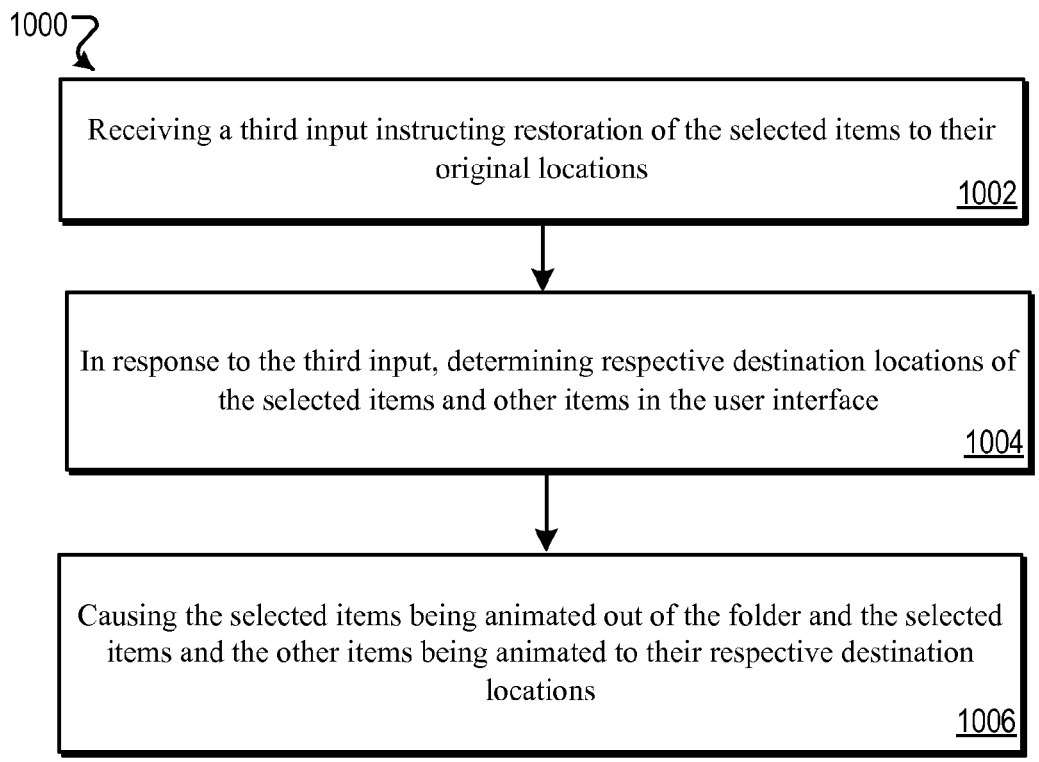
FIG. 10 is a flow diagram of an exemplary process for showing an animation illustrating the restoration of the selected items from the destination folder.

FIG. 10 is a flow diagram of an exemplary process 1000 for showing an animation illustrating the reversing of the grouping of the selected items. In the exemplary process 1000, a third input instructing restoration of the selected items to their original locations can be received (1002). In response to the third input, respective destination locations of the selected items and other items in the user interface can be determined (1004). Then, the operating system can cause the selected items being animated out of the destination folder and the selected items and the other items being animated to their respective destination locations (1006).

Figure 11:
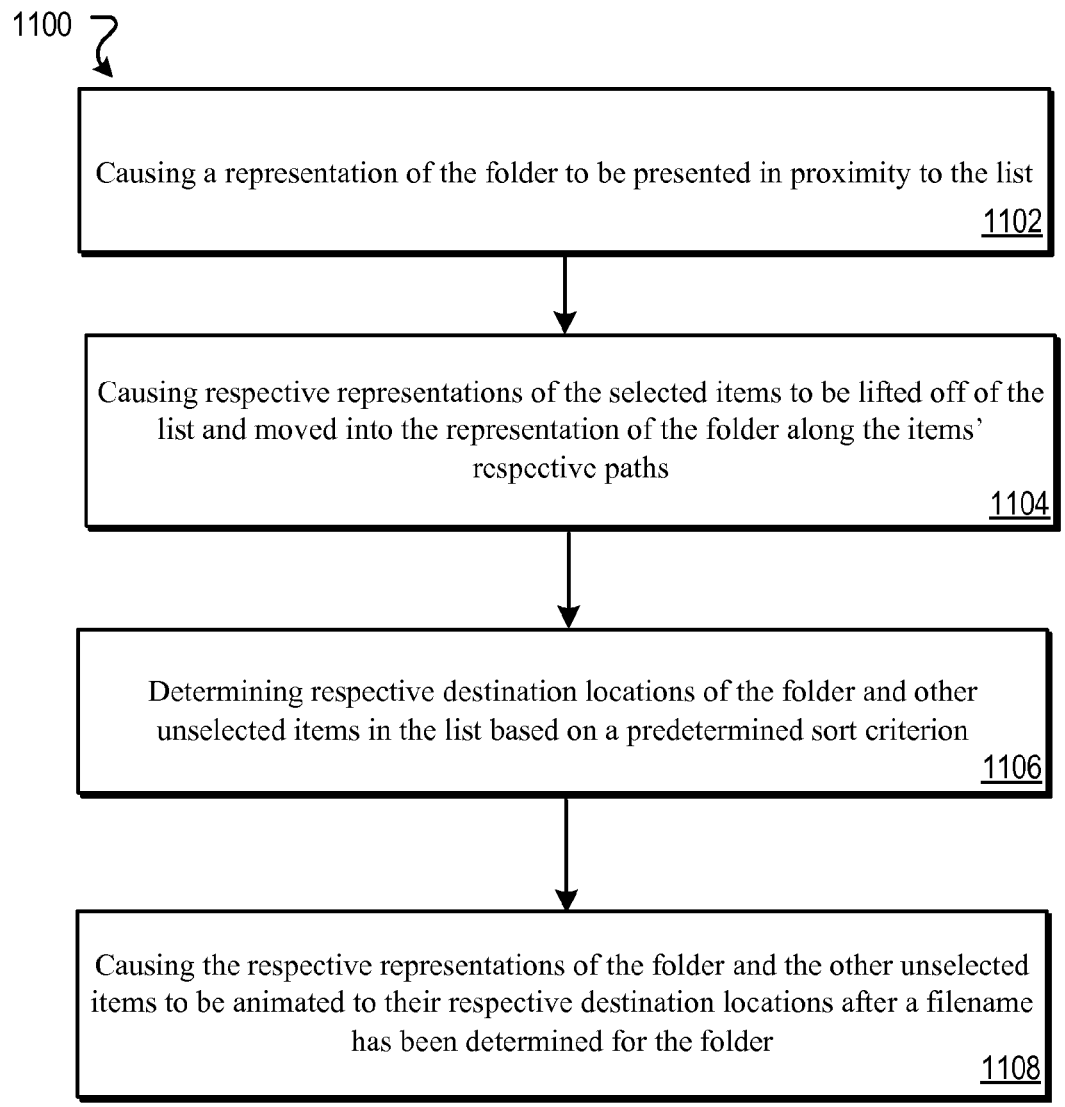
FIG. 11 is a flow diagram of an exemplary process for showing an animation illustrating the grouping of items from an existing folder in a list view interface of the existing folder.

FIG. 11 is a flow diagram of an exemplary process 1100 for showing an animation illustrating the grouping of items from an existing folder in a list view interface of the existing folder. In some implementations, the selected items and zero or more other items belong to a common folder and the user interface is a list view interface showing the selected items (and zero or more unselected items) in a list. In the exemplary process 1100, the operating system can cause a representation of the destination folder to be presented in proximity to the list (1102). Then, the operating system can cause respective representations of the selected items to be lifted off of the list and moved into the representation of the destination folder along the items' respective paths (1104). Respective destination locations of the new folder and other unselected items in the list can be determined based on a keep-arranged criterion (1106). Then, the operating system can cause the respective representations of the destination folder and the other unselected items in the list to be animated to their respective destination locations after a filename has been determined for the destination folder (1108).

In some implementations, the respective representation of each selected item follows a respective path (e.g., curved path) to the representation of the destination folder when the selected item is moved to the representation of the destination folder.

In some implementations, the respective representations of the selected items change appearance when the respective representations of the selected items are lifted off of the list.

In some implementations, the respective representations of the selected items start to move toward the representation of the destination folder asynchronously.

In some implementations, the selected item that is closest to the representation of the new folder is animated toward the representation of the new folder first, followed by other selected items in an order based on the respective distances of the selected items from the representation of the destination folder.

Figure 12A:
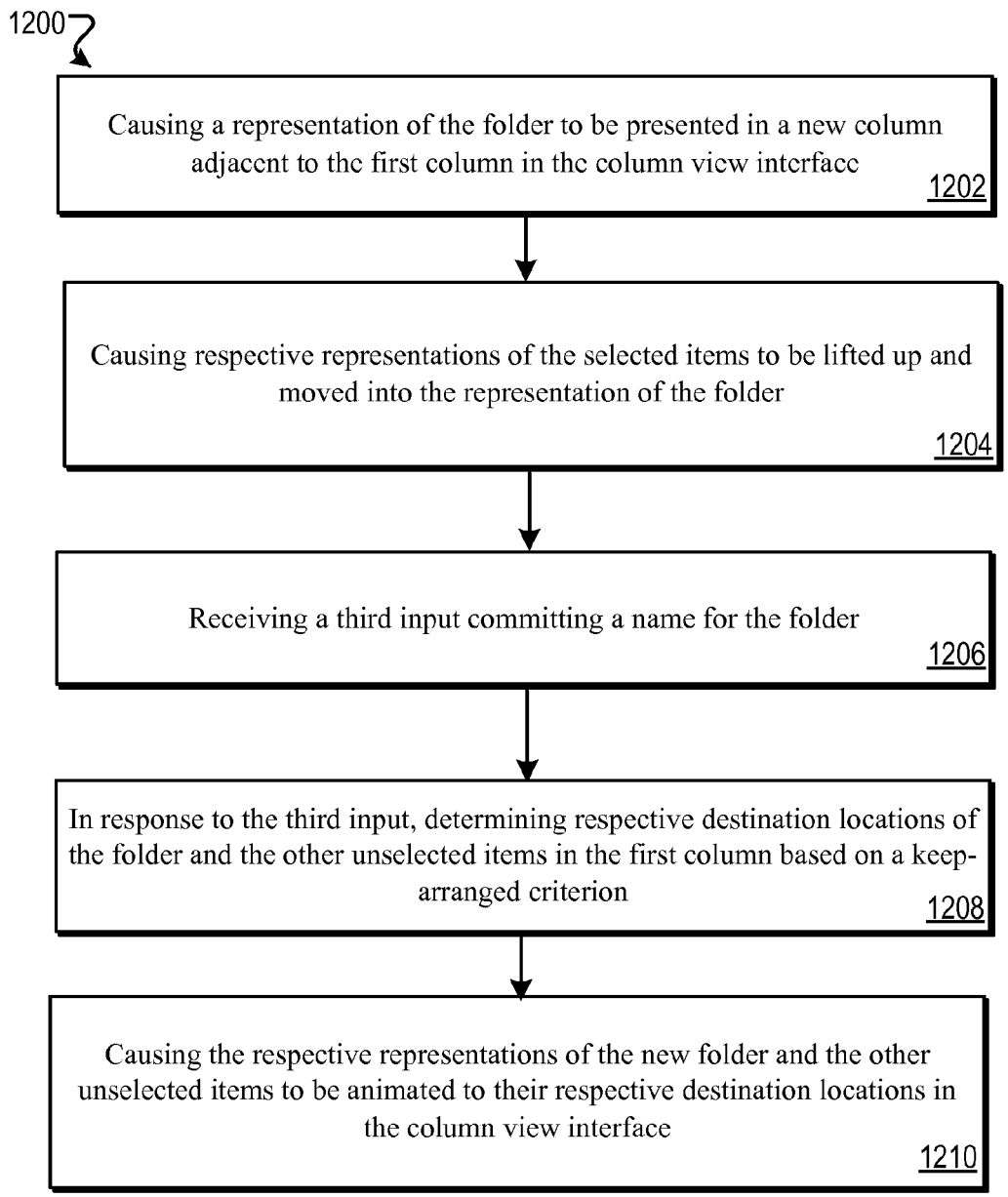
FIG. 12A is a flow diagram of an exemplary process for showing an animation illustrating the grouping of items from an existing folder in a column view interface of the existing folder.

FIG. 12A is a flow diagram of an exemplary process 1200 for showing an animation illustrating the grouping of items from an existing folder in a column view interface of the existing folder. In some implementations, the user interface is a column view interface showing one or more columns representing consecutive levels of a file system hierarchy, each column presenting child items of a selected parent item in an adjacent column, and the selected items have a common parent item and are presented in a first column in the user interface. In the exemplary process 1200, the operating system can cause a representation of the destination folder to be presented in a new column adjacent to the first column in the column view interface (1202). The operating system can cause respective representations of the selected items to be lifted up and moved into the representation of the destination folder (1204). A third input committing a name for the destination folder can be received (1206). In response to the third input, respective destination locations of the destination folder and other unselected items in the first column can be determined based on a keep-arranged criterion (1208). Then, the operating system can cause the respective representations of the destination folder and the other unselected items to be animated to their respective destination locations in the column view interface (1210).

Figure 12B:
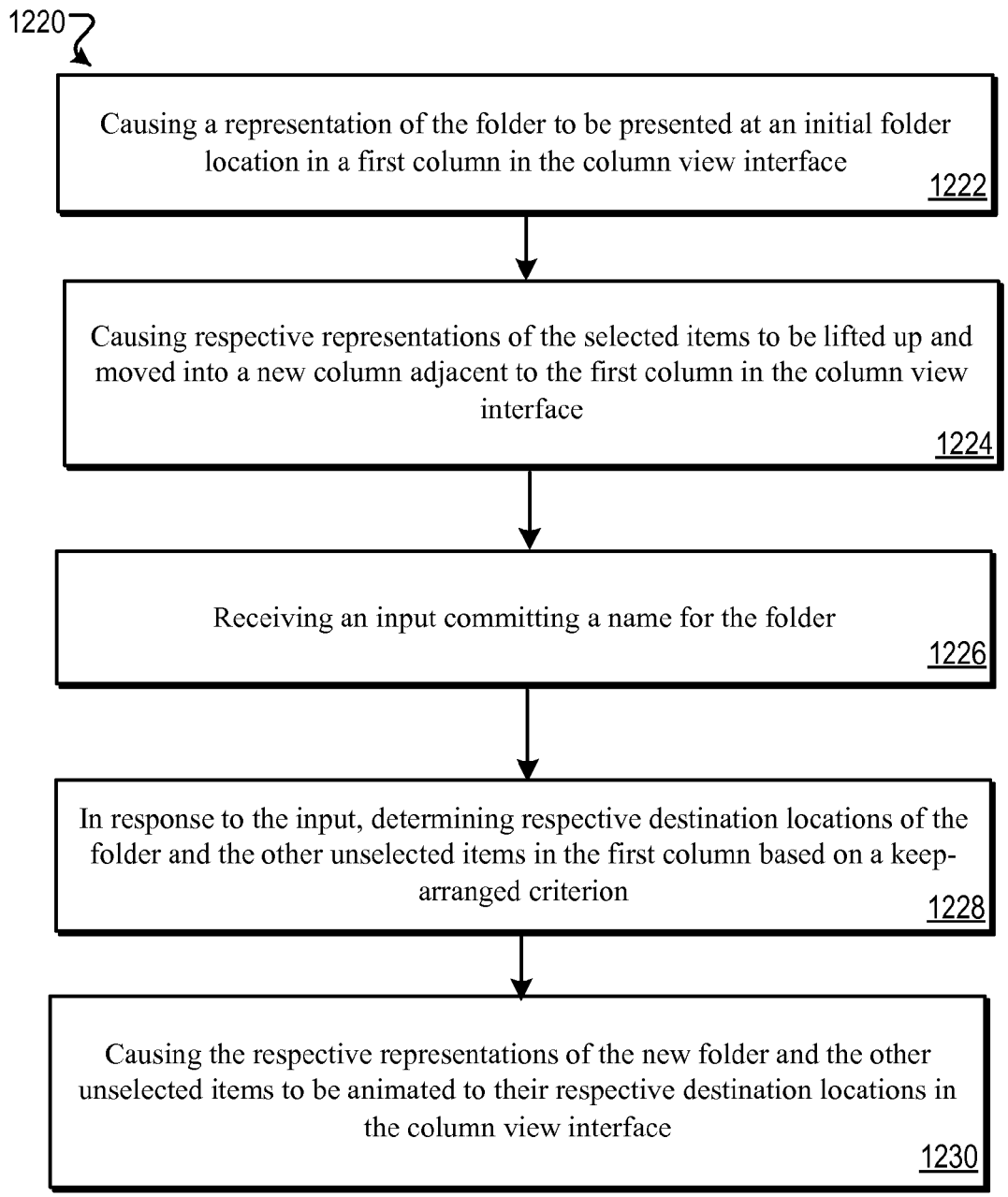
FIG. 12B is a flow diagram of another exemplary process for showing an animation illustrating the grouping of items from an existing folder in a column view interface of the existing folder.

FIG. 12B is a flow diagram of another exemplary process 1220 for showing an animation illustrating the grouping of items from an existing folder in a column view interface of the existing folder. In the exemplary process 1220, the operating system can cause a representation of the destination folder to be presented at an initial folder location in a first column in the column view interface (1222). In some implementations, the first column displays the items of the existing folder and one or more items have been selected from the first column. The operating system can cause respective representations of the selected items to be lifted up and moved into a new column adjacent to the first column in the column view interface (1224). An input committing a name for the destination folder can be received (1226). In response to the input, respective destination locations of the destination folder and other unselected items in the first column can be determined based on a keep-arranged criterion (1228). Then, the operating system can cause the respective representations of the destination folder and the other unselected items to be animated to their respective destination locations in the column view interface (1230).

Figure 13A:
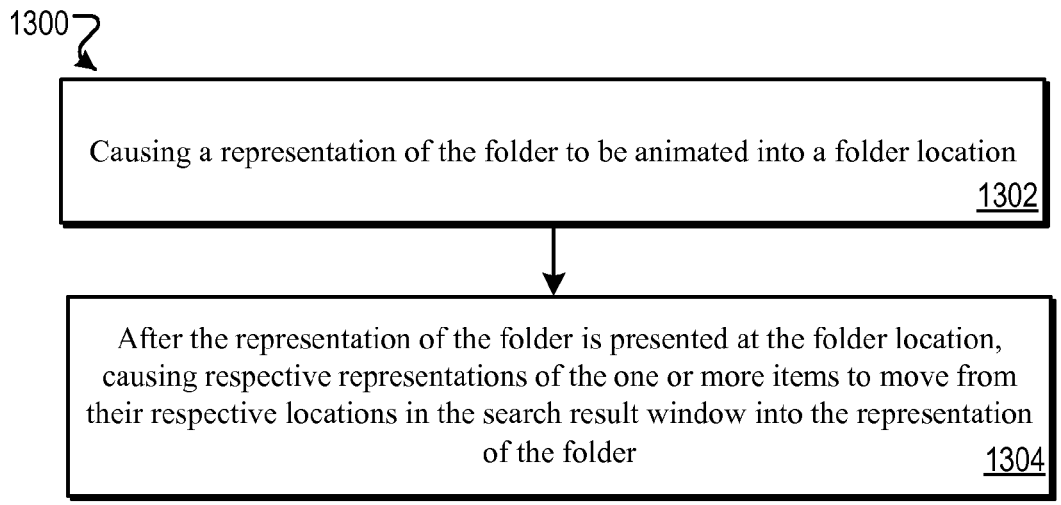
FIG. 13A is a flow diagram of an exemplary process for showing an animation illustrating the grouping of items from a search result window.

FIG. 13A is a flow diagram of an exemplary process 1300 for showing an animation illustrating the grouping of items from a search result window. In some implementations, the one or more selected items are results of a search that are presented in a search result window. In the exemplary process 1300, the operating system can cause a representation of the destination folder to be animated into a folder location (1302). After the representation of the destination folder is presented at the folder location, the operating system can cause respective representations of the one or more items to move from their respective locations in the search result window into the representation of the destination folder (1304).

Figure 13B:
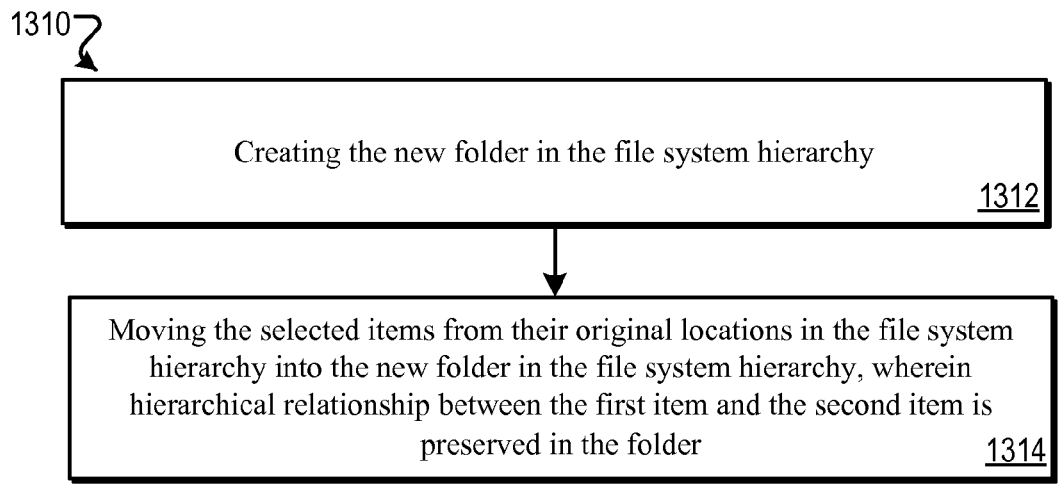
FIG. 13B is a flow diagram of an exemplary process for creating a destination folder for selected search results from a file system hierarchy and maintaining the original hierarchical relationships between the search results in the destination folder.

FIG. 13B is a flow diagram of an exemplary process 1310 for creating a destination folder for the search results in the file system and maintaining the original hierarchical relationship between the search results in the destination folder. In some implementations, at least a first item of the selected items is a descendent item of a second item of the selected items in a file system hierarchy. In the exemplary process 1310, the new folder can be created in the file system hierarchy (1312). Then, the selected items can be moved from their original locations in the file system hierarchy into the new folder in the file system hierarchy, where the hierarchical relationship between the first item and the second item is preserved in the destination folder (1314).

Figure 14:
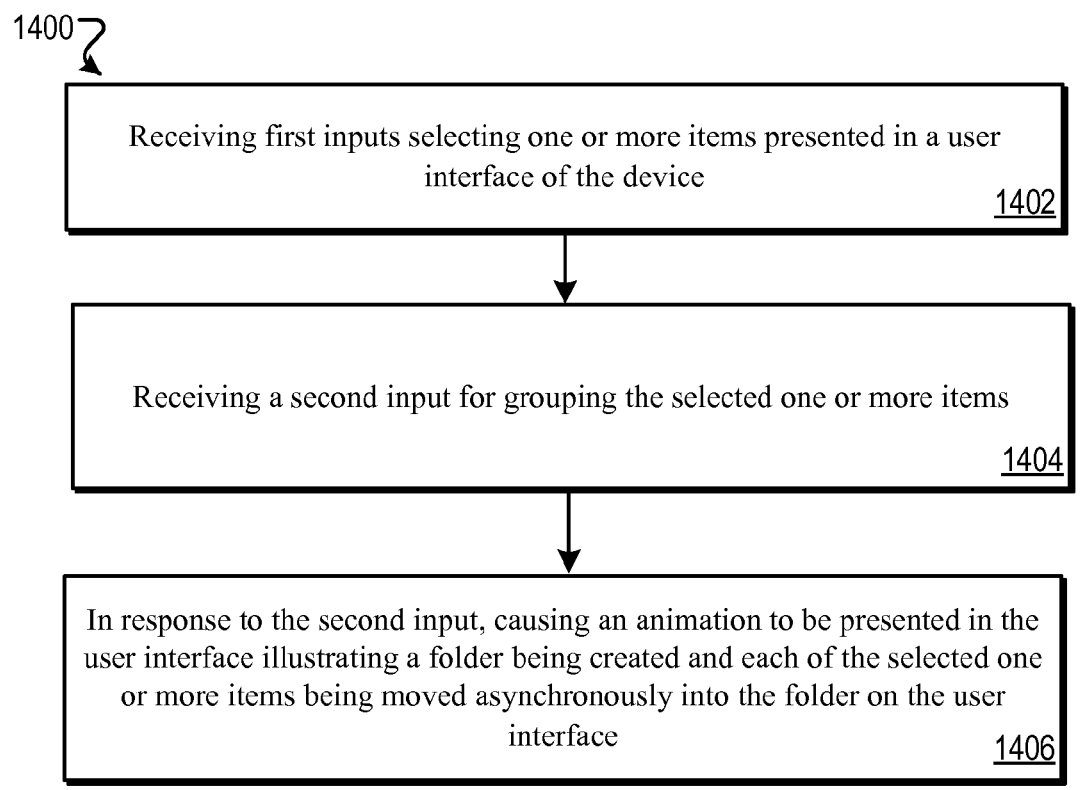
FIG. 14 is a flow diagram of another exemplary process for grouping items in a new folder.

FIG. 14 is a flow diagram of another exemplary process 1400 for grouping items in a destination folder (e.g., a new folder). In the exemplary process 1400, first inputs selecting one or more items presented in a user interface of the device can be received (1402). A second input for grouping the selected one or more items can be received (1404). In response to the second input, the operating system can cause an animation to be presented in the user interface illustrating a destination folder being created and each of the selected one or more items being moved asynchronously into the destination folder on the user interface (1406).

Exemplary Device Architecture

Figure 15:
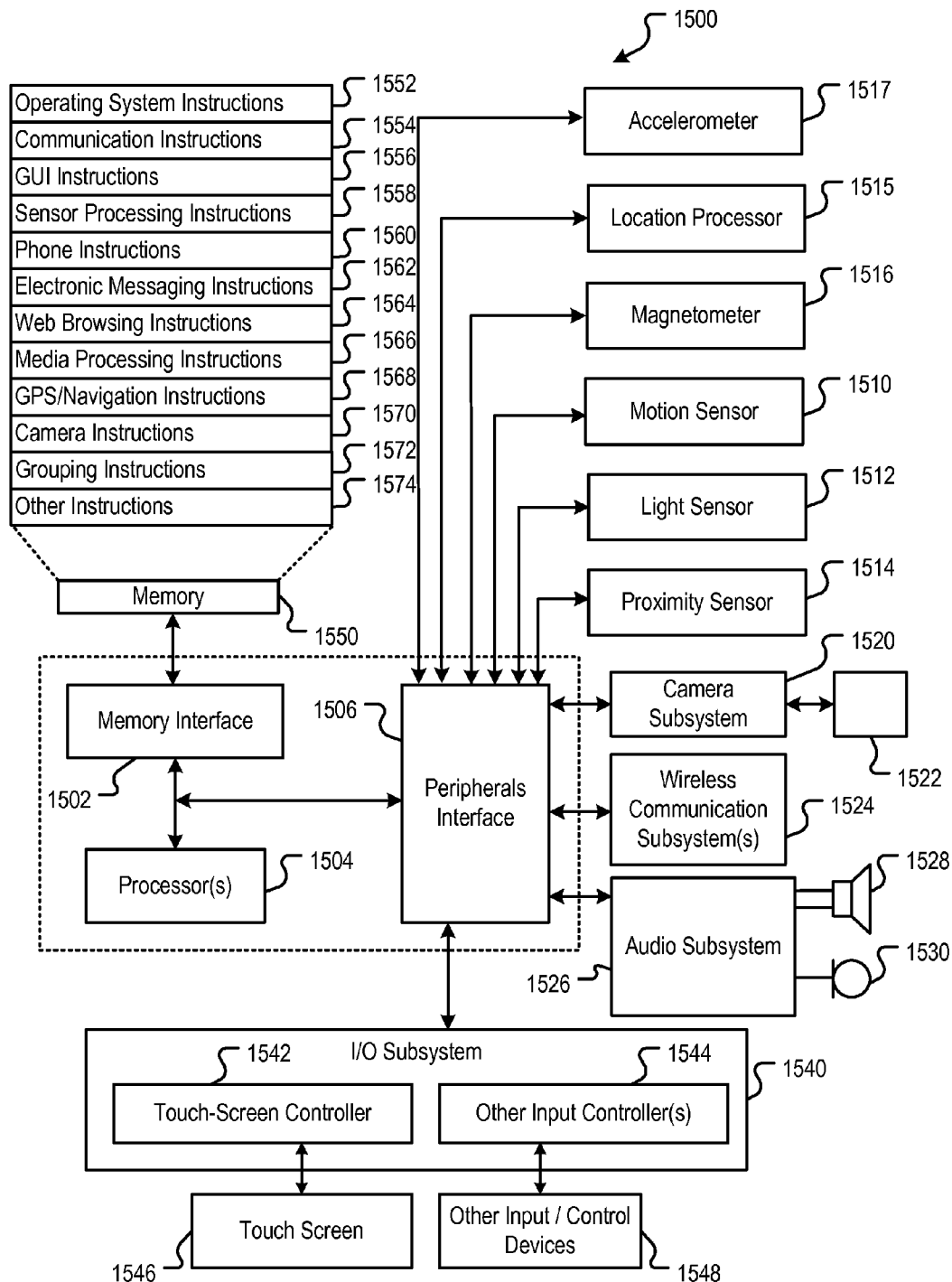
FIG. 15 is a block diagram of exemplary hardware architecture for implementing the features and processes described in reference to FIGS. 1-14.

FIG. 15 is a block diagram of exemplary hardware architecture for implementing the features and processes described in reference to FIGS. 1-14. The device can include memory interface 1502, one or more data processors, image processors and/or processors 1504, and peripherals interface 1506. Memory interface 1502, one or more processors 1504 and/or peripherals interface 1506 can be separate components or can be integrated in one or more integrated circuits. The various components in the device, for example, can be coupled by one or more communication buses or signal lines.

Sensors, devices, and subsystems can be coupled to peripherals interface 1506 to facilitate multiple functionalities. For example, motion sensor 1510, light sensor 1512, and proximity sensor 1514 can be coupled to peripherals interface 1506 to facilitate orientation, lighting, and proximity functions of the mobile device. Location processor 1515 (e.g., GPS receiver) can be connected to peripherals interface 1506 to provide geopositioning. Electronic magnetometer 1516 (e.g., an integrated circuit chip) can also be connected to peripherals interface 1506 to provide data that can be used to determine the direction of magnetic North. Thus, electronic magnetometer 1516 can be used as an electronic compass. Accelerometer 1517 can also be connected to peripherals interface 1506 to provide data that can be used to determine change of speed and direction of movement of the mobile device.

Camera subsystem 1520 and an optical sensor 1522, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1524, which can include radio frequency receivers and transmitters and/or optical (e.g., infrared) receivers and transmitters. The specific design and implementation of the communication subsystem 1024 can depend on the communication network(s) over which a mobile device is intended to operate. For example, a mobile device can include communication subsystems 1524 designed to operate over a GSM network, a GPRS network, an EDGE network, a WiFi or WiMax network, and a Bluetooth network. In particular, the wireless communication subsystems 1524 can include hosting protocols such that the mobile device can be configured as a base station for other wireless devices.

Audio subsystem 1526 can be coupled to a speaker 1528 and a microphone 1530 to facilitate voice-enabled functions, such as voice recognition, voice replication, digital recording, and telephony functions.

I/O subsystem 1540 can include touch screen controller 1542 and/or other input controller(s) 1544. Touch-screen controller 1542 can be coupled to a touch screen 1546 or pad. Touch screen 1546 and touch screen controller 1542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 1546.

Other input controller(s) 1544 can be coupled to other input/control devices 1548, such as one or more buttons, rocker switches, thumb-wheel, infrared port, USB port, and/or a pointer device such as a stylus. The one or more buttons (not shown) can include an up/down button for volume control of speaker 1528 and/or microphone 1530.

In one implementation, a pressing of the button for a first duration may disengage a lock of the touch screen 1546; and a pressing of the button for a second duration that is longer than the first duration may turn power to the device on or off. The user may be able to customize a functionality of one or more of the buttons. The touch screen 1546 can, for example, also be used to implement virtual or soft buttons and/or a keyboard.

In some implementations, the device can present recorded audio and/or video files, such as MP3, AAC, and MPEG files. In some implementations, the device can include the functionality of an MP3 player, such as an iPod™. The device may, therefore, include a pin connector that is compatible with the iPod. Other input/output and control devices can be used.

Memory interface 1502 can be coupled to memory 1550. Memory 1550 can include high-speed random access memory and/or non-volatile memory, such as one or more magnetic disk storage devices, one or more optical storage devices, and/or flash memory (e.g., NAND, NOR). Memory 1550 can store operating system 1552, such as Darwin, RTXC, LINUX, UNIX, OS X, WINDOWS, or an embedded operating system such as VxWorks. Operating system 1552 may include instructions for handling basic system services and for performing hardware dependent tasks. In some implementations, operating system 1552 can include a kernel (e.g., UNIX kernel).

Memory 1550 may also store communication instructions 1554 to facilitate communicating with one or more additional devices, one or more computers and/or one or more servers. Memory 1550 may include graphical user interface instructions 1556 to facilitate graphic user interface processing, such as the user interfaces illustrated in FIGS. 1A-4E; sensor processing instructions 1558 to facilitate sensor-related processing and functions; phone instructions 1560 to facilitate phone-related processes and functions; electronic messaging instructions 1562 to facilitate electronic-messaging related processes and functions, such as SMS and MMS; web browsing instructions 1564 to facilitate web browsing-related processes and functions; media processing instructions 1566 to facilitate media processing-related processes and functions; GPS/Navigation instructions 1568 to facilitate GPS and navigation-related processes and instructions; and camera instructions 1570 to facilitate camera-related processes and functions. The memory 1550 may also store other software instructions (not shown), such as security instructions, web video instructions to facilitate web video-related processes and functions, and/or web shopping instructions to facilitate web shopping-related processes and functions.

Memory 1550 can include instructions 1572 for presenting the user interface changes and implementing the file system operations and operating system operations for grouping items in a new folder. Memory 1550 can also include other instructions 1574 for implementing other features, user interfaces, and processes described in reference to FIGS. 1-14.

Each of the above identified instructions and applications can correspond to a set of instructions for performing one or more functions described above. These instructions need not be implemented as separate software programs, procedures, or modules. Memory 1050 can include additional instructions or fewer instructions. Furthermore, various functions of the mobile device may be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. Yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method performed by one or more processors of a device, comprising:
receiving one or more selection inputs selecting a plurality of items presented in a user interface of the device, the plurality of items including a first item presented at a first location in the user interface, and a second item presented at a second location in the user interface;
while the plurality of items are selected, receiving a folder-creation input; and
in response to receiving the folder-creation input:
creating a new folder,
displaying a representation of the new folder at a third location in the user interface, and
displaying an animation of the first item moving along a first respective path from the first location to the third location, and the second item moving along a second respective path from the second location to the third location.

2. The method of claim 1, further comprising:
determining the third location in the user interface based on respective locations of the selected plurality of items; and
causing the representation of the new folder to be animated into the third location.

3. The method of claim 2, wherein
displaying the animation of the first item moving and the second item moving is after the representation of the new folder is displayed at the third location in the user interface.

4. The method of claim 3, wherein:
the first respective path is along a first trajectory starting from the first location in the user interface and terminating at the third location in the user interface, and
the second respective path is along a second trajectory starting from the second location in the user interface and terminating at the third location in the user interface.

5. The method of claim 3, further comprising:
displaying an animation of the representation of the new folder at the third location to visually indicate the receipt of the selected plurality of items into the new folder.

6. The method of claim 2, wherein the user interface is a desktop of the device kept in a free-arranged state, and determining the third location in the user interface comprises:
determining a weighted average of the respective locations of the selected plurality of items on the desktop; and
designating the weighted average as the third location for the new folder.

7. The method of claim 2, wherein the user interface is a desktop of the device kept in a keep-arranged state and the desktop includes an evenly spaced grid, and determining the third location in the user interface further comprises:
determining a weighted average of the respective locations of the selected plurality of items on the desktop;
identifying an unoccupied grid location nearest the weighted average; and
designating the unoccupied grid location as the third location for the new folder.

8. The method of claim 1, wherein the user interface is a desktop of the device kept in a keep-arranged state according to a keep-arranged criterion, and displaying the representation of the new folder further comprises:
identifying an initial folder location in the user interface based on respective locations of the selected plurality of items;
displaying an animation of the representation of the new folder into the initial folder location;
receiving a third input committing a name of the new folder;
in response to the third input, determining the third location for the new folder based on the keep-arranged criterion; and
displaying an animation of the representation of the new folder moving from the initial folder location to the third location in the user interface.

9. The method of claim 8, further comprising:
in response to the third input, determining respective new locations of existing items on the desktop according to the keep-arranged criterion; and
displaying an animation of representations of the existing items on the desktop moving from their original locations to their respective new locations as the new folder is animated from the initial folder location to the third location.

10. The method of claim 1, further comprising:
waiting for a status notification on file system operations for the grouping of the selected items;
causing changes to the user interface illustrating progress of the file system operations if the status notification indicates expiration of the defined period of time before the successful completion of the file system operations; and
displaying the representation of the new folder and the animation if the status notification indicates successful completion of the file system operations within a defined period of time.

11. The method of claim 10, wherein after the expiration of the defined period of time and before the successful completion of the file system operations for grouping the selected plurality of items into the new folder, the user interface remains operable to respond to other operations that do not conflict with the file system operations for grouping the selected plurality of items into the new folder.

12. The method of claim 10, further comprising:
while waiting for the status notification on the file system operations, queuing one or more system events that require modifications to the user interface; and
responding to the queued one or more system events after the expiration of the defined period of time or the completion of the animation.

13. The method of claim 1, further comprising:
receiving a third input instructing restoration of the selected plurality of items to their original locations;
in response to the third input, determining respective destination locations of the selected plurality of items and other items in the user interface; and
displaying an animation of the selected plurality of items moving out of the new folder, and the selected plurality of items and the other items moving to their respective destination locations.

14. The method of claim 1, wherein the selected plurality of items belong to a common folder and the user interface is a list view interface showing the selected plurality of items in a list, and wherein:
displaying the representation of the new folder comprises displaying the representation of the new folder in proximity to the list; and
displaying the animation comprises:
displaying an animation of representations of the first and second items being lifted off of the list and moved into the representation of the new folder along the items' respective paths;

determining respective destination locations of the new folder and other unselected items in the list based on a defined sort criterion; and causing the respective representations of the new folder and the other unselected items in the list to be animated to their respective destination locations after a filename has been determined for the new folder.

15. The method of claim 14, wherein the respective representation of each of the first and second items follows a respective curved path to the representation of the new folder when the respective item is moved to the representation of the new folder.

16. The method of claim 14, wherein the respective representations of the first and second items change appearance when the respective representations of the first and second items are lifted off of the list.

17. The method of claim 14, wherein the respective representations of the first and second items start to move toward the representation of the new folder asynchronously.

18. The method of claim 17, wherein the item from the first and second items that is closest to the representation of the new folder is animated toward the representation of the new folder first, followed by the other item from the first and second items.

19. The method of claim 1, wherein the user interface is a column view interface showing one or more columns representing consecutive levels of a file system hierarchy, each column presenting child items of a selected parent item in an adjacent column, wherein the selected items have a common parent item and are presented in a first column in the user interface, and wherein:

displaying the representation of the new folder comprises displaying the representation of the new folder at the third location in the first column in the column view interface; and displaying the animation comprises:
displaying an animation of the first and second items being lifted up and moved into a new column adjacent to the first column in the column view interface;
receiving a third input committing a name for the new folder;
in response to the third input, determining respective destination locations of the new folder and other unselected items in the first column based on a keep-arranged criterion; and
causing the respective representations of the new folder and the other unselected items in the first column to be animated to their respective destination locations in the column view interface.

20. The method of claim 1, wherein the selected plurality of items are results of a search that are presented in a search result window, and wherein:

displaying the animation comprises, after the representation of the new folder is presented at the third location, causing respective representations of the first and second items to move from their respective locations in the search result window into the representation of the new folder.

21. The method of claim 20, wherein the first item of the selected plurality of items is a descendent item of the second item of the selected plurality of items in a file system hierarchy, and wherein the method further comprises:

creating the new folder in the file system hierarchy; and
moving the first and second items from their original locations in the file system hierarchy into the new folder in the file system hierarchy, wherein the hierarchical relationship between the first item and the second item is preserved in the new folder.

22. A method performed by one or more processors of a device, comprising:

receiving one or more selection inputs selecting a plurality of items presented in a user interface of the device, the plurality of items including a first item presented at a first location in the user interface, and a second item presented at a second location in the user interface;

while the plurality of items are selected, receiving a folder-creation input; and in response to receiving the folder-creation input:
creating a new folder,
displaying a representation of the new folder at a third location in the user interface, and
displaying an animation of the first item moving from the first location to the third location, and the second item moving from the second location to the third location, the first item and the second item being moved asynchronously.

23. A non-transitory computer-readable storage medium having instructions stored thereon, which, when executed by one or more processors, cause the one or more processors to perform operations comprising:

receiving one or more selection inputs selecting a plurality of items presented in a user interface of a device, the plurality of items including a first item presented at a first location in the user interface, and a second item presented at a second location in the user interface;

while the plurality of items are selected, receiving a folder-creation input; and in response to receiving the folder-creation input:
creating a new folder,
displaying a representation of the new folder at a third location in the user interface, and
displaying an animation of the first item moving along a first respective path from the first location to the third location, and the second item moving along a second respective path from the second location to the third location.

24. A system, comprising:

one or more processors; and memory having instructions stored thereon, which, when executed by the one or more processors, cause the one or more processors to perform operations comprising:

receiving one or more selection inputs selecting a plurality of items presented in a user interface of a device, the plurality of items including a first item presented at a first location in the user interface, and a second item presented at a second location in the user interface;

while the plurality of items are selected, receiving a folder-creation input; and in response to receiving the folder-creation input:
creating a new folder,
displaying a representation of the new folder at a third location in the user interface, and
displaying an animation of the first item moving along a first respective path from the first location to the third location, and the second item moving along a second respective path from the second location to the third location.

* * * * *